US007093004B2

(12) United States Patent
Bernardin et al.

(10) Patent No.: US 7,093,004 B2
(45) Date of Patent: Aug. 15, 2006

(54) USING EXECUTION STATISTICS TO SELECT TASKS FOR REDUNDANT ASSIGNMENT IN A DISTRIBUTED COMPUTING PLATFORM

(75) Inventors: James Bernardin, Brooklyn, NY (US); Peter Lee, New York, NY (US); James Lewis, Berkeley, CA (US)

(73) Assignee: DataSynapse, Inc., New York, NY (US)

( * ) Notice: Subject to any disclaimer, the term of this patent is extended or adjusted under 35 U.S.C. 154(b) by 734 days.

(21) Appl. No.: 10/306,689

(22) Filed: Nov. 27, 2002

(65) Prior Publication Data

US 2003/0191795 A1    Oct. 9, 2003

Related U.S. Application Data

(63) Continuation of application No. PCT/US02/03218, filed on Feb. 4, 2002.

(51) Int. Cl.
G06F 15/16    (2006.01)
(52) U.S. Cl. ..................... 709/219; 709/226; 707/100; 718/102

(58) Field of Classification Search ................ 709/219, 709/224, 226, 238, 248; 707/100; 358/1.16; 718/102, 103
See application file for complete search history.

(56) References Cited

U.S. PATENT DOCUMENTS

| 4,914,657 | A | * | 4/1990 | Walter et al. ................... 714/4 |
|---|---|---|---|---|
| 5,247,677 | A | * | 9/1993 | Welland et al. ............... 718/103 |
| 5,381,546 | A | * | 1/1995 | Servi et al. .................. 718/102 |
| 5,537,542 | A | * | 7/1996 | Eilert et al. .................. 709/201 |
| 6,671,065 | B1 | * | 12/2003 | Salgado et al. ............ 358/1.16 |
| 6,757,730 | B1 | * | 6/2004 | Lee et al. .................... 709/226 |
| 6,952,825 | B1 | * | 10/2005 | Cockx et al. ................ 718/102 |
| 2003/0154284 | A1 | * | 8/2003 | Bernardin et al. .......... 709/226 |
| 2003/0158913 | A1 | * | 8/2003 | Agnoli et al. ............... 709/219 |
| 2005/0182773 | A1 | * | 8/2005 | Feinsmith .................... 707/100 |

* cited by examiner

Primary Examiner—Khanh Quang Dinh
(74) Attorney, Agent, or Firm—David Garrod

(57) ABSTRACT

The invention provides an off-the-shelf product solution to target the specific needs of commercial users with naturally parallel applications. A top-level, public API provides a simple "compute server" or "task farm" model that dramatically accelerates integration and deployment. A number of described and claimed adaptive scheduling and caching techniques provide for efficient resource and/or network utilization of intermittently-available and interruptible computing resource in distributed computing systems.

71 Claims, 143 Drawing Sheets

```
package tutorial.ch1_hello;

import com.livecluster.tasklet.*;

class SimpleTaskInput implements TaskInput {
    int taskId;
}
```

FIG. 3

```
package tutorial.ch1_hello;

import com.livecluster.tasklet.*;

class SimpleTaskOutput implements TaskOutput {
     String s;
}
```

FIG. 4

```
package tutorial.ch1_hello;

import com.livecluster.tasklet.*;

class HelloTasklet implements Tasklet {
    public TaskOutput service(TaskInput taskInput) {
        int myId = ((SimpleTaskInput) taskInput).taskId;
        SimpleTaskOutput output = new SimpleTaskOutput();
        output.s = "Hello from #" + myId;
        return output;
    }
}
```

FIG. 5

```
package tutorial.ch1_Hello;

import com.livecluster.tasklet.*;

class HelloStandaloneTest {
    public static void main(String[] args) {
        HelloTasklet tasklet = new HelloTasklet();
        for (int i = 0; i < 10; i++) {
            SimpleTaskInput input = new SimpleTaskInput();
            input.taskId = i;
            TaskOutput output = tasklet.service(input);
            System.out.println(((SimpleTaskOutput) output).s);
        }
    }
}
```

FIG. 6

```
package tutorial.ch1_hello;

import com.livecluster.tasklet.*;

public class HelloJob extends Job {
    public HelloJob() {
        setTasklet(new HelloTasklet());
    }

// Pass each task a unique number to identify it.
    public void createTaskInputs() throws Exception {
        for (int i = 0; i < 10; i++) {
            SimpleTaskInput input = new SimpleTaskInput();
            input.taskId = i;
            addTaskInput(input);
        }
    }

// Display the output of each task.
    public void processTaskOutput(TaskOutput output) {
        SimpleTaskOutput sto = (SimpleTaskOutput) output;
        System.out.println(sto.s);
    }
}
```

FIG. 7

```
package tutorial.ch1_hello;

import com.livecluster.tasklet.*;

class Test {
    public static void main(String[] args) throws Exception {
        Job job = new HelloJob();
        job.getOptions().setJarFile(new
            java.io.File("./jars/ch1_hello.jar"));
        job.execute();
        System.out.println("DONE");
    }
}
```

FIG. 8

```
public abstract class Deal {
      public Deal(int id) { _id = id; }
      public abstract Valuation value(PricingEnvironment env);

// other methods omitted protected int _id;
}
```

FIG. 9

```
public class ZeroCouponBond extends Deal {
    public ZeroCouponBond(int id, Date maturity,
        double principal) {
        super(id);
        _maturity = maturity;
        _principal = principal;
    } public Valuation value(PricingEnvironment env) {
        double years = DateUtil.yearsBetween(
            env.getValuationDate(), _maturity);
        double rate = env.getInterestRate(years);
        double val = _principal * Math.exp(-rate*years);
        return new Valuation(_id, val);
    } private Date _maturity;
    private double _principal;
}
```

FIG. 10

```
public Deal getDeal(Integer dealId) {
    Deal t = (Deal) dealMap.get(dealId);
    if (t == null) {
        int maturityYears = (int) (Math.random()*10) + 1;
        double principal = Math.random()*10000;
        Calendar c = Calendar.getInstance();
        c.add(Calendar.YEAR, maturityYears);
        t = new ZeroCouponBond(dealId.intValue(),
            c.getTime(), principal);
        dealMap.put(dealId, t);
    }
    return t;
}
```

FIG. 11

```
package tutorial.ch2_valuation;

import java.util.*;

public class ValuationApp {
    public static void main(String[] args) {
        int totalDeals = 10;
        Date today = new Date();
        PricingEnvironment pe = new PricingEnvironment(today);
        for (int i = 0; i < totalDeals; i++) {
            Deal d = DealProvider.getInstance().
                getDeal(new Integer(i));
            Valuation v = d.value(pe);
            System.out.println(v);
        }
    }
}
```

FIG. 12

```
public class ArrayListTaskIO implements TaskInput, TaskOutput {
    private ArrayList list;
    public ArrayListTaskIO() {
        list = new ArrayList();
    }
    // other methods omitted
}
```

FIG. 14

```
class ValuationTasklet implements Tasklet {
    ValuationTasklet(PricingEnvironment pe) {
        _pricingEnvironment = pe;
    } public TaskOutput service(TaskInput input) {
        ArrayListTaskIO dealIds = (ArrayListTaskIO) input;
        ArrayListTaskIO output = new ArrayListTaskIO();
        for (int i = 0; i < dealIds.size(); i++) {
            Integer dealId = (Integer) dealIds.get(i);
            Deal deal =
DealProvider.getInstance().getDeal(dealId);
            output.add(deal.value(_pricingEnvironment));
        }
        return output;
    }
    private PricingEnvironment _pricingEnvironment;
}
```

FIG. 15

```
public void createTaskInputs() throws Exception {
    int dealsAdded = 0;

while (dealsAdded < _totalDeals) {
        ArrayListTaskIO input = new ArrayListTaskIO();
        for (int i = 0; i < _dealsPerTask && dealsAdded < _totalDeals; i++)
            input.add(new Integer(dealsAdded++));
        addTaskInput(input);
    }
}
```

FIG. 16

```
protected void processTaskOutput(TaskOutput out) {
    ArrayList vals = ((ArrayListTaskIO) out).getArrayList();
    _valuations.addAll(vals);
}
```

FIG. 17

```
public static void main(String[] args) throws Exception {
    Properties props = new Properties();
    props.load(new
FileInputStream("./properties/valuation.properties"));
    int totalDeals =
Integer.parseInt(props.getProperty("totalDeals"));
    int dealsPerTask =
Integer.parseInt(props.getProperty("dealsPerTask"));
    _job = new ValuationJob(totalDeals, dealsPerTask);
    _job.getOptions().setJarFile(new
File("./jars/ch2_valuation.jar"));
    PricingEnvironment pe = new PricingEnvironment();
    _job.setTasklet(new ValuationTasklet(pe));
    _job.execute();
    System.out.println(_job.getValuations());
}
```

FIG. 18

```
public TaskOutput service(TaskInput input) {
    try {
        Properties p = EngineSession.getProperties();
        System.out.println("Engine properties:");
        p.list(System.out);
        System.out.println();
        return null; // no TaskOutput needed
    } catch (Exception e) {
        throw new RuntimeException(e.toString());
    }
}
```

FIG. 19

```
class EnginePropertiesJob extends Job {
private static TaskInput ti = new TaskInput() {};
public void createTaskInputs() throws Exception {
for (int i = 0; i < 5; i++)
addTaskInput(ti);
}
// other methods omitted
}
```

FIG. 20

```
Engine properties:
-- listing properties --
id=1007399349412
os=win32
username=mingus
freeDiskInMB=26433
cpuMFlops=90.2
cpuNo=1
lastUpdated=Fri Dec 07 11:40:58 EST 2001
instance=0
freeMemInKB=150300
totalMemInKB=523744
```

FIG. 21

```
public Valuation value(PricingEnvironment env) {
      double v = nativeValue(env);
      return new Valuation(_id, v);
}
```

FIG. 22

```
public void createTaskInputs() throws Exception {
      Properties props = new Properties();
      props.setProperty("os.equals", "win32");
      PropertyDiscriminator discriminator = new
PropertyDiscriminator(props);
      createDealInputs(_totalZeroDeals, 0, null);
      createDealInputs(_totalOptionDeals, DealProvider.MIN_OPTION_ID,
discriminator);
}
```

FIG. 23

```
private void createDealInputs(int totalDeals, int startingDealId,
    IDiscriminator discriminator) throws Exception {
        int dealsAdded = 0;
        while (dealsAdded < totalDeals) {
            ArrayListTaskIO input = new ArrayListTaskIO();
            for (int i = 0; i < _dealsPerTask && dealsAdded <
totalDeals; i++)
                input.add(new Integer(startingDealId + dealsAdded++));
            addTaskInput(input, discriminator);
        }
}
```

FIG. 24

```
class SearchTasklet extends StreamTasklet {
    SearchTasklet(String target) {
        _target = target;
    }
    //...
```

FIG. 25

```
public void service(InputStream input, OutputStream output) {
    try {
        BufferedReader in = new BufferedReader(new
InputStreamReader(input));
        PrintWriter out = new PrintWriter(output);
        try {
            String line;
            while ((line = in.readLine()) != null)
                if (line.indexOf(_target) >= 0)
                    out.println(line);
        } finally {
            in.close();
            out.close();
        }
    } catch (IOException e) {
        throw new RuntimeException(e.toString());
    }
}
```

FIG. 26

```
protected void createTaskInputs() throws Exception {
    // Split the data file into chunks of _linesPerTask lines.
    BufferedReader in = new BufferedReader(new FileReader(_file));
    try {
        String line = in.readLine();
        while (line != null) {
            OutputStream os = createTaskInput();
            PrintWriter out = new PrintWriter(os);
            int lineCount = 0;
            do {
                out.println(line);
                lineCount++;
                line = in.readLine();
            } while (lineCount < _linesPerTask && line != null);
            out.close();
        }
    } finally {
        in.close();
    }
}
```

FIG. 27

```
protected void processTaskOutput(InputStream instream) {
    // Input stream contains matching lines -- print them.
    BufferedReader in = new BufferedReader(new
InputStreamReader(instream));
    try {
        String line;
        while ((line = in.readLine()) != null)
        System.out.println(line);
    } catch (IOException e) {
        e.printStackTrace();
    } finally {
        try { in.close(); } catch (IOException e) {
e.printStackTrace(); }
    }
}
```

FIG. 28

```
class SearchJob extends DataSetJob {
    SearchJob(String target, TaskDataSet dataSet) {
        setTasklet(new SearchTasklet(target));
        setTaskDataSet(dataSet);
    }
    // other methods omitted
}
```

FIG. 29

```
public static void main(String[] args) throws Exception {
    Properties props =
readProperties("./properties/datasetsearch.properties");
    File dataFile = new File(props.getProperty("dataFile"));
    int linesPerTask =
Integer.parseInt(props.getProperty("linesPerTask"));
    String[] targets = parseCommaList(props.getProperty("targets"));
    TaskDataSet dataSet =
        createDataSetFromFile("string-search", dataFile,
linesPerTask);
    for (int i = 0; i < targets.length; i++) {
        _job = new SearchJob(targets[i], dataSet);
        _job.getOptions().setJarFile(new
File("./jars/ch6_datasetsearch.jar"));
        _job.execute();
        System.out.println("DONE WITH JOB #" + i);
    }
    System.out.println("ALL DONE");
}
```

FIG. 30

```
static TaskDataSet createDataSetFromFile(String name, File file,
    int linesPerTask) throws Exception {
    TaskDataSet dataSet = new TaskDataSet(name);
    BufferedReader in = new BufferedReader(new FileReader(file));
    try {
        String line = in.readLine();
        while (line != null) {
            PrintWriter out = new
PrintWriter(dataSet.createTaskInput());
            int lineCount = 0;
            do {
                out.println(line);
                lineCount++;
                line = in.readLine();
            } while (lineCount < linesPerTask && line != null);
            out.close();
        }
        dataSet.doneSubmitting();
    } finally {
        in.close();
    }
    return dataSet;
}
```

FIG. 31

| # | Full Name | UserName | Email | Access |
|---|---|---|---|---|
| 1 | site administrator | admin | | Conf |

| Click on the engine to edit the tracking properties: | | |
|---|---|---|
| Engine Id | Machine Name | Discrimination Properties |
| click- edit entry | Click view active engines as admin | |
| 1001534285796 | datasyna-techwr | manufacturer=Dell,UserName=datasyna-techwr |

Engine Id:
1009554648609

User Name:
datasyna-techwr

Status:
AVAILABLE

OS
win32

Free Disk In MB
15652

Cpu MFlops
115.2

Cpu No
1

Last Updated
Fri Dec 28 11:04:34 EST 2001

Guid
00b0d0818a5a

Shared Dir ID
650216272493929743

Instance
0

Free Mem In KB
130392

Home Dir
C:\Program Files\$DataSynapse\Engine

Total Mem In KB
261292

| Name or ID | Type | Time | Status Click to refresh | Suspend Resume | Remove |
|---|---|---|---|---|---|
| Repeating dependent batch test | RELATIVE | every 1 min | SUSPENDED | ☐ | ☐ |
| Specific date serial batch test | ABSOLUTE | 10/20/2001 1:55 AM | RUNNING | ☐ | |
| Cron parallel batch test | CRON | 55,10, 1, 1, 1 | RUNNING | ☐ | |
| 1000827399656 | IMMEDIATE | | FINISHED | | ☐ |
| File event batch test | IMMEDIATE | | FINISHED | | ☐ |
| 1000827459684 | IMMEDIATE | | FINISHED | | ☐ |
| 1000827519714 | IMMEDIATE | | FINISHED | | ☐ |

FIG. 46

| ID | Hostname | Busy Engines | Idle Engines | Total Engines | Engine Weight | Driver Weight | Monitor |
|---|---|---|---|---|---|---|---|
| | Click open engine list | | | | | | Enter max idle secs in broken monitor |
| 1 | datasyna-techwr-60 | 0 | 0 | 0 | 1 | 1 | 10 |
| Totals: | 1 | 0 | 0 | 0 | | | |

| Select the cluster of engines to list: | | | | | | |
|---|---|---|---|---|---|---|
| Online Engines Only | Offline Engines Only | All Engines | | | | |

| UserName | CPUs | Last Login | Mflops | Free Disk | Free Mem | Total Mem |
|---|---|---|---|---|---|---|
| | | | | *values in MB | *values in KB | *values in KB |
| datasyna-techwr | 1 | Tue Jul 31 16:20:46 2001 | 115.2 | 17097 | 137060 | 261292 |
| datasyna-techwr | 1 | Tue Jul 31 17:56:26 2001 | 115.2 | 17813 | 136620 | 261292 |
| datasyna-techwr | 1 | Fri Aug 24 13:20:23 2001 | 87.3 | 16309 | 134868 | 261292 |
| qantsql | 1 | Fri Aug 24 13:17:20 2001 | 115.2 | 750 | 160780 | 261168 |
| Totals: | 4 | | 432.9 | 51.17 GB | 569.33 MB | 1.05 GB |

FIG. 52

| Software Name | Version # | Release Date |
|---|---|---|
| Engine: Win32 | | |
| 1-Click Install | 2.0.1.3 | January 09, 2002 |
| *This uses the "Install Wizard" to install the engine on your PC. | | |
| 1-Click Install with Tracking | 2.0.1.3 | January 09, 2002 |
| *Similar to the above, but accepts input for the parameters that drive task discrimination. | | |
| Manual Installation | 2.0.1.3 | January 09, 2002 |
| *This uses a standard Windows download interface. Use if your browser/Windows configuration doesn't support the "Install Wizard". | | |
| Engine Install: Solaris/Linux | | |
| PKG-GZIP Format; Solaris Engine install | 2.0.1.3 | January 09, 2002 |
| *Engine install for Solaris in gzip-ed Sun package format. | | |
| TAR-GZIP Format; Solaris Engine install | 2.0.1.3 | January 09, 2002 |
| *Engine install for Solaris in gzip-ed tar archive format. | | |
| TAR-GZIP Format; Linux Engine install | 2.0.1.3 | January 09, 2002 |
| *Engine install for Linux in gzip-ed tar archive format. | | |

FIG. 53

```
public class PiInput implements TaskInput {
    private int _seed;
    public PiInput(int seed) {
        _seed = seed;
    }
}
```

FIG. 54

*PiTaskInput.h*
```
class PiTaskInput : public TaskInput {
    public: PiTaskInput() { }
    PiTaskInput(int seed) : _seed(seed) { }
    void write( ostream& strm) const;
    void read(istream& strm);
    long getSeed() { return _seed; }
    private: long _seed;
};
```

*PiTaskInput.cpp*
```
void PiTaskInput::write( ostream& strm) const {
    strm << _seed;
}
void PiTaskInput::read(istream& strm) {
    strm >> _seed;
}
```

FIG. 55

```
public class PiOutput implements TaskOutput {
    public double pi;
    public PiOutput(double pi) {
        _pi = pi;
    }
}
```

FIG. 56

*PiTaskOutput.h*
```
class PiTaskOutput : public TaskOutput {
    public: PiTaskOutput() { }
    PiTaskOutput(double piValue) : _piValue(piValue) { }
    double getPiValue() { return _piValue; }
    void write( ostream& strm) const;
    void read(istream& strm);
    private: double _piValue;
};
```

*PiTaskOutput.cpp*
```
void PiTaskOutput::write( ostream& strm) const {
    strm << _piValue;
} void PiTaskOutput::read(istream& strm) {
    strm >> _piValue;
}
```

FIG. 57

```
public class PiTasklet implements Tasklet {
    public PiTasklet(int iterations) {
        _iterations = iterations;
    }
    public TaskOutput service(TaskInput input) {
        PiInput pci = (PiInput) input;
        Random r = new Random(pci.getSeed());
        double x; double y;
        int inside = 0;
        for (int i = 0; i < _iterations; i++) {
            x = r.nextDouble();
            y = r.nextDouble();
            if (distance(x, y) < 1.) {
                inside++;
            }
        }
        double pi = inside*4./_iterations;
        return new PiOutput(pi);
    }
    private double distance(double x, double y) {
        return Math.sqrt(x*x+y*y);
    }
}
```

FIG. 58

*PiTasklet.h*
```
class PiTasklet : public Tasklet {
      public: PiTasklet(long iterations) : _iterations(iterations) { }
      PiTasklet() { } TaskOutput* service(TaskInput* input);
      void write( ostream& strm) const;
      void read(istream& strm);
      private: long _iterations;
};
```

*PiTasklet.cpp*
```
void PiTasklet::write( ostream& strm) const {
      strm << _iterations;
} void PiTasklet::read(istream& strm) {
      strm >> _iterations;
}
TaskOutput* createTaskOutput() { return new PiTaskOutput(); }
TaskInput* createTaskInput() { return new PiTaskInput(); }
Tasklet* createTasklet() { return new PiTasklet(); }
void deleteTaskOutput(TaskOutput *taskOutput){ delete taskOutput; }
void deleteTaskInput(TaskInput *taskInput){ delete taskInput; }
void deleteTasklet(Tasklet *tasklet) { delete tasklet; }
void deleteString(string *sss){ delete sss; }
double _distance(double, double);
double urand();
```

FIG. 59A

```
TaskOutput* PiTasklet::service(TaskInput* input) {
    cout << "calling PiTasklet::service" << endl;
    PiTaskInput* piTaskInput = dynamic_cast<PiTaskInput*>(input);
    srand(piTaskInput->getSeed()); // set seed
    double x; double y;
    int inside = 0;
    for (int i = 0; i < _iterations; i++) {
        x = urand();
        y = urand();
        if (_distance(x, y) < 1.) {
            inside++;
        }
    }
    double pi = inside*4./_iterations;
    return new PiTaskOutput(pi);
}
double _distance(double x, double y) {
    return pow((pow(x,2) + pow(y,2)), 0.5);
}
double urand() {
    return rand()/((double) RAND_MAX);
}
```

FIG. 59B

```
public class PiCalcJob extends Job {
    public PiCalcJob() {
        setTasklet(new PiCalcTasklet());
    }
    public void setIterations(int iterations) {
        mIterations = iterations;
    }
    public void setNumTasks(int numTasks) {
        mNumTasks = numTasks;
    }
    public double getPiValue() {
        return mPiTotal/mNumTasks;
    }
    protected void createTaskInputs() {
        for (int i = 0; i < mNumTasks; i++) {
            addTaskInput(new PiCalcInput(mIterations));
        }
    }
    protected void processTaskOutput(TaskOutput output) {
        PiCalcOutput piOutput = (PiCalcOutput) output;
        mPiTotal += piOutput.pi;
    }
    private double mPiTotal;
    private int mIterations;
    private int mNumTasks;
}
```

FIG. 60

*PiJob.h*
```
class PiJob : public Job {
    public: PiJob();
    PiJob(long iterations, int numTasks);
    char* getLibraryName() { return "picalc"; }
    void setNumberOfTasks(int numTasks);
    void setIterations(int iterations);
    double getPiValue() const;
    private: int _tasks;
    long _iterations;
    double _piTotal;
};
```
*PiJob.cpp*
```
PiJob::PiJob() : _iterations((long)1E6), _tasks(10), _piTotal(0) { }
PiJob::PiJob(long iterations, int tasks) : _iterations(iterations),
_tasks(tasks), _piTotal(0) { }
void PiJob::createTaskInputs() {
    PiTasklet tasklet(_iterations/_tasks);
    setTasklet(tasklet);
    for (int i =0; i < _tasks; i++) {
        cout << i << endl;
        PiTaskInput input(rand()); // setting random seeds
        addTaskInput(input);
    }
}
double PiJob::getPiValue() const {
    double pi = 0;
    if (getCompletedTaskCount()!= 0) {
        pi = _piTotal/getCompletedTaskCount();
    }
    return pi;
}
void PiJob::processTaskOutput(TaskOutput& output) {
    PiTaskOutput piOutput = dynamic_cast<PiTaskOutput&>(output);
    cout << "PiJob::processTaskOutput, pi = ";
    cout << piOutput.getPiValue() << endl;
    _piTotal += piOutput.getPiValue();
}
```

FIG. 61

```
class Serializable {
public:
      virtual ~Serializable() {}
      virtual void write( ostream& strm) const = 0;
      virtual void read(istream& strm) = 0;
      virtual string _toString() const {
            ostrstream ost;
            write(ost);
            ost << ends;
            return ost.str();
      }
      virtual string * _toStringPtr() const {
            ostrstream ost;
            write(ost);
            ost << ends;
            return new string(ost.str());
      }
      virtual void _fromString(const string& objStr) {
            istrstream ist(objStr.c_str(), objStr.size());
            read(ist);
      }
};
```

FIG. 62

```
//First, implement a simple TaskInput
public class DataSetTestInput implements TaskInput {
    public DataSetTestInput(int taskNum) {
        _taskNum = taskNum;
    }
    public int getTaskNum() {
        return _taskNum;
    }
    private int _taskNum;

//Create the TaskDataSet, and add ten inputs.
    TaskDataSet tds = new TaskDataSet("DataSetTestJob");
    for (int i = 0; i < 10; i++) {
        DataSetTestInput dsio = new DataSetTestInput(i);
        tds.addTaskInput(dsio);
    }
    tds.doneSubmitting();
}
```

FIG. 63

```
//Implement the TaskOutput
public class DataSetTestOutput implements TaskOutput{
      public DataSetTestOutput(String result) {
           _result = result;
      }
      public String getResult() {
           return _result;
      }
      private String _result;
}
//Implement the DataSetJob
public class DataSetTestJob extends DataSetJob {
      public void processTaskOutput( TaskOutput out ) {
           System.out.println(((DataSetTestOutput)out).getResult());
      }
}

//Implement the Tasklet
public class DataSetTestTasklet implements Tasklet {
      public DataSetTestTasklet() {}
      public TaskOutput service( TaskInput input ){
           DataSetTestInput in = (DataSetTestInput) input;
           msg = msg + in.getTaskNum();
           System.out.println(msg);
           return new DataSetTestOutput(msg);
      }
}

// Create a job, and attach it to the set
job = new DataSetTestJob();
job.setTaskDataSet(TaskDataSet.getDataSet("DataSetTestJob"));

// set the tasklet for this file.
job.setTasklet(new DataSetTestTasklet());
job.execute();
```

FIG. 64

```
//Create a StreamTasklet that swaps input for output
public class StreamTaskletTest extends StreamTasklet {
    public void service( InputStream input, OutputStream output){
        byte[] buf = new byte[1024];
        while (true) {
            int bytesRead = input.read(buf);
            if (bytesRead == -1) break;
            output.write(buf, 0, bytesRead);
        }
    }
}
public class StreamJobTest extends StreamJob {
    public StreamJobTest(int numTasks) {
        setTasklet(new StreamTaskletTest());
        _numTasks = numTasks;
    }
    // create task input by getting a stream in which to write your
data
    // when the stream is closed, the input is submitted for
processing
    protected void createTaskInputs() {
        for (int i = 0; i < _numTasks; i++) {
            OutputStream os = createTaskInput();
            String msg = "Task #" + i;
            os.write(msg.getBytes());
            os.close();
        }
    }
    protected void processTaskOutput( InputStream out ) {
        StreamUtil.copy(out, System.out);
    }
    private int _numTasks;
}
// Run the StreamJob.
public class Test {
    public static void main(String args[]) {
        job = new StreamJobTest(10);
        job.executeInThread();
    }
    private static Job job;
}
```

FIG. 65

```
// start db server
Properties p = new Properties();
p.load(new FileInputStream("./properties/sqltest.properties"));
Server s = new Server();
s.start(p);
int tasks = Integer.parseInt( p.getProperty( "tasks" ) );
String query = p.getProperty( "query" );
```

FIG. 66

```
# properties for sql data set test
tasks=10
query=select * from people
# database server properties ( local config )
port=2034
database=db/db
silent=false
trace=true
# database client properties ( server config )
driver=org.hsql.jdbcDriver
url=jdbc:HypersonicSQL:hsql://your-host-name:2034
user=sa
pass=
```

FIG. 67

```
//Implement DataSetJob to print a line of output
public class SQLDataSetTestJob extends DataSetJob {
    protected void processTaskOutput( TaskOutput output ) {
        System.out.println(((SQLDataSetOutput) output).getData());
    }
}
```

FIG. 68

```
//Implement a SQLTasklet
public class SQLDataSetTestTasklet extends SQLTasklet {
    public TaskOutput service( java.sql.ResultSet input ) {
        String data = "";
        while ( input.next() ) {
            int cols = input.getMetaData().getColumnCount();
            for ( int i=1; i <= cols; i++ ) {
                data += input.getObject( i ).toString() + " ";
            }
            data += "\n";
        }
        return new SQLDataSetOutput(data);
    }
    return new SQLDataSetOutput();
}
```

FIG. 69

```
//Implement a simple TaskOutput
public class SQLDataSetOutput implements TaskOutput {
    public SQLDataSetOutput(String s) {
        _s = s;
    }
    public String getData() {
        return _s;
    }
    private String _s;
}
public class Test {
    public static void main(String[] args) {
        if ( SQLDataSet.getDataSet( "DBTest" ) == null ) {
            // create the dataset on the server
            SQLDataSet ds = new SQLDataSet( "DBTest" );
            ds.setJDBCProperties( p );
            ds.setMode( SQLDataSet.TOTAL_TASKS, tasks );
            ds.setQuery( query );
            ds.prepare();
            while ( !ds.ready() ) {
                Thread.currentThread().sleep( 1000 );
                System.out.print( ds.getPreparedInputs() );
            }
        }
        // now run a job on this set
        SQLDataSetTestJob job = new SQLDataSetTestJob();
        job.setTaskDataSet( SQLDataSet.getDataSet( "DBTest" ) );
        SQLDataSetTestTasklet t = new SQLDataSetTestTasklet();
        job.setTasklet( t );
        job.executeInThread();
    }
    private static SQLDataSetTestJob job;
}
```

FIG. 70

```
package examples.heatpropagator;
import com.livecluster.tasklet.propagator.*;
import java.util.*;
import java.io.*;

public class Test {
    public static void main( String[] args ) {
```

FIG. 72A

```
        try {
            Properties props = new Properties();
            props.load( new FileInputStream(
"./properties/heatpropagator.properties" ) );
            int nodes = Integer.parseInt( props.getProperty(
"nodes", "1" ) );
            int cols = Integer.parseInt( props.getProperty(
"cols", "4" ) );
            int rows = Integer.parseInt( props.getProperty(
"rows", "4" ) );
            int iters = Integer.parseInt( props.getProperty(
"iters", "100" ) );
            double maxTemp = Double.parseDouble(
props.getProperty( "maxTemp", "100" ) );
            double rightBorderTemp = Double.parseDouble(
props.getProperty( "rightBorder
                Temp", "100" ) );
            double leftBorderTemp = Double.parseDouble(
props.getProperty(
                "leftBorderTemp","20" ) );
            double topBorderTemp = Double.parseDouble(
props.getProperty(
                "topBorderTemp", "30" ) );
            double bottomBorderTemp = Double.parseDouble(
props.getProperty(
                "bottomBorderTemp", "40" ) );
            boolean computeError = new Boolean( props.getProperty(
                "computeError", "false" ) ).booleanValue();
```

FIG. 72B

```
            HeatEqnSolver solver = new HeatEqnSolver( nodes, cols,
rows, iters, maxTemp,
                rightBorderTemp, leftBorderTemp,
                topBorderTemp, bottomBorderTemp,
                computeError );
            System.out.println( "Running 2D heat equation with
propagation nodes: " +nodes +
                " and matrix size : " + cols + " x " + rows +
                " for " + iters + " iterations" );
```

FIG. 72C

```
            solver.solve();
    } catch (Exception e) {
            e.printStackTrace();
    }
    System.exit(0);
        }
}
```

FIG. 72D

```
package examples.heatpropagator;
import com.livecluster.tasklet.propagator.*;
import java.util.*;
import java.io.*;
public class HeatEqnSolver {
    public HeatEqnSolver( int nodes, int cols, int rows, int iters,
double maxT,
        double rightT, double leftT, double topT, double bottomT,
        boolean computeError ) {
            _nodes = nodes;
            _cols = cols;
            _rows = rows;
            _iters = iters;
            _maxTemp = maxT;
            _rightBorderTemp = rightT;
            _leftBorderTemp = leftT;
            _topBorderTemp = topT;
            _bottomBorderTemp = bottomT;
            _computeError = computeError;
    }
    public void solve() throws Exception {
        // initialize test matrix and constants
        double[][] testMatrix = new double[_rows+2][_cols+2];
        double[][] resultMatrix = new double[_rows+2][];
        double dx = 1.0 / (double)_cols;
        double dy = 1.0 / (double)_rows;
        double stabf = 0.1;
        double dt = 0.000020;
        double facx = dt * stabf / ( dx * dx );
        double facy = dt * stabf / ( dy * dy );
        GroupPropagator gp = null;
```

FIG. 73A

```
        try {
            gp = new GroupPropagator( "heat2d", _nodes );
            GroupCommunicator gc = gp.getGroupCommunicator();
            gp.setNodePropagator( new HeatPropagator( _iters,
facx, facy ) );
            gp.getOptions().setJarFile( new File(
"./jars/heatpropagator.jar" ) );
```

FIG. 73B

```
                initializeMatrix( testMatrix );
                int rowsPerNode = _rows / _nodes;
                for ( int i=0, masterIndex=0; i < _nodes; i++ ) {
                    if ( i == _nodes-1 ) { // for last node add extra
rows
                        rowsPerNode += _rows % _nodes;
                    }
                    double[][] data = new
double[2*(rowsPerNode+2)][];
                    for ( int j=0; j < rowsPerNode+2; j++,
masterIndex++ ) {
                        data[j] = testMatrix[masterIndex];
                    }
                    masterIndex -= 2;
                    gc.setNodeState( i, 0, data, true );
                }
```

FIG. 73C

```
                // get results
                for ( int i=0, masterIndex=1; i < _nodes; i++ ) {
                    double[][] matrix = (double[][])gc.getNodeState(
i, _iters );
                    for ( int j=1; j < matrix.length/2-1; j++,
masterIndex++ ) {
                        resultMatrix[masterIndex] = matrix[j];
                    }
                }
                System.out.println( "\nDone with 2d propagation" );
            }
        } finally {
            if (gp != null) {
                gp.endSession();
            }
        }
    }
}
```

FIG. 73D

```
private void initializeMatrix( double[][] testMatrix ) {
    // fill matrix with random values and set boundary values
    Random rnd = new Random();
    for ( int i=1; i < testMatrix.length-1; i++ ) {
        for ( int j=0; j < testMatrix[0].length; j++ ) {
            if ( j == 0 ) {
                testMatrix[i][j] = _leftBorderTemp;
            } else if ( j == testMatrix[0].length-1 ) {
                testMatrix[i][j] = _rightBorderTemp;
            } else {
                testMatrix[i][j] = rnd.nextDouble() * _maxTemp;
            }
        }
    }
    for ( int j=0; j < testMatrix[0].length; j++ ) {
        testMatrix[0][j] = _topBorderTemp;
        testMatrix[testMatrix.length-1][j] = _bottomBorderTemp;
    }
}
private int _nodes, _cols, _rows, _iters;
private double _maxTemp, _rightBorderTemp, _leftBorderTemp;
private double _topBorderTemp, _bottomBorderTemp;
private boolean _computeError;
```

FIG. 73E

```
package examples.heatpropagator;
import com.livecluster.tasklet.propagator.*;
import java.io.Serializable;
public class HeatPropagator extends NodePropagator {
    public HeatPropagator( int lastIter, double facx, double facy )
{
        _lastIteration = lastIter;
        _facx = facx;
        _facy = facy;
    }
}
```

FIG. 74

```
    public Object propagate( int nodeId, int stepId,
GroupCommunicator gc )
throws Throwable {
    double[][] matrix =(double[][])gc.getNodeState();
    int rows = matrix.length / 2;
    int cols = matrix[0].length;
```

FIG. 75A

```
      // get boundaries from last step
      if ( stepId != 0 ) {
          if ( nodeId != 0 ) {
              matrix[0] = (double[])( gc.getMessagesFromSender(
nodeId-1 )[0] );
          }
          if ( nodeId != gc.getNumNodes()-1 ) {
              matrix[rows-1] = (double[])( gc.getMessagesFromSender(
nodeId+1)[0] );
          }
      } else {
          for ( int i=1; i < matrix.length; i++ ) {
              if ( matrix[i] == null ) {
                  matrix[i] = new double[matrix[0].length];
              }
          }
      }
```

FIG. 75B

```
        // main loop
        for ( int i=1; i < rows-1; i++ ) {
            for ( int j=1; j < cols-1; j++ ) {
                matrix[i+rows][j] = matrix[i][j] +
                    _facx * ( matrix[i+1][j] - 2.0 * matrix[i][j] +
matrix[i-1][j]) +
                    _facy * ( matrix[i][j+1] - 2.0 * matrix[i][j] +
matrix[i][j-1]
                );
            }
        }
// copy back to matrix
for ( int i=1; i < rows-1; i++ ) {
    for ( int j=1; j < cols-1; j++ ) {
        matrix[i][j] = matrix[i+rows][j];
    }
}
```

FIG. 75C

```
            // set state for next iteration
            gc.setNodeState( matrix, false );
            // send boundaries
            if ( stepId != _lastIteration ) {
                if ( nodeId > 0 ) { // bottom boundary
                    gc.sendMessage( nodeId-1, matrix[1] );
                }
                if ( nodeId < gc.getNumNodes()-1 ) { // top boundary
                    gc.sendMessage( nodeId+1, matrix[rows-2] );
                }
            }
            return null;
        }
        private int _lastIteration;
        private double _facx, _facy;
}
```

FIG. 75D

In XML:
```
<job class="examples.linpack.TestJob">
<options class="com.livecluster.tasklet.JobOptions">
<property name="jarFile" value="./jars/test.jar"/>
<property name="serverTimeout" value="60"/>
<property name="resubmitOnServerTimeout" value="true"/>
<property name="priority" value="5"/>
<property name="parallelCollection" value="false"/>
<discriminator
class="com.livecluster.tasklet.discriminator.BasicEngineDiscriminator
">
<property name="os" value="Linux"/>
</discriminator>
</options>
</job>
```

In Java:
```
Properties props = new Properties();
props.setProperty( "UserName.equals", "Bill" );
PropertyDiscriminator discrim = new PropertyDiscriminator( props );
job.getOptions().setDiscriminator( discrim );
job.execute();
```

FIG. 76

```
#include <stdio.h>
#include <stdlib.h>
#include <math.h>
#include <time.h>
#include "NativeWrapper.h"
double calculatePi(int iters);
double distance(double x, double y);
double randm();
int main(int argc, char *argv) {
    printf("Pi = %f\n", calculatePi(10000));
    return 0;
}
JNIEXPORT jdouble JNICALL Java_NativeWrapper_calculatePi(JNIEnv *env,
jobject
    thisObj, jint iterations) {
    return calculatePi(iterations);
}
double calculatePi(int iters) {
    int i;
    int inside = 0;
    double x;
    double y;
    double pi;
    static int seed = 0;
    if (!seed) {
        srand(time(NULL));
        seed = 1;
    }
    for (i = 0; i < iters; i++) {
        x = randm();
        y = randm();
        if (distance(x, y) < 1.0) {
            inside++;
        }
    }
    pi = inside*4.0/iters;
    return pi;
}
double randm() {
    return (((double) rand())/RAND_MAX);
}
double distance(double x, double y) {
    return (sqrt(x*x+y*y));
}
```

FIG. 77

```
public class NativeWrapper {
    private static boolean libLoaded = false;
    private static native double calculatePi(int iters);
    public static double getPiCalc(int iters) {
        if (!libLoaded) {
            try {
                System.loadLibrary("PiCalcNative");
                libLoaded = true;
            } catch (Exception e) {
                e.printStackTrace();
            }
        }
        return NativeWrapper.calculatePi(iters);
    }
}
```

FIG. 78

```
import com.LiveCluster.tasklet.*;
public class PiCalcTasklet implements Tasklet {
    private native double PiCalc(int iters);
    public PiCalcTasklet() {}
    public TaskOutput service(TaskInput input) {
        PiCalcInput pci = (PiCalcInput) input;
        double pi = NativeWrapper.getPiCalc(pci.iterations);
        return new PiCalcOutput(pi);
    }
}
```

FIG. 79

```
<?xml version="1.0" ?>
<job class=PiCalcJob>
<property name=jarFile value=picalc.jar>
<property name=iterations value=1000000>
<property name=numTasks value=100>
</job>
```

FIG. 80

```
<batch name="Specific date serial batch test">
<property name="type" value="parallel"/>
<schedule>
<property name="type" value="absolute"/>
<property name="startTime" value="9/28/2001 11:20 AM"/>
</schedule>
<job class="examples.linpack.LinpackJob">
<property name="numberOfTasks" value="10"/>
<property name="inputSize" value="10"/>
<property name="exitOnCompleted" value="false"/>
<property name="outputSize" value="10"/>
<property name="duration" value="1"/>
<property name="cpuIntensity" value="0.1"/>
<options class="com.livecluster.tasklet.JobOptions">
<property name="username" value="batchtestuser"/>
</options>
</job>
<command class="com.livecluster.batch.command.LogCommand">
<property name="message" value="absolute batch message"/>
</command>
</batch>
```

FIG. 81

*DataSynapse™ LiveCluster API Specification vR2_5_0_3_RC1*

PREV PACKAGE  NEXT PACKAGE          FRAMES  NO FRAMES

Package com.livecluster.tasklet.propagator

| Interface Summary | |
|---|---|
| *GroupCommunicator* | GroupCommunicator is an interface used by the NodeTasklet and other executing code to send and recieve messages, as well as saving and retrieving node state. |

| Class Summary | |
|---|---|
| GroupPropagator | |
| NodeTasklet | The user-defined NodeTasklet defines the code that is executed on the Engines. |

*DataSynapse™ LiveCluster API Specification vR2_5_0_3_RC1*

PREV PACKAGE  NEXT PACKAGE          FRAMES  NO FRAMES

FIG. 88

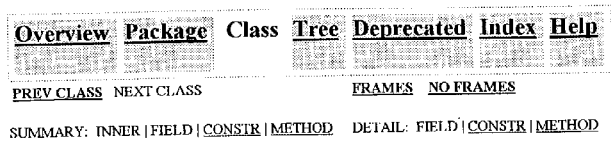

*DataSynapse™ LiveCluster API*

*Specification vR2_5_0_3_RC1*

PREV CLASS  NEXT CLASS                     FRAMES  NO FRAMES

SUMMARY: INNER | FIELD | CONSTR | METHOD   DETAIL: FIELD | CONSTR | METHOD com.livecluster.tasklet.propagator

Class NodeTasklet

```
java.lang.Object
  |
  +--com.livecluster.tasklet.Tasklet
        |
        +--com.livecluster.tasklet.propagator.NodeTasklet
```

All Implemented Interfaces:

com.livecluster.core.tasklet.internal.ITasklet, java.io.Serializable public abstract class NodeTasklet extends Tasklet

The user-defined NodeTasklet defines the code that is executed on the Engines. NodeTasklet will be executed by the Engine for every node and propagation step. The NodeTasklet uses the GroupCommunicator for retrieving the current state of the node, saving the processing result of the node, sending messages to other nodes, and receiving messages for the node.

See Also:

Serialized Form

FIG. 89A

Constructor Summary

NodeTasklet()

Method Summary

| | |
|---:|---|
| java.lang.String | getGroup() |
| int | getNumNodes() |
| int | getStepId() |
| abstract java.lang.Object | propagate(int nodeId, int stepId, GroupCommunicator gc)<br>The user-defined propagate method. |
| TaskOutput | service(TaskInput input)<br>The user-defined service method. |
| void | setGroup(java.lang.String group) |
| void | setNumNodes(int numNodes) |

FIG. 89B

Methods inherited from class com.livecluster.tasklet.Tasklet

```
destroy, init
```

Methods inherited from class java.lang.Object

```
clone, equals, finalize, getClass, hashCode, notify, notifyAll, toString, wait,
wait, wait
```

Constructor Detail

NodeTasklet

```
public NodeTasklet()
```

Method Detail propagate

```
public abstract java.lang.Object propagate(int nodeId,
                                           int stepId,
                                           GroupCommunicator gc)
                                    throws TaskletException
```

The user-defined propagate method. The method performs some processing on the node and the step and returns the result.

Parameters:

nodeId - the node id for the node stepId - the step id for the node gc - the GroupCommunicator interface.

FIG. 89C

Returns:

the process result.

--- setStepId

```
public void setStepId(int stepId)
```

--- getStepId

```
public int getStepId()
```

--- getGroup

```
public java.lang.String getGroup()
```

--- setGroup

```
public void setGroup(java.lang.String group)
```

--- setNumNodes

```
public void setNumNodes(int numNodes)
```

--- getNumNodes

```
public int getNumNodes()
```

---

FIG. 89D service

```
public final TaskOutput service(TaskInput input)
                         throws TaskletException
```
    Description copied from class: Tasklet

The user-defined service method. The method performs some processing on the taskInput and returns the taskOutput.

Overrides:

service in class Tasklet

Following copied from class: com.livecluster.tasklet.Tasklet

Parameters:

taskInput - the input created by the Job

Returns:

the results of processing

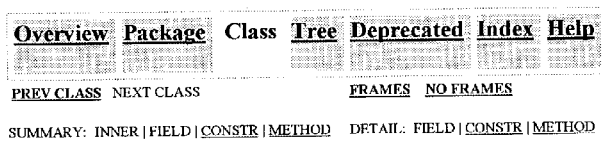

Overview Package Class Tree Deprecated Index Help

PREV CLASS    NEXT CLASS            FRAMES   NO FRAMES

SUMMARY: INNER | FIELD | CONSTR | METHOD    DETAIL: FIELD | CONSTR | METHOD

*DataSynapse™ LiveCluster API Specification vR2_5_0_3_RC1*

FIG. 89E

| Overview | Package | Class | Tree | Deprecated | Index | Help |

*DataSynapse™ LiveCluster API*

*Specification vR2_5_0_3_RC1*

PREV CLASS  NEXT CLASS         FRAMES  NO FRAMES

SUMMARY: INNER | FIELD | CONSTR | METHOD   DETAIL: FIELD | CONSTR | METHOD com.livecluster.tasklet.propagator

Interface GroupCommunicator

All Superinterfaces:

java.io.Serializable public interface GroupCommunicator extends java.io.Serializable

GroupCommunicator is an interface used by the NodeTasklet and other executing code to send and recieve messages, as well as saving and retrieving node state.

FIG. 90A

| | | |
|---|---|---|
| Method Summary | | |
| | void | broadcast(int stepId, java.lang.Object msg)<br><br>Send a message to all recipients, except current node, at specified propagation step |
| | void | broadcast(java.lang.Object msg)<br><br>Send a message to all recipients, except current node, at next propagation step |
| | void | clearMessages()<br><br>Clear all messages and states on server and Engines. |
| java.lang.Object[] | | getMessages()<br><br>Get the messages for current node and propagation step. |
| java.lang.Object[] | | getMessages(int stepId)<br><br>Get the messages for current node and specified propagation step. |
| java.lang.Object[] | | getMessages(int nodeId, int stepId)<br><br>Get the messages for specified node and propagation step. |

FIG. 90B

| | |
|---:|:---|
| java.lang.Object[] | getMessagesFromSender(int senderNodeId)<br><br>Get the message from specified node for current node and propagation step. |
| java.lang.Object[] | getMessagesFromSender(int senderNodeId, int stepId)<br><br>Get the messages from specified node for current node and specified propagation step. |
| java.lang.Object | getNodeState()<br><br>Get the state of the node at current step. |
| java.lang.Object | getNodeState(int stepId)<br><br>Get the state of the node at stepId. |
| java.lang.Object | getNodeState(int nodeId, int stepId)<br><br>Get the state of specified node and stepId. |
| int | getNumNodes()<br><br>Get the total number of node. |
| void | sendMessage(int nodeId, int stepId, java.lang.Object msg)<br><br>Send the message to nodeId for specified propagation step. |
| void | sendMessage(int nodeId, java.lang.Object msg)<br><br>Send the message to nodeId for next propagation step. |
| void | setContext(int nodeId, int stepId)<br><br>Set the node and step id. |

FIG. 90C

| | |
|---|---|
| void | setNodeState(int nodeId, int stepId, java.lang.Object nodeState)<br><br>Set the state of the specified node at stpeId. |
| void | setNodeState(int stepId, java.lang.Object nodeState)<br><br>Set the state of the node at stpeId. |
| void | setNodeState(java.lang.Object nodeState)<br><br>Set the state of the node for next propagation step. |

Method Detail broadcast

```
public void broadcast(java.lang.Object msg)
           throws LiveClusterException
```
Send a message to all recipients, except current node, at next propagation step

Parameters:

msg - the object to send

--- broadcast

```
public void broadcast(int stepId,
                      java.lang.Object msg)
           throws LiveClusterException
```
Send a message to all recipients, except current node, at specified propagation step

FIG. 90D

Parameters:

msg - the object to send

--- getNodeState

```
public java.lang.Object getNodeState()
                          throws LiveClusterException
```
Get the state of the node at current step.

Returns:

the state

--- getNodeState

```
public java.lang.Object getNodeState(int stepId)
                          throws LiveClusterException
```
Get the state of the node at stepId.

Returns:

the state

--- getNodeState

```
public java.lang.Object getNodeState(int nodeId,
                                     int stepId)
                          throws LiveClusterException
```
Get the state of specified node and stepId.

Parameters:

nodeId - the node stepId - the step

FIG. 90E

Returns:

the state

--- setNodeState

```
public void setNodeState(java.lang.Object nodeState)
                 throws LiveClusterException
```
Set the state of the node for next propagation step.

Parameters:

nodeState - the state object

--- setNodeState

```
public void setNodeState(int stepId,
                         java.lang.Object nodeState)
                 throws LiveClusterException
```
Set the state of the node at stpeId.

Parameters:

stepId - the step id nodeState - the state object

--- setNodeState

```
public void setNodeState(int nodeId,
                         int stepId,
                         java.lang.Object nodeState)
                 throws LiveClusterException
```
Set the state of the specified node at stpeId.

FIG. 90F

Parameters:

nodeId - the node stepId - the step id nodeState - the state object

--- sendMessage

```
public void sendMessage(int nodeId,
                        java.lang.Object msg)
           throws LiveClusterException
```
Send the message to nodeId for next propagation step.

Parameters:

nodeId - the receipendt node msg - the message object

--- sendMessage

```
public void sendMessage(int nodeId,
                        int stepId,
                        java.lang.Object msg)
           throws LiveClusterException
```
Send the message to nodeId for specified propagation step.

Parameters:

nodeId - the receipendt node stepId - the step msg - the message object

---

FIG. 90G getMessages

```
public java.lang.Object[] getMessages()
                                throws LiveClusterException
```
Get the messages for current node and propagation step.

Returns:

the object array

--- getMessagesFromSender

```
public java.lang.Object[] getMessagesFromSender(int senderNodeId)
                                throws LiveClusterException
```
Get the message from specified node for current node and propagation step.

Parameters:

senderNodeId - the node id for the sender

Returns:

the object array

--- getMessagesFromSender

```
public java.lang.Object[] getMessagesFromSender(int senderNodeId,
                                                int stepId)
                                throws LiveClusterException
```
Get the messages from specified node for current node and specified propagation step.

Parameters:

senderNodeId - the node id for the sender stepId - the step

FIG. 90H

Returns:

the object array

--- getMessages

```
public java.lang.Object[] getMessages(int stepId)
                              throws LiveClusterException
```
Get the messages for current node and specified propagation step.

Parameters:

stepId - the step

Returns:

the object array

--- getMessages

```
public java.lang.Object[] getMessages(int nodeId,
                                      int stepId)
                              throws LiveClusterException
```
Get the messages for specified node and propagation step.

Parameters:

nodeId - the nod stepId - the step

Returns:

the object array

---

FIG. 90I setContext

```
public void setContext(int nodeId,
                       int stepId)
```
Set the node and step id.

Parameters:

nodeId - the nod stepId - the step

--- clearMessages

```
public void clearMessages()
```
Clear all messages and states on server and Engines.

--- getNumNodes

```
public int getNumNodes()
```
Get the total number of node.

---

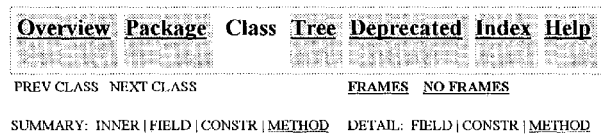 Class Tree Deprecated Index Help   *DataSynapse™ LiveCluster API*

PREV CLASS  NEXT CLASS           FRAMES  NO FRAMES           *Specification vR2_5_0_3_RC1*

SUMMARY: INNER | FIELD | CONSTR | METHOD    DETAIL: FIELD | CONSTR | METHOD

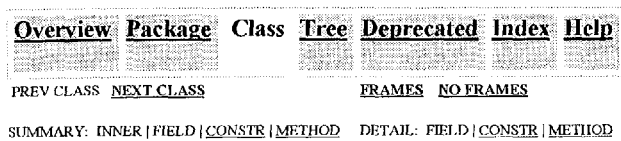

PREV CLASS  NEXT CLASS    FRAMES  NO FRAMES

SUMMARY: INNER | FIELD | CONSTR | METHOD    DETAIL: FIELD | CONSTR | METHOD

*DataSynapse™ LiveCluster API*

*Specification vR2_5_0_3_RC1* com.livecluster.tasklet.propagator

Class GroupPropagator

```
java.lang.Object
  |
  +--com.livecluster.tasklet.propagator.GroupPropagator
``` public class GroupPropagator extends java.lang.Object

---

Constructor Summary

| |
|---|
| GroupPropagator(java.lang.String group, int numNodes) |
|     Constructor for GroupPropagator. |
| GroupPropagator(java.lang.String group, int numNodes, boolean useCaching) |
|     Constructor for GroupPropagator. |
| GroupPropagator(java.lang.String group, int numNodes, boolean useCaching, boolean ignoreObjectSize) |
|     Constructor for GroupPropagator. |

FIG. 91A

| | | |
|---|---|---|
| Method Summary | | |
| | void | endSession() <br> End the job |
| GroupCommunicator | getGroupCommunicator() <br> Gets the GroupCommunicator interface |
| JobOptions | getOptions() <br> Gets the predefined GroupPropagator options, so that they may be set. |
| java.lang.Object[] | propagate(int stepId) <br> Execute a propagation step. |
| void | setNodeTasklet(NodeTasklet np) <br> Sets the NodeTasklet for this Job. |
| void | setOptions(JobOptions options) <br> Sets the predefined options. |

| Methods inherited from class java.lang.Object |
|---|
| clone, equals, finalize, getClass, hashCode, notify, notifyAll, toString, wait, wait, wait |

FIG. 91B

Constructor Detail

GroupPropagator

```
public GroupPropagator(java.lang.String group,
                       int numNodes)
        throws LiveClusterException
```
Constructor for GroupPropagator.

Parameters:

group - the group name numNodes - total number of nodes for the group

---

GroupPropagator

```
public GroupPropagator(java.lang.String group,
                       int numNodes,
                       boolean useCaching)
        throws LiveClusterException
```
Constructor for GroupPropagator.

Parameters:

group - the group name numNodes - total number of nodes for the group useCaching - cache states and messages in memory. The default writes objects to disk for http fetching.

FIG. 91C

GroupPropagator

```
public GroupPropagator(java.lang.String group,
                       int numNodes,
                       boolean useCaching,
                       boolean ignoreObjectSize)
                throws LiveClusterException
```
Constructor for GroupPropagator.

Parameters:

group - the group name numNodes - total number of nodes for the group useCaching - cache states and messages in memory. The default writes objects to disk for http fetching.

ignoreObjectSize - ignore cache size limits on the engine by not serializing objects for size.

This should only be used when carefully managing message and state sizes.

Method Detail setNodeTasklet

```
public void setNodeTasklet(NodeTasklet np)
```
Sets the NodeTasklet for this Job. The NodeTasklet defines the Engine's processing of the node.

This value must be set.

Parameters:

np - an instance of the user-defined NodeTasklet

FIG. 91D getOptions

```
public final JobOptions getOptions()
```
Gets the predefined GroupPropagator options, so that they may be set. For example,

```
thisjob.getOptions().setJarFile("foo.jar");
```

Returns:

the JobOptions for this Job

--- setOptions

```
public final void setOptions(JobOptions options)
```
Sets the predefined options. All Jobs have a default JobOptions object, so it is not necessary to create a new one and set it. See getOptions for an example of setting individual options.

Parameters:

a - new JobOptions object

--- getGroupCommunicator

```
public GroupCommunicator getGroupCommunicator()
```
Gets the GroupCommunicator interface

Returns:

the GroupCommunicator for this GroupPropagator

---

FIG. 91E propagate

```
public java.lang.Object[] propagate(int stepId)
                         throws LiveClusterException
```
    Execute a propagation step. Every node in the group will execute the NodeTasklet with the step.

Parameters:

stepId - the propagation step

--- endSession

```
public void endSession()
            throws LiveClusterException
```
    End the job

---

| Overview | Package | Class | Tree | Deprecated | Index | Help |

PREV CLASS  NEXT CLASS          FRAMES  NO FRAMES

SUMMARY: INNER | FIELD | CONSTR | METHOD    DETAIL: FIELD | CONSTR | METHOD

*DataSynapse™ LiveCluster API Specification vR2_5_0_3_RC1*

FIG. 91F

*DataSynapse™ LiveCluster API*

*Specification vR2_5_0_3_RC1*

PREV NEXT      FRAMES NO FRAMES

---

Hierarchy For Package com.livecluster.tasklet.propagator

Package Hierarchies:

All Packages

---

Class Hierarchy

- class java.lang.Object
    - class com.livecluster.tasklet.propagator.GroupPropagator
    - class com.livecluster.tasklet.Tasklet (implements com.livecluster.core.tasklet.internal.ITasklet)
        - class com.livecluster.tasklet.propagator.NodeTasklet

Interface Hierarchy

- interface java.io.Serializable
    - interface com.livecluster.tasklet.propagator.GroupCommunicator

---

*DataSynapse™ LiveCluster API*

*Specification vR2_5_0_3_RC1*

PREV NEXT      FRAMES NO FRAMES

```
package dsfft;
import com.livecluster.tasklet.propagator.*;
import java.util.Properties;
import java.io.*;

/**
 * 3D FFT Benchmark.
 */
public class TestFFT { private static final String linebreak =
        System.getProperty("line.separator");
    private static final String usage =
        "Usage: TestFFT [-nn nnodes,] [-s size,] [-uc useCaching] " +
        "where " + linebreak +
        "  size is between 8 and 2048," + linebreak +
        "  nnodes is between 1 and 1024, and" + linebreak +
        "  useCaching is true or false";

private int _size = 128;
    private int _nnodes = 4;
    private boolean _useCaching = true;

private class MyException extends Exception {
        public MyException(String msg) {
            super(msg);
        }
    } private String _errMsg = "";
    private Throwable _endSessionException = null;

public static void main(String[] argv) {
        int status = 0;
        TestFFT me = new TestFFT();
        try {
            me.parseArgs(argv);
            me.run();
        } catch (MyException e) {
            System.err.println(e.getMessage());
            status = 1;
        } catch (Throwable t) {
            System.err.println(t);
            t.printStackTrace();
            status = 1;
        } finally {
            if (me._endSessionException != null) {
                System.err.println(me._endSessionException);
                me._endSessionException.printStackTrace();
                status = 1;
            }
        }
        System.exit(status);
    }
```

FIG. 93A

```
public void parseArgs(String[] argv) throws MyException {
    if (argv.length == 0) { // Try reading args from properties file.
        Properties props = new Properties();
        try {
            props.load(
                new FileInputStream("./properties/dsfft.properties"));
            _size = Integer.parseInt(props.getProperty("size"));
            _nnodes = Integer.parseInt(props.getProperty("nnodes"));
            _useCaching =
                Boolean.valueOf(props.getProperty("useCaching"))
                    .booleanValue();
        } catch (IOException e) {
            // Ignore. If we can't find the file, use the defaults.
        } catch (NumberFormatException e) {
            // Note: You'll also get here if "size" or "nnodes" is
            // missing from the file.
            throw new MyException("Error parsing properties file.");
        }
    } else if (argv.length % 2 == 0) {
        int i = 0;
        while (i < argv.length) {
            if (argv[i].equals("-s")) try {
                _size = Integer.parseInt(argv[i+1]);
            } catch (NumberFormatException e) {
                throw new MyException(usage);
            } else if (argv[i].equals("-nn")) try {
                _nnodes = Integer.parseInt(argv[i+1]);
            } catch (NumberFormatException e) {
                throw new MyException(usage);
            } else if (argv[i].equals("-uc")) {
                _useCaching =
                    Boolean.valueOf(argv[i+1]).booleanValue();
            } else {
                throw new MyException(usage);
            }
            i += 2;
        } // while (i < argv.length)
    } else {
        throw new MyException(usage);
    }
    if (_size < 8 || _size > 2048) {
        throw new MyException("Size must be between 32 and 2048.");
    }
    if (_nnodes < 1 || _nnodes > 1024) {
        throw new MyException("Nnodes must be between 1 and 1024.");
    }
    debug("size = " + _size + " nnodes = " + _nnodes + " useCaching = " +
        _useCaching);
} // parseArgs
```

FIG. 93B

```
public void run() throws Exception {
    GroupPropagator gp = null;
    try {
        gp = new GroupPropagator("dsfft3d", _nnodes,
                                 _useCaching, _useCaching);
        // When we use caching, we ignore object size.
        gp.setNodeTasklet(new NodeFft3d(_size));
        int step = 0;
        while (true) {
            Object[] results = gp.propagate(step);
            int status = checkResults(results);
            if (status == Result.CONTINUE) {
                step++;
            } else if (status == Result.ERROR) {
                throw new MyException(_errMsg);
            } else if (status == Result.DONE) {
                printResults(results);
                break;
            } else {
                throw new MyException("Illegal status " + status +
                                      " from checkResults");
            }
        } // while (true)
    } finally {
        if (gp != null) {
            try {
                gp.endSession();
            } catch (Throwable t) {
                _endSessionException = t;
            }
        }
    }
} // run private static void debug(String msg) {
    System.out.println(msg);
} private int checkResults(Object[] results) {
    if (results.length == 0) {
        _errMsg = "Empty array in checkResults";
        return Result.ERROR;
    }
    boolean done = false;
    boolean error = false;
    for (int i = 0; i < results.length; i++) {
        Result result = (Result)results[i];
        int status = result.getStatus();
        if (status == Result.CONTINUE) {
            if (done && !error) {
                _errMsg = "Unexpected continue. Entry: " + i
                    + linebreak + _errMsg;
                error = true;
            }
```

FIG. 93C

```
            } else if (status == Result.DONE) {
                if (i > 0 && !done && !error) {
                    _errMsg = "Unexpected done. Entry: " + i
                        + linebreak + _errMsg;
                    error = true;
                } else {
                    done = true;
                }
            } else if (status == Result.ERROR) {
                _errMsg = _errMsg + "Error on node " + i + ":" + linebreak
                    + result.getMessage() + linebreak;
                error = true;
            } else {
                _errMsg = _errMsg + "Bad status from node " + i + ": "
                    + status;
                error = true;
            }
        } // for
        if (error) return Result.ERROR;
        if (done) return Result.DONE;
        return Result.CONTINUE;
    } // checkResults(...)

private static void printResults(Object[] results) {
        for (int i = 0; i < results.length; i++) {
            Result result = (Result)results[i];
            String s = result.getMessage();
            if (s != null) {
                System.out.println(s);
            } else {
                System.out.println("Msg " + i + " null!");
            }
        }
    } // printResults(...)
}
```

FIG. 93D

```
package dsfft;

import java.io.Serializable;
import com.livecluster.tasklet.*;
import com.livecluster.tasklet.propagator.*;

public class NodeFft3d extends NodeTasklet { private int _size;
    private static final String linebreak =
        System.getProperty("line.separator");

private static class State implements Serializable { public int stage;

public int nx, ny, nz, n;
        public int nypn, nzpn;

public NativeBytes c, d, wk;

public Object subState;

public void clear() {
            if (c != null) c.clear();
            if (d != null) d.clear();
            if (wk != null) wk.clear();
            NativeBytes.freeAll();
        } protected void finalize() throws Throwable {
            clear();
        }
    } public NodeFft3d(int size) {
        _size = size;
    } public Object propagate(int nodeId, int stepId, GroupCommunicator gc)
        throws TaskletException { int numNodes = gc.getNumNodes();
        Xposer xposer = new Xposer(nodeId, numNodes, gc);

Result result = null;
        try {
            State s = (State)gc.getNodeState();
            if (s == null) {
                s = initState(xposer);
                WrapUtils.randomInit(s.c);
                WrapUtils.copy(s.c, s.d);
```

FIG. 94A

```
        // 2D fft on each slice
        WrapFft.mcfft2d(s.nx, s.ny, s.nzpn, 1, 1, s.nx, s.ny,
                        s.c, s.wk);
        s.stage = 1;
        s.subState = null;
    } // if (s == null)

switch (s.stage) {
    case 1:
        result = xposer.dtran312c(s.nx, s.ny, s.nz,
                                  s.c, s.wk, s.subState);
        if (result.getStatus() == Result.DONE) {
            s.stage = 2;
            s.subState = null;
            // drop through
        } else {
            break;
        }
    case 2:
        if (s.subState == null) {
            WrapFft.mcfft1d(s.nz, s.nx*s.nypn, s.c, s.nz, 1);
            WrapFft.mcfft1d(s.nz, s.nx*s.nypn, s.c, s.nz, -1);
        }
        result = xposer.dtran231c(s.nz, s.nx, s.ny,
                                  s.c, s.wk, s.subState);
        if (result.getStatus() == Result.DONE) {
            s.stage = 3;
            s.subState = null;
            // drop through
        } else {
            break;
        }
    case 3:
        WrapFft.mcfft2d(s.nx, s.ny, s.nzpn, -1, -1, s.nx, s.ny,
                        s.c, s.wk);
        result = new Result(Result.DONE);
        float[] results = WrapUtils.diff(s.d, s.c);
        result.setMessage("Node " + nodeId + ": " + //s.msg);
                          "diff " + results[0] +
                          ", rms " + results[1]);
        break;

default:
        throw new IllegalStateException("Illegal stage value: "
                                        + s.stage);
    } // switch (s.stage)
    int status = result.getStatus();
    if (status == Result.CONTINUE) {
        s.subState = result.getState();
        result.setState(null); // Don't want to send subState
        gc.setNodeState(s);
```

FIG. 94B

```
        } else {
            s.clear();
            if (status == Result.ERROR) {
                String msg = "Error in stage " + s.stage;
                String tmp = result.getMessage();
                if (tmp != null) {
                    msg += linebreak + tmp;
                }
                result.setMessage(msg);
            }
        }
    } catch (Throwable t) {
        result = new Result(t.toString());
    }
    return result;
} // propagate(...)

private State initState(Xposer xposer) throws Exception {
    State s = new State();

s.n = WrapFft.fftlen(_size, 1.0f);

s.nx = s.n;
    s.ny = s.n;
    s.nz = s.n;
    int[] nys = xposer.jdcomp(s.ny);
    s.nypn = nys[0];
    s.nzpn = s.nypn;

int sizeOfFloat = WrapUtils.getSizeOfFloat();
    int len = 2 * s.nx * s.ny * s.nzpn * sizeOfFloat;
    s.c = new NativeBytes(len);
    if (!s.c.validate()) {
        throw new Exception("Failed to allocate c. len = " + len);
    }
    s.d = new NativeBytes(len);
    if (!s.d.validate()) {
        throw new Exception("Failed to allocate d. len = " + len);
    }
    int lenw = 2 * s.nx * s.nypn * s.nzpn;
    int len1 = 4 * s.nx * s.nypn;
    if (len1 > lenw) lenw = len1;
    lenw *= sizeOfFloat;
    s.wk = new NativeBytes(lenw);
    if (!s.d.validate()) {
        throw new Exception("Failed to allocate wk. lenw = " + lenw);
    }
    return s;
} // initState(...)
}
```

FIG. 94C

```
package dsfft;

import java.io.Serializable;
import com.livecluster.tasklet.propagator.*;

/**
 * An assemblage of "almost static" methods for transposing distributed
 * arrays, but with the nodeId and numNodes as implicit (object-specific)
 * arguments.
 */
public class Xposer { private int _nodeId, _numNodes;
    private GroupCommunicator _gc;

private static final String linebreak =
        System.getProperty("line.separator");

public Xposer(int nodeId, int numNodes, GroupCommunicator gc) {
        _nodeId = nodeId; _numNodes = numNodes; _gc = gc;
    } public int[] jdcomp(int n) {
        int ntpn, nlive;
        ntpn = nlive = 0;
        int nrem = n % _numNodes;
        if (nrem > 0) {
            ntpn = (n/_numNodes) + 1;
            int nfull = n/ntpn;
            if (_nodeId >= nfull) {
                nlive = n - (ntpn*_nodeId);
                if (nlive < 0) nlive = 0;
            } else {
                nlive = ntpn;
            }
        } else {
            ntpn = n/_numNodes;
            nlive = ntpn;
        } int[] retval = {ntpn, nlive};
        return retval;
    } // jdcomp private static class Jtran23_State implements Serializable {
        public int pmax, step;
        public NativeBytes tile = null;

protected void finalize() throws Throwable {
            if (tile != null) {
                tile.clear();
            }
        }
    }
```

FIG. 95A

```
/**
 * Routine that supervises the actual tile exchange. What makes this
 * tricky is that "mySwap" may be on the same engine, in which case
 * the message is a shallow copy (pointer to the other node's memory).
 * However, we can't assume that the other node got a shallow copy too,
 * since one or the other of us may have moved since the last step.
 * The solution is to add one more step to the pipeline and do a
 * two-phase copy operation on the incoming tile. That is, we keep a
 * copy of the tile that we receive in step n and overwrite the
 * corresponding portion of the slab in step n+1. If the incoming tile
 * is already a deep copy, we just save a reference, but if it's shallow,
 * we make a deep copy, so the other guy can overwrite it safely in
 * the next step.
 */
public Result jtran23(int n, NativeBytes a, NativeBytes buf,
                      Object obj) {
    Result result = null;
    Jtran23_State s = null;
    if (_numNodes <= 1) {
        return new Result("Called jtran23 with numNodes = " + _numNodes);
    }
    int len = 4*n;
    if (obj == null) {
        int pmax = 1;
        while (pmax < _numNodes) pmax = 2*pmax;
        s = new Jtran23_State();
        s.pmax = pmax;
        s.step = 0;
    } else {
        s = (Jtran23_State)obj;
    }
    if (s.step > 1) { // start overwriting slab on third step
        int mySwap = _nodeId ^ (s.step - 1); // from time before last
        if (mySwap < _numNodes) {
            int offset = len*mySwap;
            NativeBytes tile = a.getRegion(offset, len);
            WrapUtils.copy(s.tile, tile);
        }
    }
    if (s.step == s.pmax) {
        if (s.tile != null) s.tile.clear();
        return Result.done;
    }
    if (s.step > 0) { // first step is send-only
        int mySwap = _nodeId ^ s.step; // from last time
        if (mySwap < _numNodes) {
            Object[] msgs = null;
            try {
                msgs = _gc.getMessages();
            } catch (Exception e) {
                return jtran23Error(s, "getMessages() exception in " +
                                    "Xposer.jtran23 Step: " +
                                    s.step + linebreak + e.toString());
            }
```

FIG. 95B

```
            if (msgs == null || msgs.length != 1) {
                return jtran23Error(s, "Corrupted message in " +
                                "Xposer.jtran23 Step: " + s.step);
            }
            NativeBytes tileIn = (NativeBytes)msgs[0];
            if (tileIn.isShallowCopy()) {
                if (s.tile == null) {
                    s.tile = new NativeBytes(len);
                }
                WrapUtils.copy(tileIn, s.tile);
            } else {
                if (s.tile != null) s.tile.clear();
                s.tile = tileIn;
            }
        } // if (mySwap <_numNodes)
    } // if (s.step > 0)
    if (s.step < s.pmax - 1) { // last step is receive-only
        int mySwap = _nodeId ^ (s.step + 1);
        if (mySwap < _numNodes) {
            int offset = len*mySwap;
            NativeBytes tile = a.getRegion(offset, len);
            try {
                _gc.sendMessage(mySwap, tile);
            } catch (Exception e) {
                return jtran23Error(s, "sendMessage() exception in " +
                                "Xposer.jtran23 Step: " +
                                s.step + linebreak + e.toString());
            }
        }
    }
    result = new Result(Result.CONTINUE, s);
    s.step++;
    return result;
} // jtran23(...)

private Result jtran23Error(Jtran23_State state, String msg) {
    if (state.tile != null) state.tile.clear();
    return new Result(msg);
} public Result dtran312c(int n1, int n2, int n3,
                        NativeBytes a, NativeBytes wk, Object state) {
    Result result = dtran132c(n1, n2, n3, a, wk, state);
    if (result.getStatus() == Result.DONE) {
        result = dtran213c(n1, n3, n2, a);
    }
    return result;
}
```

FIG. 95C

```
    public Result dtran231c(int n1, int n2, int n3,
                    NativeBytes a, NativeBytes wk, Object state) {
        if (state == null) {
            Result result = dtran213c(n1, n2, n3, a);
            if (result.getStatus() == Result.ERROR) {
                return result;
            }
        }
        return dtran132c(n2, n1, n3, a, wk, state);
    } public Result dtran132c(int n1, int n2, int n3,
                    NativeBytes a, NativeBytes wk, Object state) {
        return dtran132(2*n1, n2, n3, a, wk, state);
    } public Result dtran132(int n1, int n2, int n3,
                    NativeBytes a, NativeBytes wk, Object state) {
        int n2p = n2/_numNodes;
        int n3p = n3/_numNodes;
        if (state == null) {
            if (_numNodes == 1) {
                return WrapTrans.tran132(n1, n2, n3, a, wk);
            }
            Result result = WrapTrans.tran132(n1*n2p, _numNodes, n3p, a, wk);
            if (result.getStatus() == Result.ERROR) {
                return result;
            }
        } // if (state == null)
        Result result = jtran23(n1*n2p*n3p, a, wk, state);
        if (result.getStatus() == Result.DONE) {
            result = WrapTrans.tran132(n1, n2p, n3, a, wk);
        }
        return result;
    } // dtran132(...)

public Result dtran213c(int n1, int n2, int n3, NativeBytes a) {
        int[] n3s = jdcomp(n3);
        int n3live = n3s[1];
        return WrapTrans.tran213c(n1, n2, n3live, a);
    }
}
```

FIG. 95D

```
package dsfft;
import java.io.*;
import java.util.*;

/**
 * Objects of this class are java proxies for memory segments that are
 * allocated and maintained by native code.
 * The read/writeExternal methods transfer raw/bytes to and from native
 * memory.
 * <P>
 * The class maintains a pool of allocated segments that it attempts to
 * reuse in order to economize on memory allocation/deallocation in the
 * native code.
 * The pooling scheme is very primitive - basically, just a static vector
 * of segments that have been previously allocated and released (via clear()).
 * Before allocating a new segment, the constructor checks to see if a
 * segment of the requested size is already available.
 * Also, in case an attempt to allocate memory in the native code fails, it
 * frees all the segments in the pool.
 * It makes no attempt to resize existing segments or to free
 * segments selectively.
 * <P>
 * This scheme is suitable for applications like dsfft that would otherwise
 * allocate and deallocate "tiles" of the same size repeatedly during the
 * course of a single job.
 * <P>
 * A static call, freeAll(), is provided for the caller to free all the
 * memory in the pool.
 * The caller is expected to call clear() on any object as soon as that
 * object is no longer needed, and to call freeAll() at the end of the job.
 * The caller must be careful to avoid memory leaks, since any object that
 * has not been cleared before the call to freeAll() will not be freed.
 * Note also that the getRegion() method creates shallow copies without
 * any reference counting - it is the caller's responsibility not to create
 * dangling pointers by calling clear() with shallow copies outstanding.
 * (It's safe to call clear() on a shallow copy; it does nothing.)
 * <P>
 * Also, although the implementation is thread-safe, if more than one job
 * is running concurrently (i.e., in case tasks from different
 * jobs interleave on the same JVM), there may be some "thrashing," since
 * one job can call freeAll() while another is running.
 */
public class NativeBytes implements Externalizable {

//private static final long serialVersionUID = -6823549167298762805L;

private static final int bufferSize = 4096;

static { // Force load/initialize dll.
        WrapUtils.getInstance();
    } private long _pointer = 0;
    private long _size = 0;
    private boolean _isShallowCopy;
```

FIG. 96A

```
private static class Record {
    public Record(long p, long s) {
        pointer = p; size = s;
    }
    public long pointer;
    public long size;
} private static ArrayList pool = new ArrayList();

public NativeBytes() {} public NativeBytes(long size) {
    synchronized (ArrayList.class) {
        // First, see if we've got one of the right size in the pool.
        Iterator iter = pool.iterator();
        while (iter.hasNext()) {
            Record r = (Record)iter.next();
            if (r.size == size) {
                _pointer = r.pointer;
                iter.remove();
                break;
            }
        }
        // If not, try to allocate a new one.
        if (_pointer == 0) {
            _pointer = allocate(size);
        }
        // If that fails, free everything in the pool,
        // and try one last time.
        if (_pointer == 0) {
            freeAll();
            _pointer = allocate(size);
        }
        if (_pointer != 0) {
            _size = size;
            _isShallowCopy = false;
        }
    } // synchronized(ArrayList.class)
} private NativeBytes(long pointer, long offset, long size) {
    _pointer = pointer + offset;
    _size = size;
    _isShallowCopy = true;
} public boolean validate() {
    return _pointer != 0;
} public long getPointer() {
    return _pointer;
}
```

FIG. 96B

```java
public long getSize() {
    return _size;
} public boolean isShallowCopy() {
    return _isShallowCopy;
} public byte getByte(long i) {
    if (i < 0 || i > _size - 1) {
        throw new IllegalArgumentException("Bad index " + i +
                                            " in getByte() size = "
                                            + _size);
    }
    return getByte(i, _pointer);
} public int getInt(long i) {
    if (i < 0 || 4*i > _size - 1) {
        throw new IllegalArgumentException("Bad index " + i +
                                            " in getInt() size = "
                                            + _size);
    }
    return getInt(i, _pointer);
} public void clear() {
    synchronized (NativeBytes.class) {
        if (_pointer != 0 && !_isShallowCopy) {
            pool.add(new Record(_pointer, _size));
            _pointer = 0;
            _size = 0;;
        }
    }
} protected void finalize() throws Throwable {
    clear();
} public NativeBytes getRegion(long offset, long size) {
    if (_pointer == 0 || (offset + size > _size)) {
        return null;
    }
    return new NativeBytes(_pointer, offset, size);
}
```

FIG. 96C

```
public static synchronized void freeAll() {
    Iterator iter = pool.iterator();
    while (iter.hasNext()) {
        Record r = (Record)iter.next();
        free(r.pointer);
        iter.remove();
    }
} public void readExternal(ObjectInput in)
    throws ClassNotFoundException, IOException {
    long ltmp = (long)in.readLong();
    _pointer = allocate(ltmp);
    if (_pointer != 0) {
        long count = 0;
        byte[] buf = new byte[bufferSize];
        while (count < ltmp) {
            int tmp = in.read(buf);
            if (tmp < 0) {
                clear();
                throw new IOException("Too few bytes in readExternal");
            } else if (count + tmp > ltmp) {
                clear();
                throw new IOException("Too many bytes in readExternal");
            }
            writeBytes(buf, _pointer + count, tmp);
            count += tmp;
        } // while (count < size)
        if (in.read() != -1) {
            clear();
            throw new IOException("Bytes remaining in readExternal");
        }
        _size = ltmp;
    } // if (_pointer != 0)
} // readExternal public void writeExternal(ObjectOutput out)
    throws IOException {
    byte[] buf = new byte[bufferSize];
    out.writeLong(_size);
    long count = 0;
    while (count < _size) {
        long ltmp = _size - count;
        int tmp = (ltmp < bufferSize) ? (int)ltmp : bufferSize;
        readBytes(buf, _pointer + count, tmp);
        out.write(buf, 0, tmp);
        count += tmp;
    } // while (count < _size)
} // writeExternal
```

FIG. 96D

```
    public String toString() {
        return "pointer = " + _pointer + " size = " + _size +
            ((_isShallowCopy) ? " IS " : " is NOT ") + "shallow copy";
    } private static native long allocate(long size);
    private static native byte getByte(long index, long ptr);
    private static native int getInt(long index, long ptr);
    private static native int free(long ptr);
    private static native void writeBytes(byte[] buf, long ptr, long count);
    private static native void readBytes(byte[] buf, long ptr, long count);
}
```

FIG. 96E

```
package dsfft;

public class WrapUtils { private static WrapUtils singleton;

private WrapUtils() {} static {
        System.loadLibrary("dsfft");
        singleton = new WrapUtils();
    } public static WrapUtils getInstance() {
        return singleton;
    } public static int randomInit(NativeBytes b) {
        return randomInit(b.getPointer(), b.getSize());
    } private static native int randomInit(long ptr, long size);

public static int indexInit(NativeBytes b) {
        return indexInit(0, b);
    } public static int indexInit(int start, NativeBytes b) {
        return indexInit(start, b.getPointer(), b.getSize());
    } private static native int indexInit(int start, long ptr, long size);

public static int copy(NativeBytes source, NativeBytes target) {
        long srcSize = source.getSize();
        long tarSize = target.getSize();
        if (srcSize != tarSize) {
            throw new IllegalArgumentException("Size mismatch in copy: "
                                   + srcSize + " v. " + tarSize);
        } else if (srcSize > 0) {
            return copy(source.getPointer(), target.getPointer(), srcSize);
        } else {
            return 0;
        }
    } private static native int copy(long srcPtr, long tarPtr, long size);

public static int swap(NativeBytes a, NativeBytes b) {
        long aSize = a.getSize();
        long bSize = b.getSize();
        if (aSize != bSize) {
            throw new IllegalArgumentException("Size mismatch in swap: "
                                   + aSize + " v. " + bSize);
```

FIG. 97A

```
        } else if (aSize > 0) {
            return swap(a.getPointer(), b.getPointer(), aSize);
        } else {
            return 0;
        }
    } private static native int swap(long aPtr, long bPtr, long size);

public static float[] diff(NativeBytes a, NativeBytes b) {
        long aSize = a.getSize();
        long bSize = b.getSize();
        if (aSize != bSize) {
            throw new IllegalArgumentException("Size mismatch in diff: "
                                        + aSize + " v. " + bSize);
        } else if (aSize > 0) {
            return diff(a.getPointer(), b.getPointer(), aSize);
        } else {
            return new float[] {0f, 0f};
        }
    } private static native float[] diff(long aPtr, long bPtr, long size);

public static native int getSizeOfFloat();
}
```

FIG. 97B

```
package dsfft;

public class WrapTrans { public static Result tran213c(int n1, int n2, int n3, NativeBytes a) {
        int status = tran213c(n1, n2, n3, a.getPointer(), a.getSize());
        if (status == 0) {
            return Result.done;
        } else {
            return new Result("Array size mismatch in tran213c: " +
                              n1 + " X " + n2 + " X " + n3 + " v. " +
                              a.getSize());
        }
    } private static native int tran213c(int n1, int n2, int n3,
                                       long aPtr, long size);

public static Result tran132(int n1, int n2, int n3,
                                 NativeBytes a, NativeBytes wk) {
        int status = tran132(n1, n2, n3, a.getPointer(), wk.getPointer(),
                             a.getSize(), wk.getSize());
        if (status == 0) {
            return Result.done;
        } else {
            return new Result("Array size mismatch in tran132: " +
                              n1 + " X " + n2 + " X " + n3 +
                              " v. " + a.getSize() + ", " + wk.getSize());
        }
    } private static native int tran132(int n1, int n2, int n3,
                                      long aPtr, long wkPtr,
                                      long aSize, long wkSize);

```
package dsfft;

public class WrapFft { static { // Force load/initialize dll.
        WrapUtils.getInstance();
    } public static native int fftlen(int size, float pad);

public static int mcfft2d(int nx, int ny, int np,
                              int isignx, int isigny,
                              int ldx, int ldy,
                              NativeBytes a, NativeBytes sa) {
        long aSize = a.getSize();
        long saSize = sa.getSize();
        return mcfft2d(nx, ny, np, isignx, isigny, ldx, ldy,
                       a.getPointer(), sa.getPointer(),
                       a.getSize(), sa.getSize());
    } private static native int mcfft2d(int nx, int ny, int np,
                                      int isignx, int isigny,
                                      int ldx, int ldy,
                                      long aPtr, long saPtr,
                                      long aSize, long saSize);

public static int mcfft1d(int ldz, int m,
                              NativeBytes z, int n, int isign) {
        return mcfft1d(ldz, m, z.getPointer(), n, isign, z.getSize());
    } private static native int mcfft1d(int ldz, int m, long zPtr,
                                      int n, int isign, long size);
}
```

FIG. 99

```java
package dsfft;

import java.io.Serializable;

/**
 * A struct to hold the result from a method that may be re-entered during
 * successive steps in a Propagator session.
 */
public class Result implements Serializable { public static final int ERROR = -1;
    public static final int CONTINUE = 0;
    public static final int DONE = 1;

public static final Result done = new Result(DONE);
    public static final Result cont = new Result(CONTINUE);

private int _status;
    private String _message;
    private Object _state;

public Result(int status) {
        _status = status; _state = null; _message = null;
    } public Result(String errorMsg) {
        _status = ERROR; _state = null; _message = errorMsg;
    } public Result(int status, Object state) {
        _status = status; _state = state; _message = null;
    } public void setStatus(int status) {
        _status = status;
    } public void setMessage(String message) {
        _message = message;
    } public void setState(Object state) {
        _state = state;
    } public int getStatus() {
        return _status;
    } public String getMessage() {
        return _message;
    } public Object getState() {
        return _state;
```

FIG. 100A

```
    } public String toString() {
        String s = null;
        switch (_status) {
        case ERROR:
            s = "ERROR";
            break;
        case CONTINUE:
            s = "CONTINUE";
            break;
        case DONE:
            s = "DONE";
            break;
        }
        if (_message != null) {
            s += " " + _message;
        }
        return s;
    }
}
```

FIG. 100B

USING EXECUTION STATISTICS TO SELECT TASKS FOR REDUNDANT ASSIGNMENT IN A DISTRIBUTED COMPUTING PLATFORM

CROSS-REFERENCE TO RELATED APPLICATIONS

This application is a continuation-in-part of the following U.S. and PCT patent applications: (i) PCT/US02/03218, Distributed Computing System, filed Feb. 4, 2002; (ii) Ser. No. 09/583,244, Methods, Apparatus, and Articles-of-Manufacture for Network Based Distributed Computing, filed May 31, 2000 now U.S. Pat. No. 6,757,730; (iii) Ser. No. 09/711,634, Methods, Apparatus and Articles-of-Manufacture for Providing Always-Live Distributed Computing, filed Nov. 13, 2000; (iv) Ser. No. 09/777,190, Redundancy-Based Methods, Apparatus and Articles-of-Manufacture for Providing Improved Quality-of-Service in an Always-Live Distributed Computing Environment, filed Feb. 2, 2001; (v) Ser. No. 60/266,185, Methods, Apparatus and Articles-of-Manufacture for Network-Based Distributed Computing, filed Feb. 2, 2001, now published as WO0188708; and (vi) Ser. No. 10/222,337, Distributed Data Propagator, filed Aug. 16, 2002. Each of the aforementioned applications (i)–(vi) is hereby incorporated by reference herein.

FIELD OF THE INVENTION

The present invention relates generally to the field of high-performance computing ("HPC"); more specifically, to systems and techniques for distributed and/or parallel processing; and still more specifically, to novel adaptive scheduling techniques for use in distributed computing systems.

BACKGROUND OF THE INVENTION

HPC has long been a focus of both academic research and commercial development, and the field presents a bewildering array of standards, products, tools, and consortia. Any attempt at comparative analysis is complicated by the fact that many of these interrelate not as mutually exclusive alternatives, but as complementary component or overlapping standards.

Probably the most familiar, and certainly the oldest, approach is based on dedicated supercomputing hardware. The earliest supercomputers included vector-based array processors, whose defining feature was the capability to perform numerical operations on very large data arrays, and other SIMD (Single-Instruction, Multiple-Data) architectures, which essentially performed an identical sequence of instructions on multiple datasets simultaneously. More recently, multiple-instruction architectures, and especially SMPs (Symmetric Multi-Processors), have tended to predominate, although the most powerful supercomputers generally combine features of both.

With dramatic improvements in the processing power and storage capacity of "commodity" hardware and burgeoning network bandwidth, much of the focus has shifted toward parallel computing based on loosely-coupled clusters of general-purpose processors, including clusters of network workstations. Indeed, many of the commercially available high-performance hardware platforms are essentially networks of more or less generic processors with access to shared memory and a high-speed, low latency communications bus. Moreover, many of the available tools and standards for developing parallel code are explicitly designed to present a uniform interface to both multi-processor hardware and network clusters. Despite this blurring around the edges, however, it is convenient to draw a broad dichotomy between conventional hardware and clustering solutions, and the discussion below is structured accordingly.

Conventional Hardware solutions

Typical commercial end-users faced with performance bottlenecks consider hardware solutions ranging from mid- to high-end SMP server configurations to true "supercomputers." In practice, they often follow a tortuous, incremental migration path, as they purchase and outgrow successively more powerful hardware solutions.

The most obvious shortcoming of this approach is the visible, direct hardware cost, but even more important are the indirect costs of integration, development, administration, and maintenance. For example, manufacturers and resellers generally provide support at an annual rate equal to approximately 20–30% of the initial hardware cost. Moreover, the increase in physical infrastructure requirements and the administrative burden is much more than linear to the number of CPUs.

But by far the most important issue is that each incremental hardware migration necessitates a major redevelopment effort. Even when the upgrade retains the same operating system (e.g., from one Sun Solaris™ platform to another), most applications require substantial modification to take advantage of the capabilities of the new target architecture. For migrating from one operating system to another (e.g., from NT™ or Solaris™ to Irix™), the redevelopment cost is typically comparable to that of new development, but with the additional burden of establishing and maintaining an alternative development environment, installing and testing new tools, etc. Both development and administration require specialized skill sets and dedicated personnel.

In sum, other indirect costs often total 7 to 9× direct hardware costs, when personnel, time-to-market, and application redevelopment costs are taken into account.

Clusters, Grids, and Virtual Supercomputers

The basic idea of bundling together groups of general-purpose processors to attack large-scale computations has been around for a long time. Practical implementation efforts, primarily within academic computer science departments and government research laboratories, began in earnest in the early 1980s. Among the oldest and most widely recognized of these was the Linda project at Yale University, which resulted in a suite of libraries and tools for distributed parallel processing centered around a distributed, shared memory model.

More elaborate and at a somewhat higher level than Lnda, but similar in spirit, PVM (for Parallel Virtual Machine) provided a general mechanism-based on a standard API and messaging protocol for parallel computation over networks of general-purposes processors. More recently, MPI (the Message Passing Interface) has gained ground. Although they differ in many particulars, both are essentially standards that specify an API for developing parallel algorithms and the behavioral requirements for participating processors. By now, libraries provide access to the API from C and/or Fortran. Client implementations are available for nearly every operating system and hardware configuration.

Grid Computing represents a more amorphous and broad-reaching initiative—in certain respects, it is more a philosophical movement than an engineering project. The overarching objective of Grid Computing is to pool together heterogeneous resources of all types (e.g., storage, processors, instruments, displays, etc.), anywhere on the network, and make them available to all users. Key elements of this vision include decentralized control, shared data, and distributed, interactive collaboration.

A third stream of development within high-performance distributed computing is loosely characterized as "clustering." Clusters provide HPC by aggregating commodity, off-the-shelf technology (COTS). By far the most prominent clustering initiative is Beowulf, a loose confederation of researchers and developers focused on clusters of Linux-based PCs. Another widely recognized project is Berkeley NOW (Network of Workstations), which has constructed a distributed supercomputer by linking together a heterogeneous collection of Unix and NT workstations over a high-speed switched network at the University of California.

There is considerable overlap among these approaches. For example, both Grid implementations and clusters frequently employ PVM, MPI, and/or other tools, many of which were developed initially to target dedicated parallel hardware. Nor is the terminology particularly well defined; there is no clear division between "grids" and "clusters," and some authors draw a distinction between "clusters" or dedicated processors, as opposed to "NOWs" (Networks of Workstations), which enlist part-time or intermittently available resources.

Clusters and Grids as Enterprise Solutions

The vast majority of clusters and Grid implementations are deployed within large universities and Government research laboratories. These implementations were specifically developed as alternatives to dedicated supercomputing hardware, to address the kinds of research problems that formed the traditional domain of supercomputing. Consequently, much of the development has focused on emulating some of the more complex features of the parallel hardware that are essential to address these research problems.

The earliest commercial deployments also targeted traditional supercomputing applications. Examples include: hydrodynamics and fluid-flow, optics, and manufacturing process control. In both research and commercial settings, clustering technologies provide at least a partial solution for two of the most serious shortcomings of traditional supercomputing: (1) up-front hardware cost, and (2) chronic software obsolescence (since the system software to support distributed computing over loosely coupled networks must, out of necessity, provide substantial abstraction of the underlying hardware implementation).

However, clusters and grid implementations share, and in many cases, exacerbate, some of the most important weaknesses of supercomputing hardware solutions, particularly within a commercial enterprise environment. Complex, low-level APIs necessitate protracted, costly development and integration efforts. Administration, especially scheduling and management of distributed resources, is burdensome and expensive. In many cases, elaborate custom development is needed to provide fault tolerance and reliability. Both developers and administrators require extensive training and special skills. And although clusters offer some advantages versus dedicated hardware with respect to scale, fragility and administrative complexity effectively impose hard limits on the number of nodes—commercial installations with as many as 50 nodes are rare, and only a handful support more than 100.

These weaknesses have become increasingly apparent, as commercial deployments have moved beyond traditional supercomputing applications. Many of the most important commercial applications, including the vast majority of process-intensive financial applications, are "naturally parallel." That is, the computation is readily partitioned into a number of more or less independent sub-computations. Within financial services, the two most common sources of natural parallelism are portfolios, which are partitioned by instrument or counterparty, and simulations, which are partitioned by sample point. For these applications, complex features to support process synchronization, distributed shared memory, and inter-process communication are irrelevant—a basic "compute server" or "task farm" provides the ideal solution. The features that are essential, especially for time-sensitive, business-critical applications, are fault-tolerance, reliability, and ease-of-use. Unnecessary complexity drives up development and administration costs, undermines reliability, and limits scale.

HPC in the Financial Services Industry

The history of HPC within financial services has been characterized by inappropriate technology. One of the earliest supercomputing applications on Wall Street was Monte Carlo valuation of mortgage-backed securities (MBS)—a prototypical example of "naturally parallel" computation. With deep pockets and an overwhelming need for computing power, the MBS trading groups adopted an obvious, well-established solution: supercomputing hardware, specifically MPPs (Massively Parallel Processors).

Although this approach solved the immediate problem, it was enormously inefficient. The MPP hardware that they purchased was developed for research applications with intricate inter-process synchronization and communication requirements, not for naturally parallel applications within a commercial enterprise. Consequently, it came loaded with complex features that were completely irrelevant for the Monte Carlo calculations that the MBS applications required, but failed to provide many of the turnkey administrative and reliability features that are typically associated with enterprise computing. Protracted in-house development efforts focused largely on customized middleware that had nothing to do with the specific application area and resulted in fragile implementations that imposed an enormous administrative burden. Growing portfolios and shrinking spreads continued to increase the demand for computing power, and MPP solutions wouldn't scale, so most of these development efforts have been repeated many times over.

As computing requirements have expanded throughout the enterprise, the same story has played out again and again—fixed-income and equity derivatives desks, global credit and market risk, treasury and Asset-Liability Management (ALM), etc., all have been locked in an accelerating cycle of hardware obsolescence and software redevelopment.

More recently, clustering and grid technologies have offered a partial solution, in that they reduce the upfront hardware cost and eliminate some of the redevelopment associated with incremental upgrades. But they continue to suffer from the same basic defect—as an outgrowth of traditional supercomputing, they are loaded with irrelevant features and low-level APIs that drive up cost and complexity, while failing to provide turnkey support for basic enterprise requirements like fault-tolerance and central administration.

The invention, as described below, provides an improved, Grid-like distributed computing system that addresses the practical needs of real-world commercial users, such as those in the financial services and energy industries.

BRIEF SUMMARY OF THE INVENTION

The invention provides an off-the-shelf product solution to target the specific needs of commercial users with naturally parallel applications. A top-level, public API provides a simple "compute server" or "task farm" model that dramatically accelerates integration and deployment. By providing built-in, turnkey support for enterprise features like fault-tolerant scheduling, fail-over, load balancing, and remote, central administration, the invention eliminates the need for customized middleware and yields enormous, ongoing savings in maintenance and administrative overhead.

Behind the public API is a layered, peer-to-peer (P2P) messaging implementation that provides tremendous flexibility to configure data transport and overcome bottlenecks, and a powerful underlying SDK based on pluggable components and equipped with a run-time XML scripting facility that provides a robust migration path for future enhancements.

Utilizing the techniques described in detail below, the invention supports effectively unlimited scaling over commoditized resource pools, so that end-users can add resources as needed, with no incremental development cost. The invention seamlessly incorporates both dedicated and intermittently idle resources on multiple platforms (Windows™, Unix, Linux, etc.). And it provides true idle detection and automatic fault-tolerant rescheduling, thereby harnessing discrete pockets of idle capacity without sacrificing guaranteed service levels. (In contrast, previous efforts to harness idle capacity have run low-priority background jobs, restricted utilization to overnight idle periods, or imposed intrusive measures, such as checkpointing.) The invention provides a system that can operate on user desktops during peak business hours without degrading performance or intruding on the user experience in any way.

A key aspect of the present invention relates to "pull-based" (i.e., resources (Engines) poll the server (Broker) for work, and submitters (Drivers) poll the Broker for results) adaptive scheduling of tasks in a coarse-grained parallel or grid-based computing framework.

According to one aspect of adaptive scheduling, Drivers submit Jobs to a Broker. Each Job consists of one or more Tasks, which may be executed in any order. The Broker maintains a queue for Tasks within each active Job. When a Driver submits the first Task within a Job, the Broker creates a Waiting Task List for that Job, then adds this list to the appropriate Job List, according to the Job's priority. (Thus, each Job List is list of Task Lists.) As the Driver submits additional Tasks to the Broker, the Broker appends them to the end of the Waiting Task List.

Whenever an Engine becomes available, it polls the Broker to request work. The Broker determines which Job should receive service (using priorities and/or discriminators, as described below), then assigns the Task at the front of that Job's Waiting Task List to the Engine. Once it has been assigned to an Engine, the Broker moves the Task from the Waiting Task List to the Pending Task List; the Pending Task List contains all the Tasks in the Job that have been assigned to Engines.

When an Engine completes a Task, it notifies the Broker, and the Broker searches both the Pending and Waiting Task Lists for the corresponding Job. If the Task appears on either list, the Broker removes it from both, and adds it to the Completed Task List. (If the Task does not appear on either list, it is a redundant Task that has already completed on another Engine, and the Broker ignores it; however, the Broker may also free or restart engines that are currently processing redundant instances of the same Task.) When the submitting Driver polls for results, the Broker returns the entries from the Completed Task List and clears them from the list.

Each Job has an associated priority: a priority is attached to it at inception, and the priority may be changed while the Job is running. The number of priorities is fixed at some number, N, greater than or equal to 1. (In the current LiveCluster™ release, N=11.) As indicated above, the Broker maintains a Job List corresponding to each priority level.

A configuration setting selects between Serial and Interleaved Priority Execution. Under Serial Priority Execution, the Broker services the priority lists sequentially. That is, the Broker always services the non-empty Job list of highest priority. Under Interleaved Priority Execution, the Broker provides interleaved service to all non-empty Job Lists, so that lower priority lists continue to receive some level of service even when higher priority Jobs are active.

The proportion of service that the Broker allocates to competing priority lists is based on an N-tuple of non-negative integer Priority Weights, where N is the number of distinct priorities. In particular, if the N-tuple of Priority Weights is given by (w1, w2, . . . , wN), then the Broker distributes priority-1 Tasks until either the priority-1 list is empty, or it has distributed w1 Tasks. Then it distributes priority-2 Tasks until either the priority-2 list is empty or it has distributed w2 Tasks, and so forth, until it has serviced all N priority lists, at which point the process repeats.

Similarly, the Broker may be configured to provide either Serial or Interleaved Job Execution for Jobs of the same priority. Under Serial Job Execution, Jobs of the same priority receive strict sequential service; the first Job submitted completes before the next begins. Under Interleaved Job Execution, the Broker provides round-robin service to all Jobs of a given priority, regardless of the order in which they were submitted.

Redundant scheduling strategies may be employed to provide guaranteed service levels and reliable Job throughput when resources and/or Tasks are heterogeneous. Redundant scheduling addresses a weakness of the basic scheduling algorithm, as described above, namely: A relatively small number of long-running Tasks, distributed to less capable processors, can significantly delay or prevent Job completion. The basic idea is to launch redundant instances of bottleneck or long-running Tasks. For redundant Tasks, the Broker accepts the first result returned by any Engine, and cancels the remaining instances. A configurable parameter determines the maximum number of redundant instances of a given Task that the Broker will distribute.

In accordance with a preferred embodiment of the invention, two mechanisms are provided for redundant scheduling of long-running Tasks. First, a Maximum Task Time may be associated with any Job. The Broker schedules redundant instances of Tasks that fail to complete within the time limit. Second, one or more Rescheduling Strategies may become active after a (possibly Job- and/or Strategy-specific) percentage of Tasks within the Job have completed.

The Broker scans the Pending Task Lists for each active Job at regular intervals. Initially, rescheduling is driven solely by the Maximum Task Time for the Job. Once the percentage of completed Tasks reaches the threshold for a given Strategy, the Broker also compares the elapsed time for each pending Task against the time limit corresponding to that Strategy. If one or more of the limits is exceeded, the Broker adds a redundant instance of the Task to the Waiting Task List and resets the elapsed time for that Task to zero.

(The accumulation of elapsed time for the Task begins again when the Broker assigns the redundant instance to an Engine.)

A configuration setting determines whether the Broker places redundant Task instances at the front or the back of the Waiting Task List, that is, whether redundant Tasks are distributed before or after other waiting Tasks.

Each Redundant Scheduling Strategy is specified via a procedure that returns a dynamically varying time limit as a function of data maintained by the Broker, typically including Job-specific Task duration statistics. (The Broker tracks the mean and standard deviation of Task completion times for each active Job.) Important examples include the following:

The Percent Completed Strategy, which returns the maximum integer (effectively infinite, so that there is no active limit) until the number of waiting Tasks, as percentage of the total number of Tasks within the Job, falls below a configurable threshold, after which it returns the mean completion time;

The Average Strategy, which returns the product of the mean completion time and a configurable floating-point multiplier. That is, this strategy launches redundant Task instances when the elapsed time exceeds a configurable multiple of the mean completion time; and, The Standard Deviation Strategy, which returns the sum of the mean and a configurable multiple of the standard deviation of the completion times. That is, it launches redundant Task instances when the elapsed time exceeds the mean by a configurable multiple of the standard deviation.

Because variation in Task sizes can undermine the fairness and efficiency of the basic Task-based priority scheduling scheme, the invention also contemplates use of alternative measures of resource consumption. Several modifications are available to substitute alternatives for the basic Task count as a measure of computational resource consumption within the invention's priority-based Job scheduler.

For each running Job, the Broker may track the total aggregate processing time on the Engines that has been consumed by Tasks within the Job, and allocate service to the Job queues based on processing time, rather than the number of Tasks that have been scheduled.

To account for heterogeneous processing capabilities, the Broker may weight the actual processing times by some measure of the processing power of the corresponding Engines. For example, the Broker may schedule a standard benchmark performance measurement (e.g., the LINPAC benchmark, or some other representative benchmark) on each Engine at regular intervals, or each time the Engine logs in, and multiply the actual processing times by the resulting performance ratings to convert elapsed times to a more accurate measure of computation.

Finally, some or all of the Engines may report to the Broker a measure of realized CPU consumption (e.g., as reported by the local operating system) upon Task completion and/or periodically for running Tasks, and the Broker may incorporate these measurements in the allocation of service. This is particularly useful in case the Engines are configured to run as background processes and/or to share CPU time with other processes that are running simultaneously.

Another aspect of the invention relates to adaptive polling. Engines poll the Broker whenever they are available to perform work. The polling request is either successful, and the Broker assigns a Task to the Engine, or it is not. Similarly, Drivers poll the Broker after they have submitted Jobs, to collect results. The request is either successful, and the Broker returns one or more results (possibly indirectly, by providing a locator or locators), or it is not.

Successful polling requests are effectively self-limiting, because they require additional action on the part of the polling entity—either collecting the Task input and performing the Task, or collecting the results, respectively. But the frequency of unsuccessful requests may be advantageously regulated to avoid overwhelming the Broker. Therefore, in response to each unsuccessful polling request, the Broker returns a message specifying the time interval after which the polling entity may submit another request.

The algorithm by which the Broker determines this time interval has two important features:

1. It is randomized in a range around an ideal target latency, to avoid "ringing." That is, a pseudo-random number generator is used to select values within a range of the target value, to avoid the situation in which deterministic patterns in the polling and response times result in highly synchronized message traffic, which might otherwise overwhelm the Broker and/or the communication network.

2. The target values are calculated using an adaptive, dynamic algorithm; the Broker keeps track of the number of actively polling entities, and varies the target latencies so as to maintain total aggregate polling rates within an optimal operating range. When more entities are active, the Broker increases the target latencies, and when fewer are active, it decreases them.

Typically, HTTP is the underlying transport protocol. In this case, the implementation may use the "Keep-Alive" feature of HTTP to reduce latencies for Task distribution and/or result retrieval. In particular, when an Engine polls for work and no Tasks are waiting, the HTTP connection may be held open until either a Task is ready, or the connection timeout is reached, in which case the Engine may poll again immediately. Exactly the same mechanism is applicable when Drivers poll for results. The Broker may track the number of open connections and stop holding connections open when the number reaches some limiting value.

Another aspect of the invention involves the use of Discriminators. Discriminators are essentially filters that can be attached to Tasks and/or Engines to impose selection criteria during the Broker's assignment of Tasks to Engines. When a Discriminator is attached to a Task, it restricts the class of Engines that are eligible to process that Task based on properties associated with the Engine, possibly including but not limited to: operating system, processor speed, RAM, free memory, local disk size, free disk, host name, number of CPUs on host machine, etc., together with any collection of user-defined properties that can either be tracked by the Broker or measured or detected on the Engine at runtime.

When a Discriminator is attached to an Engine, it restricts the class of Tasks that are eligible to run on that Engine based on properties associated with the Task, possibly including but not limited to: Task Id (assigned to Tasks within each Job sequentially), Job Id (a unique identifier attached to each Job by the Broker), Driver Id (a unique identifier attached to each active Driver), together with any collection of user-defined properties that can be assigned by the Broker or by the submitting application at runtime.

Discriminators modify the operation of the basic scheduling algorithm as follows: Before assigning any Task to an Engine, the Broker checks all Discriminators that are attached to either the Task or the Engine. If the Task/Engine pairing fails to satisfy any of the criteria imposed by any of the Discriminators, the Broker examines the next Task (as determined by the basic scheduling algorithm). This process continues until either the Broker assigns the first suitable Task to the Engine, or it exhausts the waiting Tasks, in which case the request fails, and no Task is assigned to the Engine.

Scoring Discriminators provide a variant of the basic Discriminator, and assign to each pairing of Task and Engine a numerical score, rather than an all-or-nothing (binary) determination of suitability. In this case, before assigning a Task to an Engine, the Broker checks some number of waiting Tasks (in the order determined by the basic scheduling algorithm) and selects the Task/Engine pairing with the highest score.

Scoring Discriminators may also impose a minimum-score restriction, so that no Task will be assigned to an Engine for which the score assigned to the resulting Task/Engine pairing is below the minimum threshold. In this case, the algorithm may be modified so that the Broker will continue to check additional waiting Tasks, beyond the specified number, if necessary, in order to find a first Task that yields a score above the minimum threshold.

In another modification of the basic scheduling algorithm, the Broker may maintain a queue of Engines that are available but that have not been assigned Tasks. In this case, the Broker may examine all combinations of waiting Tasks and available Engines and choose the pairing with the highest score. (This is particularly useful in connection with the HTTP Keep-Alive enhancement described above, in which case the queue of available Engines may coincide with those for which the connection is held open.) Typically, the Broker limits the size of the available Engine queue in order to limit the complexity of the assignment computation.

Programmatic APIs for defining Discriminators and attaching them to Tasks, Jobs, or Engines, may be provided in Java and/or C++. A primary feature of the Discriminator base class is an abstract function, to be defined by the programmer, that returns either a Boolean, in the case of a basic binary Discriminator, or a numerical score, in the case of a soft Discriminator. Alternatively, or in addition, an API may be provided in Java and/or C++ to define a Discriminator to act on all or a subset of Task/Engine pairings and register it directly with the Broker. Alternatively, or in addition to the programmatic APIs, administrative and/or scripting interfaces may be provided to define Discriminators and attach them to Tasks, Jobs, Engines, or Brokers.

Properties associated with Engines, Tasks, and Jobs may be "built-in," that is, defined or detected automatically by the remote system components (Drivers and Engines) or assigned automatically by the Broker. The list of Properties associated with each entity may be implemented as a hash table, i.e., a collection of key/value pairs. Programmatic and/or administrative APIs may also be provided to attach properties to Engines, Tasks, and/or Jobs, and/or to modify existing properties dynamically. Default mechanisms may be provided by the system and/or defined by the user to address the situation in which Discriminators are defined in terms of properties that have not been assigned explicitly to all relevant components.

Implementations may optimize performance by caching the property values associated with remote components (Drivers and Engines) on the Broker, so that the Broker may evaluate Discriminators that reference these properties without having to exchange additional messages with the remote components in order to ascertain the associated property values. This caching may be combined with an incremental update capability on the remote components so that they notify the Broker only when the values change.

A further general aspect of the invention relates to the use of adaptive scheduling to enhance reuse of cached data and/or minimize unnecessary network data transmissions. In accordance with this aspect of the invention, a TaskDataSet provides a simple API and scheduling mechanism to address multi-stage sequential computations within an adaptive, demand-driven scheduling context. The TaskDataSet concept is particularly useful for sequential computations on very large distributed data sets and to support caching and reuse of intermediate results on distributed processors. Using TaskDataSets improves efficiency not only by maximizing reuse of distributed input data (thereby minimizing data transfer), but also by facilitating reuse of intermediate state generated locally on the distributed resources.

A TaskDataSet comprises a collection of persistent TaskInputs. Typically, a TaskDataSet is associated with a sequence of one or more Jobs within a corresponding Tasking Session. Each Job within the Tasking Session shares the same set of TaskInputs (each of which defines a Task within the corresponding Job). Distinct Jobs within the session differ via their Tasklets; that is, they are equipped with distinct Tasklets, and thus may perform distinct computations and access Job-specific data. (As objects, the Tasklets may contain data as well as instructions.)

Jobs within a Tasking Session are scheduled just like other Jobs, and in particular, multiple Tasking Sessions can be active simultaneously and coexist seamlessly with other Jobs that are not part of any Tasking Session. However, whenever an Engine that has processed one or more TaskInputs from a TaskDataSet requests work and a Job within the corresponding session is active and eligible to receive service (i.e., based on execution history and the configuration of the priority-based scheduling scheme), the Server will, if possible, assign to that Engine a Task for which the Engine has already processed the corresponding TaskInput. That is, whenever the Server assigns a TaskInput from a TaskDataSet to an Engine, it checks to see if any pending Tasks correspond to a TaskInput that the Engine has processed previously (as part of a previous Job within the session) and if so, whether the TaskInput remains in the Engine's local cache. If so, the Server will assign such a Task to the Engine. Otherwise, the Server may assign the Engine another TaskInput from the TaskDataSet.

The TaskDataSet is therefore, in effect, a progressively distributed database of TaskInputs, with each successive Job within the session acting as a query or procedure on that database. As more Jobs run within the session, the inputs are distributed more widely across Engines.

In light of the above, generally speaking, and without intending to be limiting, one specific aspect of the invention relates to methods for operating a broker that manages the execution of jobs, each job having one or more associated tasks that can be executed in any order, such as the following: using the broker to track jobs by maintaining, for each active job, a list of associated: (i) waiting tasks that have not yet been assigned to a processing resource; (ii) pending tasks that have been assigned to at least one processing resource, but have not yet been completed by any processing resource; and (iii) completed tasks that have been completed by at least one processing resource; using the broker to maintain a priority for each active job; in response to an indication from a processing resource that the resource is available to accept task(s), using the broker to (i) select a job and (ii) assign at least one task associated with the selected job to the processing resource; and, in response to an indication from processing resource that the resource a task has completed its execution, using the broker to (i) identify the job with which the completed task is associated and (ii) update the identified job's associated task list(s). Maintaining lists of associated waiting, pending, and completed tasks may involve: (i) maintaining ordered lists of associated waiting, pending, and completed tasks; or (ii) maintaining FIFO queues of associated waiting and pending tasks. Using the broker to maintain a priority for each active job may involve storing, at the broker, a numeric priority for each active job, and may further involve updating the stored priority for one or more of the active job(s). Using the broker to update the identified job's associated task list(s) may involve: (i) searching the identified job's associated pending task list and, if the completed task appears on the pending task list, removing it from the list; or (ii) searching the identified job's associated pending and waiting task lists and, if the completed task appears on either list, removing it from both lists. Using the broker to update the identified job's associated task list(s) may further involve: determining whether the completed task does not appear on either of the identified job's waiting or pending task lists and, if the completed task does not appear on either list, identifying the completed task as an already-finished redundant task. The broker may then be used to free or restart computational resources that may be executing redundant instances of the already-finished redundant task. Using the broker to select a job may involve using a serial assignment strategy to select the highest-priority job that has associated waiting task(s). This may further involve, in the case that multiple jobs of the highest priority have associated waiting tasks: (i) using a serial assignment strategy to select the earliest-submitted of the highest-priority jobs that have associated waiting tasks; or (ii) using an interleaved assignment strategy to select, without favoritism, one of the highest-priority jobs that has associated waiting task(s). Using the broker to select a job may also involve: using an interleaved assignment strategy to select a job that has associated waiting task(s), whereby if multiple jobs have waiting task(s), the probability of selecting a given job is weighted in accordance with its priority relative to the priorities of other jobs with waiting task(s). Still further, using the broker to select a job may also involve using a redundant task assignment strategy, such as: using the broker to periodically scan the pending task list(s) of active job(s) to determine an elapsed time since assignment to a processing resource for each pending task; based, as least in part, on the elapsed time(s), identifying task(s) for redundant assignment to additional processing resource(s); and, for any task identified for redundant assignment, adding the task to the waiting task list for the job with which the identified pending task is associated. Adding the task to the waiting task list may involve: (i) adding the task to the back of the waiting task list for the job with which the identified pending task is associated, thereby allowing the job's other waiting tasks to be assigned to a processing resource before the redundant task is assigned to a processing resource; or (ii) adding the task to the front of the waiting task list for the job with which the identified pending task is associated, thereby requiring that the redundant task be assigned to a processing resource before the job's other waiting tasks. Using a redundant task assignment strategy may further involve: periodically computing, at the broker, statistical information regarding waiting, pending, and/or completed tasks; and using at least some of the computed statistical information in the identification of task(s) for redundant assignment. Periodically computing statistical information may involve computing at least one, two, three, or more of: (i) mean time-to-completion for completed task(s) associated with each active job; (ii) mean normalized time-to-completion for completed task(s) associated with each active job, preferably normalized to account for the capabilities of the processing resources on which the completed tasks execute; (iii) standard deviation of time-to-completion for completed task(s) associated with each active job; (iv) standard deviation of normalized time-to-completion for completed task(s) associated with each active job, normalized to account for the capabilities of the processing resources on which the completed tasks execute; (v) mean elapsed time for pending task(s) associated with each active job; (vi) standard deviation of elapsed time for pending task(s) associated with each active job; and/or (vii) fraction or percentage of waiting vs. pending task(s) associated with each active job.

Again, generally speaking, and without intending to be limiting, another specific aspect of the invention relates to methods for operating a task broker in a network-based distributed computing system, for example: receiving, from a computational resource, an indication of availability and, in response thereto, either (i) assigning one or more task(s) to the computational resource or (ii) indicating, to the computational resource, a first wait time, after which the computational resource may again indicate its availability to the broker; and receiving, from a job-submitting resource, an inquiry concerning the completion status of a job and, in response thereto, either (i) indicating, to the job-submitting resource, that the job is complete, or (ii) indicating, to the job-submitting resource, that the job is not yet complete and indicating a second wait time, after which the job-submitting resource may again inquire about the completion status of the job. Such methods may further involve selecting the first and/or second wait time(s) using a pseudo-random number generator. The distribution of the pseudo-random number generator may be dynamically adjusted in response to the number of resources in active communication with the broker.

Once again, generally speaking, and without intending to be limiting, another specific aspect of the invention relates to methods for operating a broker that assigns tasks to available processing resources, for example: determining, in response to an indication of availability received from a computing resource, whether the computing resource has an associated discriminator; if an associated discriminator is found, using the discriminator to eliminate from consideration task(s) that do not qualify for assignment to the computing resource; and, if any task(s) that qualify for assignment remain, employing a task assignment strategy to assign one of the qualified task(s) to the computing resource. Employing a task assignment strategy may involve: (i) using a serial assignment strategy to select a task associated with the highest-priority job; (ii) using an interleaved assignment strategy to select among the qualified task(s), whereby if there is more than one qualified task, the probability the of selecting a given task is weighted in accordance with a priority of a job with which the task is associated. Using the discriminator to eliminate task(s) that do not qualify for assignment may involve invoking a function, associated with the computing resource, that embodies the discriminator.

Still, generally speaking, and without intending to be limiting, another specific aspect of the invention relates to methods for assigning a tasks to available processing resources by, for example: determining, for each task awaiting assignment to a processing resource, whether the task has an associated discriminator and, if an associated discriminator is found, using the discriminator to determine whether the task qualifies for assignment to the available processing resource; and employing a task assignment strategy to select, from among the task(s) that qualify for assignment to the processing resource, a task for assignment to the processing resource. Employing a task assignment strategy may involve: (i) using a serial assignment strategy to select a qualified task associated with the highest-priority job; or (ii) using an interleaved assignment strategy to select among the qualified task(s), whereby if there is more than one qualified task, the probability of selecting a given task is weighted in accordance with a priority of a job with which the task is associated. Using the discriminator to determine whether the task qualifies for assignment to the available processing resource may involve invoking a function, associated with the task, that embodies the discriminator.

Yet again, generally speaking, and without intending to be limiting, another specific aspect of the invention relates to methods for minimizing unnecessary data communication in distributed computing systems by, for example: allowing available processing resources to communicate their availability to a task broker; and using the task broker to assign tasks to available computing resources; whereby at least some of the available processing resources, when communicating their availability to the broker, also communicate information concerning locally-cached data, which information is used by the broker to preferentially assign task(s) to processing resource(s) on which data needed by the task(s) is locally cached. Information concerning locally-cached data is preferably communicated to the broker via discriminator(s) associated with the available processing resource(s), which discriminator(s) return value(s) indicative of the overlap of data required by the task(s) and data locally cached at the available processing resource(s).

Again, generally speaking, and without intending to be limiting, another aspect of the invention relates to methods for assigning tasks to processing resources by, for example: (a) identifying a processing resource available to accept a task; (b) identifying task(s) that may be assigned to the processing resource; (c) determining which of the identified task(s) to assign to the processing resource based on consideration of at least two, three, four, or more of: (i) the operating system of the processing resource vs. the operating system requirements of the task; (ii) the available memory of the processing resource vs. the memory requirements of the task; (iii) the available disk space of the processing resource vs. the disk space requirements of the task; (iv) the security features of the processing resource vs. the security requirements of the task; (v) the speed of the processing resource vs. the processing demands of the task; and/or (vi) the availability of locally-cached data at the processing resource vs. the data set requirements of the task; and (d) repeating (a)–(c), as needed, to complete assignment of all tasks to one or more processing resources.

Still, generally speaking, and without intending to be limiting, another specific aspect of the invention relates to brokers that manage the execution of jobs, where each job has one or more associated tasks that can be executed in any order, and the broker includes, for example: a tracking module that, for each active job, tracks associated: (i) waiting tasks that have not yet been assigned to a processing resource; (ii) pending tasks that have been assigned to at least one processing resource, but have not yet been completed by any processing resource; and (iii) completed tasks that have been completed by at least one processing resource; and an adaptive scheduling module that maintains a priority for each active job and, in response to an indication of availability from a processing resource, selects a job and assigns at least one task associated with the selected job to the processing resource. The adaptive scheduling module may, in response to an indication from a processing resource that a task has completed its execution, identify the job with which the completed task is associated and update the identified job's associated task information. Updating associated task information may include determining whether the completed task was redundantly assigned to other processing resources and, if so, directing all resource(s) to which redundant instances of the task were assigned to cease execution. The tracking module may include lists or FIFO queues of waiting tasks, pending tasks, and completed tasks for each active job. The adaptive scheduling module may select: (i) the highest-priority job that has associated waiting task(s); or (ii) among alternative jobs in accordance with their relative priorities, such that the probability of selecting a given job is weighted to favor selection of higher-priority job(s), but does not preclude selection of lower-priority job(s). The adaptive scheduling module may also redundantly assign individual tasks to more than one processing resource by, for example: (i) periodically inventorying the pending task(s) of active job(s) to determine an elapsed time since assignment to a processing resource for each pending task and, if the elapsed time of any task exceeds a redundancy threshold, creating a redundant instance of the task and placing it in front of other waiting task(s) associated with the active job; or (ii) periodically inventorying the pending task(s) of active job(s) to determine an elapsed time since assignment to a processing resource for each pending task and, if the elapsed time of any task exceeds a redundancy threshold, creating a redundant instance of the task and placing it behind other waiting task(s) associated with the active job. The broker preferably tracks at least one, two, three, four, or more of: (i) mean time-to-completion for completed task(s) associated with each active job; (ii) mean normalized time-to-completion for completed task(s) associated with each active job, normalized to account for the capabilities of the processing resources on which the completed tasks execute; (iii) standard deviation of time-to-completion for completed task(s) associated with each active job; (iv) standard deviation of normalized time-to-completion for completed task(s) associated with each active job, normalized to account for the capabilities of the processing resources on which the completed tasks execute; (v) mean elapsed time for pending task(s) associated with each active job; (vi) standard deviation of elapsed time for pending task(s) associated with each active job; and (vii) fraction or percentage of waiting vs. pending task(s) associated with each active job.

Yet again, generally speaking, and without intending to be limiting, another aspect of the invention relates to a broker, for use in a distributed processing system, that: (i) receives jobs, comprised of one or more tasks, from customer entities and (ii) manages the execution of the jobs by assigning tasks to processing resources, the broker including, for example: a communication management module that minimizes unnecessary network congestion by communicating pseudo-random wait times to polling customer entities and processing resources, thus preventing the customer entities and/or processing resources from again contacting the broker before expiration of the corresponding pseudo-random wait time. The pseudo-random number generator may adaptively vary its target distribution in response to detected levels of network traffic in the distributed computing system.

Still further, generally speaking, and without intending to be limiting, additional specific aspects of the invention relate to brokers, configured to assign tasks to available processing resources in a network-based distributed computing system, and comprising, for example: a resource evaluator which, in response to an indication of availability received from a processing resource, determines at least one, two, three, four, or more of the following attributes of the available processing resource: (i) operating system of the processing resource; (ii) available memory of the processing resource; (iii) available disk space of the processing resource; (iv) security features of the processing resource; (v) speed of the processing resource; (vi) availability of locally-cached data at the processing resource; (vii) typical frequency of local user activity at the processing resource; and (viii) time of most recent local user activity at the processing resource; and a resource assignor which, in response to an indication of availability received from a processing resource, determines which task to assign to the available processing resource based, at least in part, on at least one, two, three, four, or more of the following attributes of the task: (i) preferred or required operating system for executing the task; (ii) preferred or required memory for executing the task; (iii) preferred or required disk space for executing the task; (iv) preferred or required security features for executing the task; (v) preferred or required processor speed for executing the task; (vi) preferred or required availability of locally-cached data at the processing resource; and (vii) preferred or required duration of uninterrupted control of the processing resource while executing the task.

Again, generally speaking, and without intending to be limiting, another specific aspect of the invention relates to discriminators, configured for use by a broker in determining assignments of tasks to available resources, such discriminators embodied on a computer-readable medium, and comprising numeric functions, associated with either a task or a processing resource, which discriminators may be called to return a numeric value computed by, for example, combining information concerning at least two, three, four, or more of the following: (i) whether the operating system of a particular processing resource is compatible with the operating system requirements of a particular task; (ii) whether the memory available at a particular processing resource is sufficient to execute a particular task; (iii) whether the disk space available at a particular processing resource is sufficient to execute a particular task; (iv) whether the security infrastructure of a particular processing resource is sufficient to meet the security requirements of a particular task; (v) whether the speed of a particular processing resource is sufficient to meet the processing demands of a particular task; (vi) whether particular data set or state information needed to execute a particular task is already locally cached at a particular processing resource; and/or (vii) whether the level of local processing demand at a particular processing resource is sufficiently low to accommodate a particular task.

Furthermore, generally speaking, and without intending to be limiting, yet another specific aspect of the invention relates to discriminators, configured for use by a broker in determining assignments of tasks to available resources, the discriminators embodied on a computer-readable media, and comprised of a binary function, associated with either a task or a processing resource, which discriminators may be called to return binary values computed, at least in part, as a product of at least two, three, four, or more binary values, each value indicative of one of the following conditions: (i) whether the operating system of a particular processing resource is compatible with the operating system requirements of a particular task; (ii) whether the memory available at a particular processing resource is sufficient to execute a particular task; (iii) whether the disk space available at a particular processing resource is sufficient to execute a particular task; (iv) whether the security infrastructure of a particular processing resource is sufficient to meet the security requirements of a particular task; (v) whether the speed of a particular processing resource is sufficient to meet the processing demands of a particular task; (vi) whether particular data set or state information needed to execute a particular task is already locally cached at a particular processing resource; and (vii) whether the level of local processing demand at a particular processing resource is sufficiently low to accommodate a particular task.

While the above discussion outlines some of the important features and advantages of the invention, those skilled in the art will recognize that the invention contains numerous other novel features and advantages, as described below in connection with applicants' preferred LiveCluster embodiment.

Accordingly, still further aspects of the present invention relate to other system configurations, methods, software, encoded articles-of-manufacture and/or electronic data signals comprised of, or produced in accordance with, the above in combination with portions of the preferred LiveCluster embodiment, described in detail below.

BRIEF DESCRIPTION OF THE FIGURES

The present invention will be best appreciated by reference to the following set of figures (to be considered in combination with the associated detailed description) in which:

FIGS. 3–12 are code samples from the preferred LiveCluster embodiment of the invention;

FIGS. 14–31 are code samples from the preferred LiveCluster embodiment of the invention;

FIGS. 32–53 are screen shots from the preferred LiveCluster embodiment of the invention;

FIGS. 33–70 are code samples from the preferred LiveCluster embodiment of the invention;

FIGS. 72–81 are code samples from the preferred LiveCluster embodiment of the invention;

FIGS. 88, 89A–E, 90A–J, 91A–F, and 92 further document the various classes and interfaces used in connection with the Propagator API; and, FIGS. 93A–D, 94A–C, 95A–D, 96A–E, 97A–B, 98, 99, and 100A–B contain source code for a second exemplary application of the Propagator API.

DETAILED DESCRIPTION OF THE PREFERRED EMBODIMENT(S)

Figure 1:
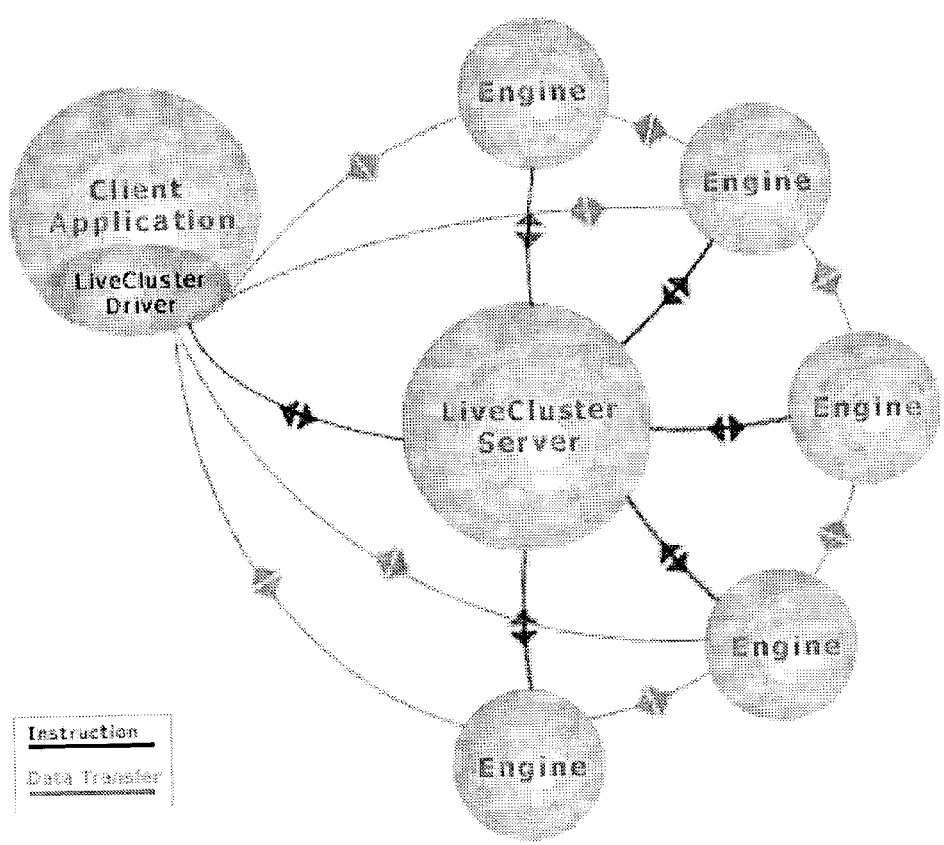
FIGS. 1–2 depict data flows in the preferred LiveCluster embodiment of the invention.
Figure 2:
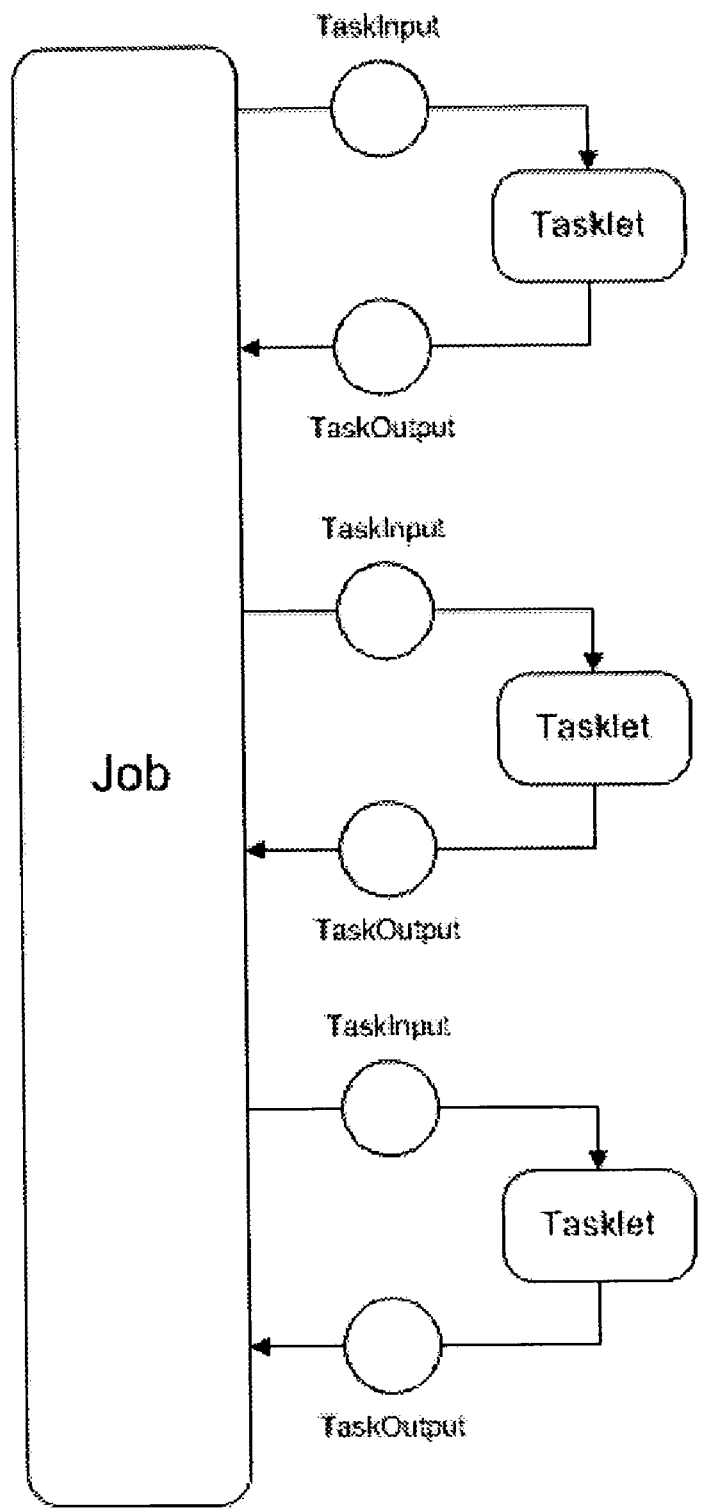

What follows is a rough glossary of terms used in describing the preferred LiveCluster implementation of the invention.

| | |
|---|---|
| Broker | A subcomponent of a Server that is responsible for maintaining a "job space," for managing Jobs and Tasks and the associated interactions with Drivers and Engines. |
| Daemon | A process in Unix that runs in the background and performs specific actions or runs a server with little or no direct interaction. In Windows NT or Windows 2000, these are also called Services. |
| Director | A subcomponent of a Server that is responsible for routing Drivers and Engines to Brokers. |
| Driver | The component used to maintain a connection between the LiveCluster Server and the client application. |
| Engine | The component that actually handles the work of computation, accepting work from and returning results to a Broker. |
| Failover Broker | A Broker configured to take on work when another Broker fails. The Failover Broker will continue to accept Jobs until another Broker is functioning again, and then it will wait for any remaining Jobs to finish before returning to a wait state. |
| Job | A unit of work submitted from a Driver to a Server. Servers break apart Jobs into Tasks for further computation. |
| LiveCluster | LiveCluster provides a flexible platform for distributing large computations to idle, underutilized and/or dedicated processors on any network. The LiveCluster architecture includes a Driver, one or more Servers, and several Engines. |
| Server | The component of the LiveCluster tm system that takes work from Drivers, coordinates it with Engines, and supports Web-based administrative tools. A Server typically contains a Driver and a Broker. |
| Task | An atomic unit of work. Jobs are broken into Tasks and then distributed to Engines for computation. |
| Standalone Broker | A Server that has been configured with a Broker, but no Director; its configured primary and secondary Directors are both in other Servers. |
| Service | A program in Windows NT or Windows 2000 that performs specific functions to support other programs. In Unix, these are also called daemons. |
| How LiveCluster Works | |

LiveCluster supports a simple but powerful model for distributed parallel processing. The basic configuration incorporates three major components—Drivers, Servers, and Engines. Generally speaking, the LiveCluster model works as follows:

A. Client applications (via Drivers) submit messages with work requests to a central Server.
B. The Server distributes the work to a network of Engines, or individual CPUs with LiveCluster Installed.
C. The Engines return the results to the Server.
D. The Server collects the results and returns them to the Drivers.

Tasks and Jobs

In LiveCluster, work is defined in two different ways: a larger, overall unit, and a smaller piece, or subdivision of that unit. These are called Jobs and Tasks. A Job is a unit of work. Typically, this refers to one large problem that has a single solution. A Job is split into a number of smaller units, each called a Task. An application utilizing LiveCluster submits problems as Jobs, and LiveCluster breaks the Jobs into Tasks. Other computers solve the Tasks and return their results, where they are added, combined, or collated into a solution for the Job.

Component Architecture The LiveCluster system is implemented almost entirely in Java. Except for background daemons and the installation program, each component is independent of the operating system under which it is installed. The components are designed to support interoperation across both wide and local area networks (WANs and LANs), so the design is very loosely coupled, based on asynchronous, message-driven interactions. Configurable settings govern message encryption and the underlying transport protocol.

In the next section, we describe each of the three major components in the LiveCluster system—Driver, Server, and Engine—in greater detail.

Server

The Server is the most complex component in the system. Among other things, the Server:

Keeps track of the Engines and the ongoing computations (Jobs and Tasks)

Supports the web-based administration tools—in particular, it embeds a dedicated HTTP Server, which provides the primary administrative interface to the entire system.

Despite its complexity, however, the Server imposes relatively little processing burden. Because Engines and Drivers exchange data directly, so the Server doesn't have to consume a great deal of network bandwidth. By default, LiveCluster is configured so that Drivers and Engines communicate to the Server only for lightweight messages.

The Server functionality is partitioned into two subcomponent entities: the Broker and the Director. Roughly speaking, the Broker is responsible for maintaining a "job space" for managing Jobs and Tasks and the associated interactions with Drivers and Engines. The primary function of the Director is to manage Brokers. Typically, each Server instance imbeds a Broker/Director pair. The simplest fault-tolerant configuration is obtained by deploying two Broker/Director pairs on separate processors, one as the primary, the other to support failover. For very large-scale deployments, Brokers and Directors are isolated within separate Server instances to form a two-tiered Server network. Ordinarily, in production, the Server is installed as a service (under Windows) or as a daemon (under Unix)—but it can also run "manually," under a log-in shell, which is primarily useful for testing and debugging.

Driver

The Driver component maintains the interface between the LiveCluster Server and the client application. The client application code imbeds an instance of the Driver. In Java, the Driver (called JDriver) exists as a set of classes within the Java Virtual Machine (JVM). In C++, the Driver (called Driver++) is purely native, and exists as a set of classes within the application. The client code submits work and administrative commands and retrieves computational results and status information through a simple API, which is available in both Java and C++. Application code can also interact directly with the Server by exchanging XML messages over HTTP.

Conceptually, the Driver submits Jobs to the Server, and the Server returns the results of the individual component Tasks asynchronously to the Driver. In the underlying implementation, the Driver may exchange messages directly with the Engines within a transaction space maintained by the Server.

Engine

Engines report to the Server for work when they are available, accept Tasks, and return the results. Engines are invoked on desktop PCs, workstations, or on dedicated servers by a native daemon. Typically, there will be one Engine invoked per participating CPU. For example, four Engines might be invoked on a four-processor SMP.

An important feature of the LiveCluster platform is that it provides reliable computations over networks of interruptible Engines, making it possible to utilize intermittently active resources when they would otherwise remain idle. The Engine launches when it is determined that the computer is idle (or that a sufficient system capacity is available in a multi-CPU setting) and relinquishes the processor immediately in case it is interrupted (for example, by keyboard input on a desktop PC).

It is also possible to launch one or more Engines on a given processor deterministically, so they run in competition with other processes (and with one another) as scheduled by the operating system. This mode is useful both for testing and for installing Engines on dedicated processors.

Principles of Operation

Idle Detection

Engines are typically installed on network processors, where they utilize intermittently available processing capacity that would otherwise go unused. This is accomplished by running an extremely lightweight background process on the Engine. This invocation process monitors the operating system and launches an Engine when it detects an appropriate idle condition.

The definition and detection of appropriate idle conditions is inherently platform- and operating-system dependent. For desktop processors, the basic requirement is that the Engine does nothing to interfere with the normal activities of the desktop user. For multi-processor systems, the objective, roughly speaking, is to control the number of active Engines so that they consume only cycles that would otherwise remain idle. In any case, Engines must relinquish the host processor (or their share of it, on multi-processor systems) immediately when it's needed for a primary application. (For example, when the user hits a key on a workstation, or when a batch process starts up on a Server.)

Adaptive Scheduling

Fault-tolerant adaptive scheduling provides a simple, elegant mechanism for obtaining reliable computations from networks varying numbers of Engines with different available CPU resources. Engines report to the Server when they are "idle"—that is, when they are available to take work. We say the Engine "logs in," initiating a login session. During the login session, the Engine polls the Server for work, accepts Task definitions and inputs, and returns results. If a computer is no longer idle, the Engine halts, and the task are rescheduled to another Engine. Meanwhile, the Server tracks the status of Tasks that have been submitted to the Engines, and reschedules tasks as needed to ensure that the Job (collection of Tasks) completes.

As a whole, this scheme is called "adaptive" because the scheduling of Tasks on the Engines is demand-driven. So long as the maximum execution time for any Task is small relative to the average "idle window," that is, the length of the average log-in session, between logging in and dropping out, adaptive scheduling provides a robust, scalable solution for load balancing. More capable Engines, or Engines that receive lighter Tasks, simply report more frequently for Work. In case the Engine drops out because of a "clean" interruption—because it detects that the host processor is no longer "idle"—it sends a message to the Server before it exits, so that the Server can reschedule running Tasks immediately. However, the Server cannot rely on this mechanism alone. In order to maintain performance in the presence of network drop-outs, system crashes, etc., the Server monitors a heartbeat from each active Engine and reschedules promptly in case of time-outs.

Directory Replication

Directory replication is a method to provide large files that change relatively infrequently. Instead of sending the files each time a Job is submitted and incurring the transfer overhead, the files are sent to each Engine once, where they are cached. The Server monitors a master directory structure and maintains a synchronized replica of this directory on each Engine, by synchronizing each Engine with the files. This method can be used on generic files, or platform-specific items, such as Java.jar files, DLLs, or object libraries.

Basic API Features

Before examining the various features and options provided by LiveCluster, it is appropriate to introduce the basic features of the LiveCluster API by means of several sample programs.

This section discusses the following Java interfaces and classes:
TaskInput
TaskOutput
Tasklet
Job
PropertyDiscriminator
EngineSession
StreamJob
StreamTasklet
DataSetJob
TaskDataSet The basic LiveCluster API consists of the TaskInput, TaskOutput and Tasklet interfaces, and the Job class. LiveCluster is typically used to run computations on different inputs in parallel. The computation to be run is implemented in a Tasklet. A Tasklet takes a TaskInput, operates on it, and produces a TaskOutput. Using a Job object, one's program submits TaskInputs, executes the job, and processes the TaskOutputs as they arrive. The Job collaborates with the Server to distribute the Tasklet and the various TaskInputs to Engines.

FIG. 1 illustrates the relationships among the basic API elements. Although it is helpful to think of a task as a combination of a Tasklet and one TaskInput, there is no Task class in the API. To understand the basic API better, we will write a simple LiveCluster job. The job generates a unique number for each task, which is given to the tasklet as its TaskInput. The tasklet uses the number to return a TaskOutput consisting of a string. The job prints these strings as it receives them. This is the LiveCluster equivalent of a "Hello, World" program. This program will consist of five classes: one each for the TaskInput, TaskOutput, Tasklet and Job, and one named Test that contains the main method for the program.

TaskInput and TaskOutput

Consider first the TaskInput class: The basic API is found in the com.livecluster.tasklet package, so one should import that package (see FIG. 3). The TaskInput interface contains no methods, so one need not implement any. Its only purpose is to mark one's class as a valid TaskInput. The TaskInput interface also extends the Serializable interface of the java.io package, which means that all of the class's instance variables must be serializable (or transient). Serialization is used to send the TaskInput object from the Driver to an Engine over the network. As its name suggests, the SimpleTaskInput class is quite simple: it holds a single int representing the unique identifier for a task. For convenience, one need not make the instance variable private. TaskOutput, like TaskInput, is an empty interface that extends Serializable, so the output class should not be surprising (see FIG. 4)

Writing a Tasklet

Now we turn to the Tasklet interface, which defines a single method:

public TaskOutput service(TaskInput);

The service method performs the computation to be parallelized. For our Hello program, this involves taking the task identifier out of the TaskInput and returning it as part of the TaskOutput string (see FIG. 5). The service method begins by extracting its task ID from the TaskInput. It then creates a SimpleTaskOutput, sets its instance variable, and returns it. One aspect of the Tasklet interface not seen here is that it, too, extends Serializable. Thus any instance variables of the tasklet must be serializable or transient.

With the help of a simple main method (see FIG. 6), one can run this code. This program creates a Tasklet, and then repeatedly creates a TaskInput and calls the Tasklet's service method on it, displaying the results. Although not something one would want to do in practice, this code does illustrate the essential functionality of LiveCluster. In essence, LiveCluster provides a high-performance, fault-tolerant, highly parallel way to repeatedly execute the line:

TaskOutput output=tasklet.service(input);

The Job Class

To run this code within LiveCluster, one needs a class that extends Job. Recall that a Job is associated with a single tasklet. The needed Job class creates several TaskInputs, starts the job running, and collects the TaskOutputs that result. To write a Job class, one generally writes the following methods:

(likely) A constructor to accept parameters for the job. It is recommended that the constructor call the setTasklet method to set the job's tasklet.

(optionally) A createTaskInputs method to create all of the TaskInput objects. Call the addTaskInput method on each TaskInput one creates to add it to the job. Each TaskInput one adds results in one task.

(required) A processTaskOutput method. It will be called for each TaskOutput that is produced.

The HelloJob class is displayed in FIG. 7. The constructor creates a single HelloTasklet and installs it into the job with the setTasklet method. The createTaskInputs method creates ten instances of SimpleTaskInput, sets their taskIds to unique values, and adds each one to the job with the addTaskInput method. The processTaskOutput method displays the string that is inside its argument.

Putting It All Together

The Test class (see FIG. 8) consists of a main method that runs the job. The first line creates the job. The second line has to do with distributing the necessary class files to the Engines. The third line executes the job by submitting it to the LiveCluster Server, then waits until the job is finished. (The related execute InThread method runs the job in a separate thread, returning immediately.)

The second line of main deserves more comment. First, the getOptions method returns a JobOptions object. The JobOptions class allows one to configure many features of the job. For instance, one can use it to set a name for the job (useful when looking for a job in the Job List of the LiveCluster Administration tool), and to set the job's priority.

Here we use the JobOptions method setJarFile, which takes the name of a jar file. This jar file should contain all of the files that an Engine needs to run the tasklet. In this case, those are the class files for SimpleTaskInput, SimpleTaskOutput, and HelloTasklet. By calling the setJarFile method, one tells LiveCluster to distribute the jar file to all Engines that will work on this job. Although suitable for development, this approach sends the jar file to the Engines each time the job is run, and so should not be used for production. Instead, one should use the file replication service or a shared network file system when in production.

Running the Example

Running the above-discussed code will create the following output:

Hello from #0
Hello from #5
Hello from #2
Hello from #4
Hello from #9
Hello from #1
Hello from #6
Hello from #7
Hello from #8
Hello from #3
DONE Summary The basic API consists of the TaskInput, TaskOutput and Tasklet interfaces and the Job class. Typically, one will write one class that implements TaskInput, one that implements TaskOutput, one that implements Tasklet, and one that extends Job.

A Tasklet's service method implements the computation that is to be performed in parallel. The service method takes a TaskInput as argument and returns a TaskOutput.

A Job object manages a single Tasklet and a set of TaskInputs. It is responsible for providing the TaskInputs, starting the job and processing the TaskOutputs as they arrive.

Some additional code is necessary to create a job, arrange to distribute a jar file of classes, and execute the job.

Data Parallelism

In this section, we will look at a typical financial application: portfolio valuation. Given a portfolio of deals, our program will compute the value of each one. For those unfamiliar with the concepts, a deal here represents any financial instrument, security or contract, such as a stock, bond, option, and so on. The procedure used to calculate the value, or theoretical price, of a deal depends on the type of deal, but typically involves reference to market information like interest rates. Because each deal can be valued independently of the others, there is a natural way to parallelize this problem: compute the value of each deal concurrently. Since the activity is the same for all tasks (pricing a deal) and only the deal changes, we have an example of data parallelism. Data-parallel computations are a perfect fit for LiveCluster. A tasklet embodies the common activity, and each TaskInput contains a portion of the data.

The Domain Classes

Before looking at the LiveCluster classes, we will first discuss the classes related to the application domain. There are six of these: Deal, ZeroCouponBond, Valuation, DealProvider, PricingEnvironment and DateUtil.

Each deal is represented by a unique integer identifier. Deals are retrieved from a database or other data source via the DealProvider. Deal's value method takes a PricingEnvironment as an argument, computes the deal's value, and returns a Valuation object, which contains the value and the deal ID. ZeroCouponBond represents a type of deal that offers a single, fixed payment at a future time. DateUtil contains a utility function for computing the time between two dates.

The Deal class is abstract, as is its value method (see FIG. 9). The value method's argument is a PricingEnvironment, which has methods for retrieving the interest rates and the valuation date, the reference date from which the valuation is taking place. The value method returns a Valuation, which is simply a pair of deal ID and value. Both Valuation and PricingEnvironment are serializable so they can be transmitted over the network between the Driver and Engines.

ZeroCouponBond is a subclass of Deal that computes the value of a bond with no interest, only a principal payment made at a maturity date (see FIG. 10). The value method uses information from the PricingEnvironment to compute the present value of the bond's payment by discounting it by the appropriate interest rate.

The DealProvider class simulates retrieving deals from persistent storage. The getDeal method accepts a deal ID and returns a Deal object. Our version (see FIG. 11) caches deals in a map. If the deal ID is not in the map, a new ZeroCouponBond is created.

With the classes discussed so far, one can write a simple stand-alone application to value some deals (see FIG. 12). This program loads and values 10 deals using a single pricing environment. This LiveCluster application will also take this approach, using the same pricing environment for all deals. The output of this program looks something like:

deal ID=0, value=3253.5620409955113
deal ID=1, value=750.9387692727968
deal ID=2, value=8525.835888008573
deal ID=3, value=5445.987705373893
deal ID=4, value=3615.2722123351246
deal ID=5, value=1427.1584028651682
deal ID=6, value=5824.137556101124
deal ID=7, value=2171.6068493160974
deal ID=8, value=5099.034037828654
deal ID=9, value=3652.567194863038

With the domain classes finished, we proceed to the LiveCluster application. The basic structure is clear enough: we will have a ValuationTasklet class to value deals and return Valuations, which will be gathered by a ValuationJob class. But there are three important questions we must answer before writing the code:

1. How are Deal objects provided to the tasklet?
2. How is the PricingEnvironment object provided to the tasklet?
3. How many deals should a tasklet value at once?

We address the first two of these questions in the next section, "Understanding Data Movement," and the third in the section following, "Understanding Granularity."

Understanding Data Movement

The first question is how to provide deals to the tasklet. One choice is to load the deal on the Driver and send the Deal object in the TaskInput; the other is to send just the deal ID, and let the tasklet load the deal itself. The second way is likely to be much faster, for two reasons: reduced data movement and increased parallelism.

Figure 13:
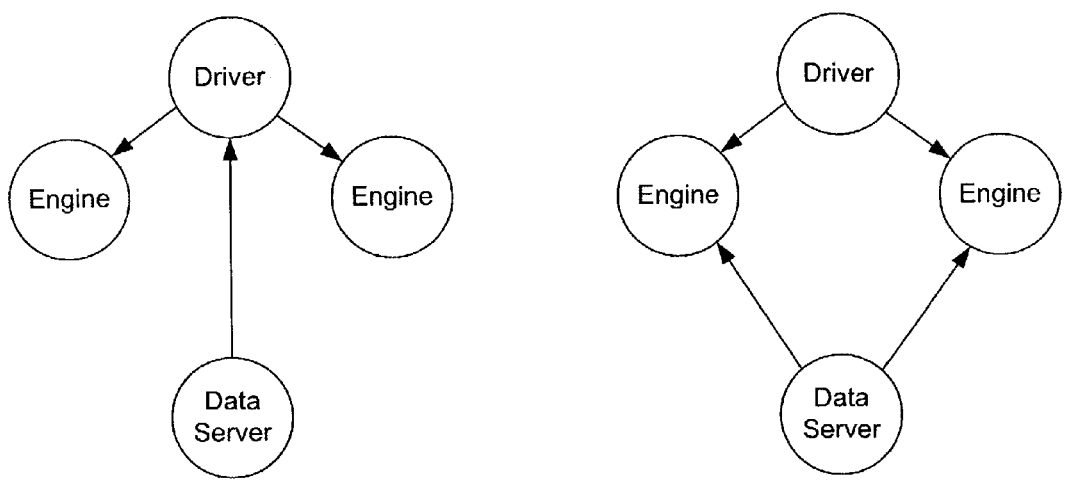
FIG. 13 depicts comparative data flows in connection with the preferred LiveCluster embodiment of the invention.

To understand the first reason, consider FIG. 13, the left portion of which illustrates the connections among the Driver, the Engines, and your data server, on which the deal data resides. The left-hand diagram illustrates the data flow that occurs when the Driver loads deals and transmits them to the Engines. The deal data travels across the network twice: once from the data server to the Driver, and again from the Driver to the Engine. The right-hand diagram shows what happens when only the deal IDs are sent to the Engines. The data travels over the network only once, from the data server to the Engine.

The second reason why sending only deal IDs will be faster is that tasklets will try to load deals in parallel. Provided one's data server can keep up with the demand, this can increase the overall throughput of the application.

These arguments for sending deal IDs instead of deals themselves makes sense for the kind of architecture sketched in FIG. 13, but not for other, less typical configurations. For example, if the Driver and the data server are running on the same machine, then it may make sense, at least from a data movement standpoint, to load the deals in the Driver.

Let us now turn to the question of how to provide each tasklet with the PricingEnvironment. Recall that in this application, every deal will be valued with the same PricingEnvironment, so only a single object needs to be distributed across the LiveCluster. Although the obvious choice is to place the PricingEnvironment in each TaskInput, there is a better way: place the PricingEnvironment within the tasklet itself. The first time that an Engine is given a task from a particular job, it downloads the tasklet object from the Driver, as well as the TaskInput. When given subsequent tasks from the same job, it downloads only the TaskInput, reusing the cached tasklet. So placing an object in the tasklet will never be slower than putting it in a TaskInput, and will be faster if Engines get more than one task from the same job.

One can summarize this section by providing two rules of thumb:

Let each tasklet load its own data.

If an object does not vary across tasks, place it within the tasklet.

Understanding Granularity

The third design decision for our illustrative LiveCluster portfolio valuation application concerns how many deals to include in each task. Placing a single deal in each task yields maximum parallelism, but it is unlikely to yield maximum performance. The reason is that there is some communication overhead for each task.

For example, say that one has 100 processors in a LiveCluster, and 1000 deals to price. Assume that it takes 100 ms to compute the value of one deal, and that the total communication overhead of sending a TaskInput to an Engine and receiving its TaskOutput is 500 ms. Since there are 10 times more deals than processors, each processor will receive 10 TaskInputs and produce 10 TaskOutputs during the life of the computation. So the total time for a program that allocates one deal to each TaskInput is roughly (0.1 s compute time per task +0.5 s overhead)×10=6 seconds. Compare that with a program that places 10 deals in each TaskInput, which requires only a single round-trip communication to each processor: (0.1 s×10) compute time per task +0.5 s overhead=1.5 seconds. The second program is much faster because the communication overhead is a smaller fraction of the total computation time. The following table summarizes these calculations, and adds another data point for comparison:

| Deals per TaskInput | Elapsed Time |
|---|---|
| 1 | 6 |
| 10 | 1.5 |
| 100 | 10.5 |

In general, the granularity—amount of work—of a task should be large compared to the communication overhead. If it is too large, however, then two other factors come into play. First and most obviously, if one has too few tasks, one will not have much parallelism. The third row of the table illustrates this case. By placing 100 deals in each TaskInput, only ten of the 100 available Engines will be working. Second, a task may fail for a variety of reasons—the Engine may encounter hardware, software or network problems, or someone may begin using the machine on which the Engine is running, causing the Engine to stop immediately. When a task fails, it must be rescheduled, and will start from the beginning. Failed tasks waste time, and the longer the task, the more time is wasted. For these reasons, the granularity of a task should not be too large.

Task granularity is an important parameter to keep in mind when tuning an application's performance. We recommend that a task take between one and five minutes. To facilitate tuning, it is wise to make the task granularity a parameter of one's Job class.

The LiveCluster Classes

We are at last ready to write the LiveCluster code for our portfolio valuation application. We will need classes for TaskInput, TaskOutput, Tasklet and Job.

The TaskInput will be a list of deal IDs, and the TaskOutput a list of corresponding Valuations. Since both are lists of objects, we can get away with a single class for both TaskInput and TaskOutput. This general-purpose ArrayListTaskIO class contains a single ArrayList (see FIG. 14).

FIG. 15 shows the entire tasklet class. The constructor accepts a PricingEnvironment, which is stored in an instance variable for use by the service method. As discussed above, this is an optimization that can reduce data movement because tasklets are cached on participating Engines.

The service method expects an ArrayListTaskIO containing a list of deal IDs. It loops over the deal IDs, loading and valuing each deal, just as in our stand-alone application. The resulting Valuations are placed in another ArrayListTaskIO, which is returned as the tasklet's TaskOutput.

ValuationJob is the largest of the three LiveCluster classes. Its constructor takes the total number of deals as well as the number of deals to allocate to each task. In a real application, the first parameter would be replaced by a list of deal IDs, but the second would remain to allow for tuning of task granularity.

The createTaskInputs method (see FIG. 16) uses the total number of deals and number of deals per task to divide the deals among several TaskInputs. The code is subtle and is worth a careful look. In the event that the number of deals per task does not evenly divide the total number of deals, the last TaskInput will contain all the remaining deals.

The processTaskOutput method (see FIG. 17) simply adds the TaskOutput's ArrayList of Valuations to a master ArrayList. Thanks to the deal IDs stored within each Valuation, there is no risk of confusion due to TaskOutputs arriving out of order.

The Test class has a main method that will run the application (see FIG. 18). The initial lines of main load the properties file for the valuation application and obtain the values for totalDeals and dealsPerTask.

In summary:

LiveCluster is ideal for data-parallel applications, such as portfolio valuation.

In typical configurations where the data server and the Driver are on different machines, let each tasklet load its own data from the data server, rather than loading the data into the Driver and distributing it in the TaskInputs.

Since the Tasklet object is serialized and sent to each Engine, it can and should contain data that does not vary from task to task within a job.

Task granularity—the amount of work that each task performs—is a crucial performance parameter for LiveCluster. The right granularity will amortize communication overhead while preventing the loss of too much time due to tasklet failure or interruption. Aim for tasks that run in a few minutes.

Engine Properties

In this brief section, we take a look at Engine properties in preparation for the next section, on Engine discrimination. Each Engine has its own set of properties. Some properties are set automatically by LiveCluster, such as the operating system that the Engine is running on and the estimated speed of the Engine's processor. Users can also create custom properties for engines by choosing Engine Properties under the Configure section of the LiveCluster Administration Tool.

This section also introduces a simple but effective way of debugging tasklets by placing print statements within the service method. This output can be viewed from the Administration Tool or written to a log file.

Application Classes

Our exemplary LiveCluster application (see FIG. 19) will simply print out all Engine properties. Since we will not be using TaskInputs or generating TaskOutputs, we will only need to write classes for the tasklet, job and main method.

The EnginePropertiesTasklet class uses LiveCluster's EngineSession class to obtain the Engine's properties. It then prints them to the standard output. The method begins by calling EngineSession's getProperties method to obtain a Properties object containing the Engine's properties. Note that EngineSession resides in the com.livecluster.tasklet.util package. The tasklet then prints out the list of engine properties to System.out, using the convenient list method of the Properties class.

Where does the output of the service method go? Since Engines are designed to run in the background, the output does not go to the screen of the Engine's machine. Instead, it is transmitted to the LiveCluster Server and, optionally, saved to a log file on the Engine's machine. We will see how to view the output in "Running the Program," below.

The try . . . catch is necessary in this method, because EngineSession.getProperties may throw an exception and the service method cannot propagate a checked exception.

The EngineSession class has two other methods, setProperty and removeProperty, with the obvious meanings. Changes made to the Engine's properties using these methods will last for the Engine's session. A session begins when an Engine first becomes available and logs on to the Server, and typically ends when the Engine's JVM terminates. (Thus, properties set by a tasklet are likely to remain even after the tasklet's job finishes.) Note that calling the set Properties method of the Properties object returned from EngineSession.getProperties will not change the Engine's properties.

To set an Engine's properties permanently, one should use the Engine Properties tool in the Configure section of the Administration Tool. Click on an Engine in the left column. Then enter property names and values on the resulting page.

The EnginePropertiesJob class (see FIG. 20) simply adds a few TaskInputs in order to generate tasks. TaskInputs cannot be null, so empty TaskInput object is provided as a placeholder.

The Test class is similar to the previously-described Test classes.

Running the Program

To see what is written to an Engine's System.out (or System.err) stream, one must open a Remote Engine Log window in the LiveCluster Administration Tool, as follows:
1. From the Manage section of the navigation bar, choose Engine Administration.
2. One should now see a list of Engines that are logged in to one's Server. Click an Engine name in the leftmost column.
3. One should now see an empty window titled Remote Engine Log. It is important to do these steps before one runs the application. By default, Engine output is not saved to a file, so the data sent to this window is transient and cannot be retrieved once the application has completed.

The output from each Engine should be similar to that shown in FIG. 21. The meaning of some of these properties is obvious, but others deserve comment. The cpuNo property is the number of CPUs in the Engine's computer. The id property is unique for each Engine's computer, while multiple Engines running on the same machine are assigned different instance properties starting from 0.

It is possible to configure an Engine to save its output to a log file as well as sending it to the Remote Engine Log window. One can do this as follows:
1. Visit Engine Configuration in the Configure section of the Administration tool.
2. Choose the configuration one wishes to change from the File list at the top.
3. Find the DSLog argument in the list of properties and set it to true.
4. Click Submit.
5. When the page reloads, click Save.

The log files will be placed on the Engine's machine under the directory where the Engine was installed. On Windows machines, this is c:\Program Files\DataSynapse\Engine by default. In LiveCluster, the log file is stored under ./work/[name]-[instance]/log.

Summary

To summarize the above:

Engine properties describe particular features of each Engine in the LiveCluster.

Some Engine properties are set automatically; but one can create and set one's own properties in the Engine Properties page of the Administration Tool.

The EngineSession class provides access to Engine properties from within a tasklet.

Writing to System.out is a simple but effective technique for debugging tasklets. The output goes to the Remote Engine Log window, which can be brought up from Engine Administration in the Administration Tool. One can also configure Engines to save the output to a log file.

Discrimination

Discrimination is a powerful feature of LiveCluster that allows one to exert dynamic control over the relationships among Drivers, Brokers and Engines. LiveCluster supports two kinds of discrimination:

Broker Discrimination: One can specify which Engines and Drivers can log in to a particular Broker. Access this feature by choosing Broker Discrimination in the Configure section of the LiveCluster Administration Tool.

Engine Discrimination: One can specify which Engines can accept a task. This is done in one's code, or in an XML file used to submit the job.

Both kinds of discrimination work by specifying which properties an Engine or Driver must possess in order to be acceptable.

This section discusses only Engine Discrimination, which selects Engines for particular jobs or tasks. Engine Discrimination has many uses. The possibilities include:

limiting a job to run on Engines whose usernames come from a specified set, to confine the job to machines under one's jurisdiction;

limiting a resource-intensive task to run only on Engines whose processors are faster than a certain threshold, or that have more than a specified amount of memory or disk space;

directing a task that requires operating-system-specific resources to Engines that run under that operating system;

inventing one's own properties for Engines and discriminating based on them to achieve any match of Engines to tasks that one desires.

In this section, we will pursue the third of these ideas. We will elaborate our valuation example to include two different types of deals. We will assume that the analytics for one kind of deal have been compiled to a Windows DLL file, and thus can be executed only on Windows computers. The other kind of deal is written in pure Java and therefore can run on any machine. We will segregate tasks by deal type, and use a discriminator to ensure that tasks with Windows-specific deals will be sent only to Engines on Windows machines.

Using Discrimination

This discussion will focus on the class PropertyDiscriminator. This class uses a Java Properties object to determine how to perform the discrimination. The Properties object can be created directly in one's code, as we will exemplify below, or can be read from a properties file.

When using PropertyDiscriminator, one encodes the conditions under which an Engine can take a task by writing properties with a particular syntax. For example, setting the property cpuMFlops.gt to the value 80 specifies that the CPU speed of the candidate Engine, in megaflops, must be greater than 80 for the Engine to be eligible.

In general, the discriminator property is of the form engine_property.operator. There are operators for string and numerical equality, numerical comparison, and set membership. They are documented in the Java API documentation for PropertyDiscriminator.

Since a single Properties object can contain any number of properties, a PropertyDiscriminator can specify any number of conditions. All must be true for the Engine to be eligible to accept the task.

In our example, we want to ensure that tasks that contain OptionDeals are given only to Engines that run under the Windows operating system. The Engine property denoting the operating system is os and its value for Windows is win32. So, to construct the right discriminator, one would add the line:

props.setProperty("os.equals", "win32");

to our code.

The Application

Most of the earlier-described classes require no change, including Deal, ZeroCouponDeal, ArrayListTaskIO, Valuation, PricingEnvironment and ValuationTasklet. We will add another subclass of Deal, called OptionDeal, whose value method calls the method nativeValue to do the work (see FIG. 22).

We assume that the nativeValue method is a native method invoking a Windows DLL. Recall that the DealProvider class is responsible for fetching a Deal given its integer identifier. Its getDeal method returns either an OptionDeal object or ZeroCouponBond object, depending on the deal ID it is given. For this example, we decree that deal IDs less than a certain number indicate OptionDeals, and all others are ZeroCouponBonds.

The ValuationTasklet class is unchanged, but it is important to note that Deal's value method is now polymorphic:

output.add(deal.value(_pricingEnvironment));

In this line, the heart of ValuationTasklet, the call to value will cause a Windows DLL to run if deal is an OptionDeal.

The ValuationJob class has changed significantly, because it must set up the discriminator and divide the TaskInputs into those with OptionDeals and those without (see FIG. 23). The first three lines set up a PropertyDiscriminator to identify Engines that run under Windows, as described above. The last two lines call the helper method createDealInputs, which aggregates deal IDs into TaskInputs, attaching a discriminator. The second argument is the starting deal ID; since deal IDs below DealProvider.MIN_OPTION_ID are OptionDeals, the above two calls result in the first group of TaskInputs consisting solely of OptionDeals and the second consisting solely of ZeroCouponBonds.

FIG. 24 shows the code for createDealInputs. This method takes the number of deals for which to create inputs, the deal identifier of the first deal, and a discriminator. (IDiscriminator is the interface that all discriminators must implement.) It uses the same algorithm previously discussed to place Deals into TaskInputs. Then calls the two-argument version of addTaskInput, passing in the discriminator along with the TaskInput.

When createDealInputs is invoked to create OptionDeals, the PropertyDiscriminator we created is passed in. For ZeroCouponBonds, the discriminator is null, indicating no discrimination is to be done—any Engine can accept the task. Using null is the same as calling the one-argument version of addTaskInput.

Further Discriminator Examples

The following examples illustrate the use of Discriminators to solve common scheduling problems that have typically been addressed with complex deterministic scheduling algorithms, while retaining the benefits of adaptive dynamic scheduling.

EXAMPLE 1

Discriminators may be attached to Tasks or Jobs to ensure that they are assigned to Engines that are equipped with specific resources. Common examples include: Tasks that must run under a particular operating system or subset of operating systems; Tasks that must have at least a specified minimum of memory or disk space to run; Tasks that must run on a specific subset of Engines because of administrative or security restrictions, possibly including database or file system access restrictions; etc. Discriminators may also be used to impose analogous restrictions in order to optimize performance. For example, they may restrict very long-running Tasks to run only on processors meeting minimum performance requirements or on dedicated (as opposed to interruptible) Engines.

EXAMPLE 2

Scoring Discriminators may be used in connection with distributed caching to maximize reuse of distributed resources, such as objects or data. In this case, the Engines maintain a local cache, and update their associated property list whenever entries are added or removed from the cache. The Scoring Discriminator associated with each Task returns a score for each Engine based on the overlap between the resources that are available in the Engine's local cache and the resources specifically required by the Task.

The simplest examples of this kind are those in which each Task requires a single object, for example, each Task within a portfolio pricing application might look for a single deal or subportfolio. In this case, the Scoring Discriminator might return 1 in case the relevant deal or subportfolio is present in the cache, and 0 otherwise. A slightly more complex example would be one in which the Scoring Discriminator examines the Engine property list for multiple keys, corresponding to relevant deals or subportfolios, and returns the total number found. A further elaboration on this example would be to apply non-uniform weights to the keys, depending on the relevance and/or computational burden of reconstructing the associated resource. Also, since the Engine may associate a value with each key, this value may also be used in computing the score, for example, to indicate the number of deals within a subportfolio or to provide an indication of the cost associated with reconstructing the associated resource.

EXAMPLE 3

Engine Discriminators may be used to dedicate some number, N, of Engines to a specific Job. This is accomplished by having the first N Tasks within the Job install an Engine Discriminator that imposes two requirements: (1) The Job Id must match the Job Id for the given Task, and (2) the Task Id must be greater than N.

EXAMPLE 4

Engine Discriminators may be used to dedicate Engines as distributed resource providers. In this case, the Task that constructs the resource on the Engine also installs an Engine Discriminator that imposes the requirement that subsequent Tasks that run on the Engine define an associated property to indicate that they require the corresponding resource. This technique may be combined with that of the preceding example to dedicate multiple Engines as resource providers.

This technique is particularly useful for applications in which the distributed resources have large memory footprints and are expensive to construct. Typical examples include term-structure models, cashflow projections (e.g., for Collateralized Mortgage Obligations or other Asset Backed Securities), or more generally, any model specification to support multiple simulations with varying parameters.

EXAMPLE 5

Engine Discriminators may be used to dedicate some number, N, of Engines for "gang scheduling," that is, to reserve N engines for the exclusive use of particular Tasks during the extent of a session that may span multiple Jobs. This is accomplished by a slight variation of the procedure described above for dedicating N engines to a Job. In particular, the first Job in the session establishes a unique Session Id and runs N Tasks, each of which installs an Engine Discriminator that accepts only Tasks that have an associated Session Id property with the given value. (By arranging that the N initial Tasks do not have the property, this procedure reserves precisely N distinct Engines.)

A particularly important application of this technique is to accommodate multi-node computations that make use of message-passing protocols (e.g., PVM or MPI) within an adaptive scheduling framework. In this case, Tasks within the gang scheduling session may also be provided with routing information for the N participating Engines (e.g., IP addresses, host names, or other network identification) so that they may establish connections among themselves (e.g., within a PVM or MPI session).

Summary
  Discriminators allow one to control which Engines run which tasks.
  A discriminator compares the properties of an Engine against one or more conditions to determine if the engine is eligible to accept a particular task.
  The PropertyDiscriminator class is the easiest way to set up a discriminator. It uses a Properties object or file to specify the conditions.
  Discriminators can segregate tasks among Engines based on operating system, CPU speed, memory, or any other property.

Streaming Data

The service method of a standard LiveCluster tasklet uses Java objects for both input and output. These TaskInput and TaskOutput objects are serialized and transmitted over the network from the Driver to the Engines.

For some applications, it may be more efficient to use streams instead of objects for input and output. For example, applications involving large amounts of data that can process the data stream as it is being read may benefit from using streams instead of objects. Streams increase concurrency by allowing the receiving machine to process data while the sending machine is still transmitting. They also avoid the memory overhead of deserializing a large object.

The StreamTasklet and StreamJob classes enable applications to use streams instead of objects for data transmission.

Application Classes

Our exemplary application will search a large text file for lines containing a particular string. It will be a parallel version of the Unix grep command, but for fixed strings only. Each task is given the string to search for, which we will call the target, as well as a portion of the file to search, and outputs all lines that contain the target.

We will look at the tasklet first. Our SearchTasklet class extends the StreamTasklet class (see FIG. 25). The service method for StreamTasklet takes two parameters: an InputStream from which it reads data, and an OutputStream to which it writes its results (see FIG. 26). The method begins by wrapping those streams in a BufferedReader and a PrintWriter, for performing line-oriented I/O.

It then reads its input line by line. If it finds the target string in a line of input, it copies that line to its output. The constructor is given the target, which it stores in an instance variable. Since all tasks will be searching for the same target, the target should be placed in the tasklet. The service method is careful to close both its input and output streams when it is finished.

Users of StreamTasklet and StreamJob are responsible for closing all streams they are given. Writing a StreamJob is similar to writing an ordinary Job. One difference is in the creation of task inputs: instead of creating an object and adding it to the job, it obtains a stream, writes to it, and then closes it. The SearchJob class's createTaskInputs method illustrates this (see FIG. 27; _linesPerTask and _file are instance variables set in the constructor). The method begins by opening the file to be searched. It writes each group of lines to an OutputStream obtained with the createTaskInput method. (To generate the input for a task, one calls the createTaskInput method, write to the stream it returns, then close that stream.)

The loop within createTaskInputs is careful to allocate all of the file's lines to tasks while making sure that no task is given more than the number of lines specified in the constructor.

Like an ordinary Job, a StreamJob has a processTaskOutput method (see FIG. 28) that is called with the output of each task. In StreamJob, the method's parameter is an InputStream instead of a TaskOutput object. In this case, the InputStream contains lines that match the target. We print them to the standard output. Once again, it is our responsibility to close the stream we are given.

The Test class for this example is similar to previous ones.

Improvements

There are number of ways this basic application can be improved. Let's first consider the final output from the job, the list of matching lines. Because tasks may complete in any order, these lines may not be in their original order within the file. If this is a concern, then line number information can be sent to and returned from the tasklet, and used to sort the matching lines.

If many lines match the target string, then there will be a lot of traffic from the Engines back to the Driver. This traffic can be reduced by returning line numbers, instead of whole lines, from the tasklet. The line numbers can be sorted at the end, and a final pass made over the file to output the corresponding lines. As a further improvement, byte offsets instead of line numbers can be transmitted, enabling the use of random access file I/O to obtain the matching lines from the file. Whether these techniques will in fact result in increased performance will depend on a number of factors, including line length, number of matches, and so on. Experimentation will probably be necessary to find the best design.

Another source of improvement may come from multithreading. LiveCluster ensures that calls to processTaskOutput are synchronized, so that only one call is active at a time. Thus a naive processTaskOutput implementation like the one above will read an entire InputStream to completion—a process which may involve considerable network I/O—before moving on to the next. One may achieve better use of the Driver's processor by starting a thread to read the results on each call to processTaskOutput.

Summary

Use StreamTasklet and StreamJob when the amount of input or output data is large, and a tasklet can process the data stream as it arrives.

The service method of StreamTasklet reads its input from an InputStream and writes its results to an OutputStream.

When writing a StreamJob class, create an input for a task by calling the createTaskInput method to obtain an OutputStream, then writing to and closing that stream.

The processTaskOutput method of StreamJob is given an InputStream to read a task's results.

It is the taskset's responsibility to close all streams.

Data Sets

Although the parallel string search program of the previous section will speed up searching for large files, it misses an opportunity in the case where the same file is searched, over time, for many different targets. As an example of such a situation, consider a web search company that keeps a list of all the questions all users have ever asked so that it can display related questions when a user asks a new one. Although the previous search program will work correctly, it will redistribute the list of previously asked questions to Engines each time a search is done.

A more efficient solution would cache portions of the file to be searched on Engines to avoid repeatedly transmitting it. This is just what LiveCluster's data set feature does. A data set is a persistent collection of task inputs (either TaskInput objects or streams) that can be used across jobs. The first time it is used, the data set distributes its inputs to Engines in the usual way. But when the data set is used subsequently, it attempts to give a task to an Engine that already has the input for that task stored locally. If all such Engines are unavailable, the task is given to some other available Engine, and the input is retransmitted. Data sets thus provide an important data movement optimization without interfering with LiveCluster's ability to work with dynamically changing resources.

In this section, we will adapt the program of the previous section to use a data set. We will need to use the two classes: DataSetJob and TaskDataSet. There is no new type of tasklet that we need to consider—as data sets work with existing tasklets.

Using a TaskDataSet

Since a TaskDataSet is a persistent object, it must have a name for future reference. One can choose any name:

TaskDataSet dataSet=new TaskDataSet("search");

or can call the no-argument constructor, which will assign a name that one can access with the getName method.

One can now use the methods addTaskInput (for TaskInput objects) or createTaskInput (for streams) to add inputs to the data set. When finished, call the doneSubmitting method:

dataSet.addTaskInput(t1);
dataSet.addTaskInput(t2);
dataSet.addTaskInput(t3);
dataSet.doneSubmitting( );

The data set and its inputs are now stored on the Server and can be used to provide inputs to a DataSetJob, as will be illustrated in the next section.

The data set outlives the program that created it. A data set can be retrieved in later runs by using the static getDataSet method:

TaskDataSet dataSet=TaskDataSet.getDataSet("search");

It can be removed with the destroy method:
dataSet.destroy( );

The Application

To convert the string search application to use a data set, one must provide a Job class that extends DataSetJob. To do this, one uses a DataSetJob much like an ordinary Job, except that instead of providing a createTaskInputs method, one provides a data set via the setTaskDataSet method (see FIG. 29). The constructor accepts a TaskDataSet and sets it into the Job. The processTaskOutput method of this class is the same as that previously discussed. The SearchTasklet class is also the same.

The main method (see FIG. 30) of the Test program creates a TaskDataSet and uses it to run several jobs. The method begins by reading a properties file that contains a comma-separated list of target strings, as well as the data file name and number of lines per task It then creates a data set via the helper method createDataSetFromFile. Lastly, it runs several jobs using the data set.

createDataSetFromFile (see FIG. 31) places the inputs into a TaskDataSet.

Let's review the data movement that occurs when this program is run. When the first job is executed, Engines will pull both the tasklet and a task input stream from the Driver machine. Each engine will cache its stream data on its local disk. When the second and subsequent jobs are executed, the Server will attempt to assign an Engine the same task input that it used for the first job. Then the Engine will only need to download the tasklet, since the Engine has a local copy of the task input.

Earlier, we suggested that if an object does not vary across tasks (but does vary from job to job), it should be placed within the tasklet, rather than inside a task input. Here, we see that idea's biggest payoff. By keeping the task inputs constant, we can amortize their network transmission time over many jobs. Only the relatively small amount of data that varies from job to job—the target string, or in the earlier case, the pricing environment—needs to be transmitted for each new job.

The TaskDataSet concept proves useful in a number of applications:

Distributed Table Scans: In this application, the TaskDataSet corresponds to a very large database table, and each TaskInput within the set corresponds to a segment within the table. Each Job within the Tasking Session corresponds to a query or update on the table. Note that Tasks within each Job may execute in parallel, and Jobs within the session execute sequentially. Therefore, TaskDataSet supports applications in which the construction of each database operation may reflect the results of previous operations. "Data mining" and "machine learning" applications provide particularly important examples, in which an intelligent discovery process generates a sequence of queries, each of which builds on the information obtained in previous stages.

Portfolio Risk and Pricing: In this application, the TaskDataSet corresponds to a portfolio of financial instruments, and each TaskInput within the set corresponds to an instrument or subportfolio within the larger portfolio. Successive Jobs within the session perform a sequence of computations referencing the same portfolio. For example, the first Job might perform a simple profit and loss computation, the second Job might compute first-order sensitivities ("deltas"), the third might compute second-order sensitivities ("gammas"), etc.

In this example, the most important benefit is typically reuse of intermediate results and accumulated data-specific local state on the distributed processors. For example, instantiation of pricing engines corresponding to specific instruments is often very compute-intensive and may require large data objects, such as trees. These computations and the associated data objects are typically instrument-specific, but may be reused across multiple computations for the same instrument.

Interactive Modeling and Data Visualization: In this case, the data set corresponds to a multi-dimensional array of model coefficients, partitioned geometrically into sub-regions. During the course of an interactive session, the user may submit multiple requests to vary the initial conditions or visualize the data along different projections. In many instances, the one-time initialization cost on each node substantially exceeds that of updating the computation for successive requests, so that preserving state throughout the session can improve performance dramatically.

Propagator: The Propagator API is preferably implemented using TaskDataSet. In such case, each Propagator corresponds to a Tasking Session, and each Propagator node corresponds to a TaskInput within the set.

Summary
  Data sets can improve the performance of applications that reuse the same task inputs for many jobs, by reducing the amount of data transmitted over the network.
  A data set is a distributed cache: each Engine has a local copy of a task input. The Server attempts to re-assign a task input to an Engine that had it previously.
  The TaskDataSet class allows the programmer to create, retrieve and destroy data sets.
  The DataSetJob class extends Job to use a TaskDataSet.
  Data that varies from job to job should be placed in the tasklet.

LiveCluster Administration Tools
The LiveCluster Server provides the LiveCluster Administration Tool, a set of web-based tools that allow the administrator to monitor and manage the Server, its cluster of Engines, and the associated job space. The LiveCluster Administration Tool is accessed from a web-based interface, usable by authorized users from any compatible browser, anywhere on the network. Administrative user accounts provide password-protected, role-based authorization.
  With the screens in the Administration Tool, one can:
  View and modify Server and Engine configuration;
  Create administrative user accounts and edit user profiles;
  Subscribe to get e-mail notification of events;
  Monitor Engine activity and kill Engines;
  Monitor Job and Task execution and cancel Jobs;
  Install Engines;
  Edit Engine Tracking properties and change values;
  Configure Broker discrimination;
  View the LiveCluster API, release notes, and other developer documents;
  Download the files necessary to integrate application code and run Drivers;
  View and extract log information;
  View diagnostic reports; and,
  Run test Jobs.

User Accounts and Administrative Access
All of the administrative screens are password-protected. There is a single "super-user" account, the site administrator, whose hard-coded user name is admin. The site administrator creates new user accounts from the New User screen. Access control is organized according to the five functional areas that appear in the navigation bar. The site administrator is the only user with access to the configuration screens (under Configure), except that each user has access to a single Edit Profile screen to edit his or her own pro-file.

For every other user, the site administrator grants or denies access separately to each of the four remaining areas (Manage, View, Install, and Develop) from the View Users screen. The Server installation script creates a single user account for the site administrator, with both user name and password admin. The site administrator should log in and change the password immediately after the Server is installed.

Figure 32:
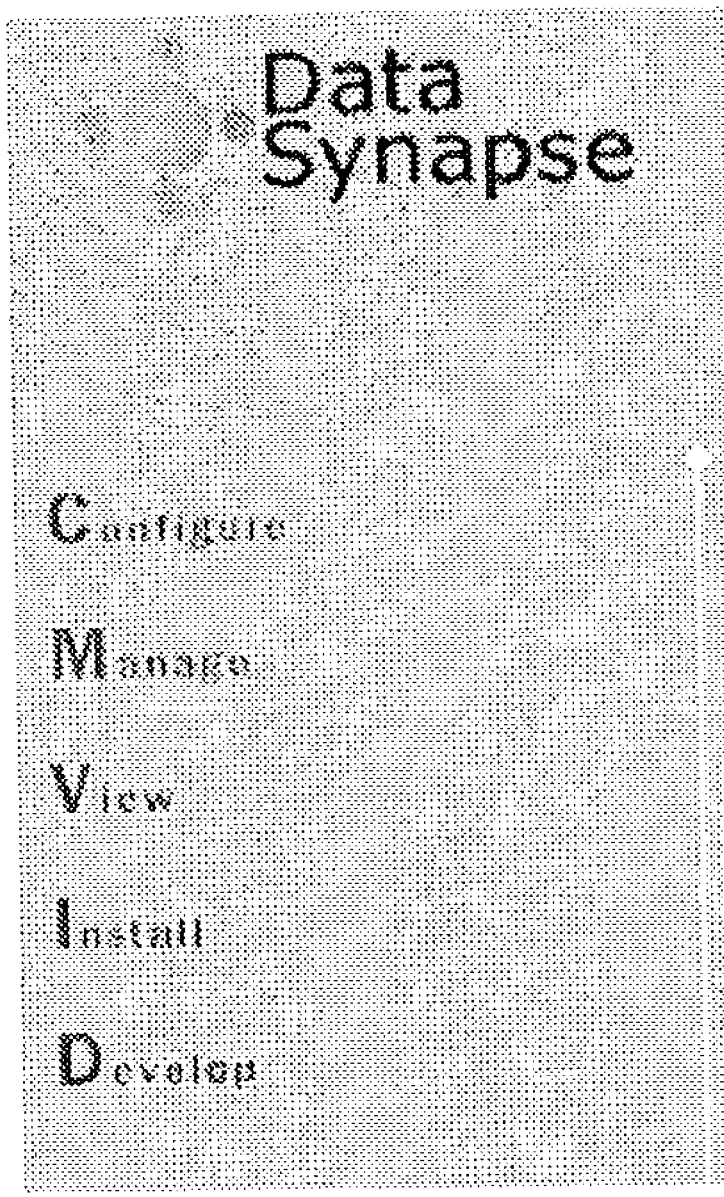

Navigating the Administration Tool
The administration tools are accessed through the navigation bar located on the left side of each screen (see FIG. 32). Click one of the links in the navigation bar to display options for that link. Click a link to navigate to the corresponding area of the site. (Note that the navigation bar displays only those areas that are accessible from the current account. If one is not using an administrative account with all privileges enabled, some options will not be visible.) At the bottom of the screen is the shortcut bar, containing the Logout tool, and shortcut links to other areas, such as Documentation and Product Information.

The Administration Tool is divided into five sections. Each section contains screens and tools that are explained in more detail in the next five chapters. The following tools are available in each of the sections.

The Configure Section
The Configure section contains tools to manage user accounts, profiles, Engines, Brokers, and Directors.

The Manage Section
The Manage section enables one to administer Jobs or Tasks that have been submitted, administer data sets or batch jobs, submit a test Job, or retrieve log files.

The View Section
The View section contains tools to list and examine Brokers, Engines, Jobs, and data sets. It's different from the Manage section in that tools focus on viewing information instead of modifying it, changing configuration, or killing Jobs. One can examine historical values to gauge performance, or troubleshoot one's configuration by watching the interaction between Brokers and Engines interactively.

In general, Lists are similar to the listed displays found in the Manage section, which can be refreshed on demand and display more information. Views are graphs implemented in a Java applet that updates in real-time.

The Install Section
The install section enables one to install Engines on one's Windows machine, or download the executable files and scripts needed to build installations distributable to Unix machines.

The Develop Section
The Develop section includes downloads and information such as Driver code, API Documentation, Documentation guides, Release Notes, and the Debug Engine.

The Configure Section
The Configure section contains tools to manage user accounts, profiles, Engines, Brokers, and Directors. To use any of the following tools, click Configure in the Navigation bar to display the list of tools. Then click a tool name to continue.

View/Edit Users

As an administrator, one can change information for existing user accounts. For example, one could change the name of an account, change an account's level of access, or delete an account entirely.

When one clicks View/Edit Users, one is presented with a list of defined users, as shown in FIG. 33. To change an existing user account, click the name listed in the Full Name column. The display shown in FIG. 34 will open. First, one must enter one's admin password in the top box to make any changes. Then, one can change any of the information for the user displayed. There is also a Subject and Message section; if one would like to notify the user that changes have been made to his/her account, enter an e-mail message in these fields. To make the change, click Submit. One can also delete the account completely by clicking Delete. If one would like to create a new user, one must use the New User Signup tool.

New User Signup

To add a new user, click New User Signup. One will be presented with a screen similar to FIG. 34. Enter in one's admin password and the information about the user, and click Submit. (Note that the Subject and Message fields for e-mail notification are already populated with a default message. The placeholders for username and password will be replaced with the actual username and password for the user when the message is sent.)

Edit Profile

The Edit Profile tool enables you to make changes to the account with which you are currently logged in. It also enables the admin to configure the Server to email notifications of account changes to users. For accounts other than admin, one must click Edit Profile, enter one's password in the top box, and make any changes one wishes to make to one's profile. This includes one's first name, last name and email address. One can also change one's password by entering a new password twice. When one has made the changes, one clicks the Submit button. If one is logged in as admin, one can also configure the Server to generate email notifications automatically whenever user accounts are added or modified. To activate this feature, one must provide an email address and the location of the SMTP server. The LiveCluster Server will generate mail from the administrator to the affected users. To disable the email feature, one simply clears the SMTP entry.

Engine Configuration

The Engine Configuration tool (see FIG. 35) enables one to specify properties for each of the Engine types that one deploys. To configure an Engine, one must first choose the Engine type from the File list. Then, enter new values for properties in the list, and click Submit next to each property to enter these values. Click Save to commit all of the values to the Engine configuration. One can also click Revert at any time before clicking Save to return to the configuration saved in the original file. For more information on any of the properties in the Engine Configuration tool, one can click Help.

Engine Properties

This tool (see FIG. 36) displays properties associated with each Engine that has logged in to this Server. A list of Engine IDs is displayed, along with the corresponding Machine Names and properties that are currently assigned to that Engine. These properties are used for discrimination, either in the Broker or the Driver. Properties can be set with this tool, or when an Engine is installed with the 1-Click Install with Tracking link and a tracking profile is created, which is described below, in the Engine Tracking Editor tool.

To change the properties assigned to an Engine, one must click the displayed Engine ID in the list. An edit screen (see FIG. 37) is displayed. If there are properties already assigned, one can change their value(s) in an editable box and click Submit, or click Remove to remove a property completely. To add a new property and value, one may enter them in the editable boxes at the bottom of the list and click Add. Once one has finished changing the properties, one may click Save. The properties will be sent to the Server, and the Engine will restart. (Note that if Broker discrimination is configured, it is possible to change or add a property that will prevent an Engine from logging back on again.)

Engine Tracking Editor

Engines can be installed with optional tracking parameters, which can be used for discrimination. When Engines are installed with the 1-Click Install with Tracking link, one is prompted for values for these parameters. This tool enables one to define what parameters are given to Engines installed in this method. By default, the parameters include MachineName, Group, Location, and Description. One can add more parameters by entering the parameter name in the Property column, entering a description of the property type in the Description column, and clicking the Add button. One can also remove parameters by clicking the Remove button next to the parameter one wants to remove.

Broker Configuration

Figure 38:
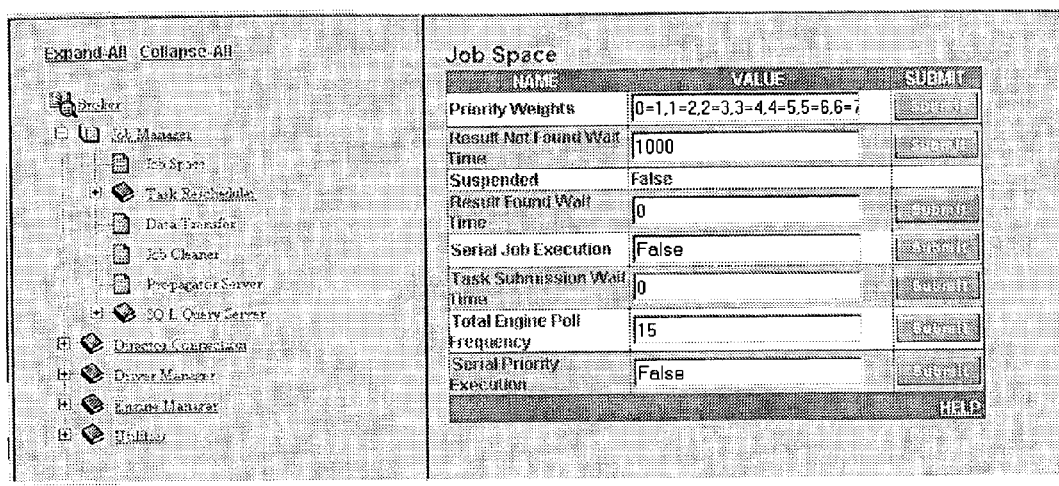

The Broker's attributes can be configured by clicking the Broker Configuration tool. This displays a hierarchical expanding/collapsing (see FIG. 38) list of all of the attributes of the Broker. One may click on the + and—controls in the left pane to show or hide attributes, or click Expand All or Collapse All to expand or collapse the entire list.

When one clicks on an attribute, its values are shown in the right pane. One can change an attribute in an editable box by entering a new value and clicking Submit. To find more information about each additional attribute, one may click Help in the lower right corner of the display. A help window will open with complete details about the attribute.

Broker Discrimination

One can configure Brokers to do discrimination on Engines and Drivers with the Broker Discrimination tool (see FIG. 39). First, one must select the Broker one wants to configure from the list at the top of the page. If one is only running a single Broker, there will only be one entry in this list. One can configure discriminators for both Driver properties and Engine properties. For Drivers, a discriminator is set in the Driver properties, and it prevents Tasks from a defined group of Drivers from being taken by this Broker. For Engines and Drivers, discriminators prevent login sessions from being established with a Broker, which changes routing between Brokers and Engines or Drivers.

Each discriminator includes a property, a comparator, and a value. The property is the property defined in the Engine or Driver, such as a group, OS or CPU type. The value can be either a number (double) or string. The comparator compares the property and value. If they are true, the discriminator is matched, and the Engine or Driver can login to a Broker. If they are false, the Driver can't log in to the Broker, and must use another Broker. In the case of an Engine, it won't be sent Tasks from that Broker. Note that both property names and values are case-sensitive.

One further option for each discriminator is the Negate other Brokers box. When this is selected, an Engine or Driver will be considered only for this Broker, and no others. For example, if one has a property named state and sets a discriminator for when state equals NY and selects Negate other Brokers, an Engine with state set to NY will go to this Broker, because other Brokers won't accept its login.

Once one has entered a property, comparator, and value, click Add. One can add multiple discriminators to a Broker by defining another discriminator and clicking Add again. Click Save to save all added discriminators to the Broker. When one saves discriminators, all Engines currently logged in will log out and attempt to log back in. This enables one to set a discriminator to limit a number of Engines and immediately force them to log off.

By default, if an Engine or Driver does not contain the property specified in the discriminator, the discriminator is not evaluated and considered false. However, one can select Ignore Missing Properties for both the Driver and Engine. This makes an Engine or Driver missing the property specified in a discriminator ignore the discriminator and continue. For example, if one sets a discriminator for state=Arizona, and an Engine doesn't have a state property, normally the Broker won't give the Engine Jobs. But if one selects Ignore Missing Properties, the Engine without properties will still get Jobs from the Broker.

Director Configuration

To configure the Director, an interface similar to the Broker Configuration tool described above is used. When one clicks Director Configuration, a hierarchy of attributes is shown, and one can click an attribute to change it. As with the Broker, the Director attributes have a Help link available.

Client Diagnostics

If one is troubleshooting issues with one's LiveCluster installation, one can generate and display client statistics using the Client Diagnostics tool (see FIG. 40). This generates tables or charts of information based on client messaging times.

To use client diagnostics, one must first select Client Diagnostics and then click the edit diagnostic options link. Set Enabled to true, click Submit, then click Save. This will enable statistics to be logged as the system runs. (Note that this can generate large amounts of diagnostic data, and it is recommended that one enable this feature only when debugging.) Click diagnostic statistics to return to the previous screen. Next, one must specify a time range for the analysis. Select a beginning and ending time range, or click Use all available times to analyze all information.

After selecting a time range, one can select what data is to be shown, and how it will be shown, either in a table or chart. For the tables, one must select one or more statistic(s) and one or more client(s). For charts, select only one client and one or more statistic for client charts; statistic charts require one to select one statistic and one or more client(s). The table or chart will be displayed in a new window.

Event Subscription

If one has enabled email notifications by entering a SMTP address in the admin profile, one can define a list of email addresses, and configure what event notifications are sent to each address with the Event Subscription tool (see FIG. 41). To enter a subscriber, click Add a Subscriber. To change events for a subscriber, click their name in the list. For each subscriber, enter a single email address in the Email box. This must be a full email address, in the form name@your.address.com. One can enter a string in the Filter box to limit notifications to events which contain the string in the event. For example, one could limit notifications to those about an Engine named Alpha by entering Alpha in the Filter box. When the box is left clear (the default), all events are considered for notification.

After specifying an email address and an optional filter, select which events one would like to monitor from the list below. Once one is done, click Submit. When each event occurs, the Server will send a short notification message to the specified email address. One can later edit a subscriber's events, filter, or email address by clicking the subscriber's name in the list presented when one selects the Event Subscription tool. One can also remove a name completely by clicking the Remove button next to it.

The Manage section enables one to administer Jobs or Tasks that have been submitted, administer data sets or batch jobs, submit a test Job, or retrieve log files. To use any of the following tools, click Manage in the Navigation bar to display a list of tools at the left. Then click a tool to continue.

Broker Administration

One can view Engines logged on to a Broker, or change the ratio of Engines to Drivers handled by a Broker, by using the Broker Administration tool (see FIG. 42). Each Broker logged on to the Director is listed, along with the number of busy and idle Engines logged onto it. Click on the Broker name in the Hostname column to display a list of the Engines currently logged in. To see the graphs depicting Broker statistics, click the Create button in the Monitor column. One can specify the number of jobs to be displayed in the Broker Monitor by changing the number in the box to the left of the Create button. The Engine Weight and Driver Weight boxes are used to set the ratio of Engines to Drivers that are sent to the Broker from the Director. By default, Engine Weight and Driver Weight are both 1, so the Broker will handle Engines and Drivers equally. This can also be changed so a Broker favors either Engines or Brokers. For example, changing Engine Weight to 10 and leaving Driver Weight at 1 will make the Broker handle Engines ten times more than Drivers. To update the list and display the most current information, click the Refresh button. One can also automatically update the list by selecting a value from the list next to the Refresh button.

Engine Administration

Figure 43:
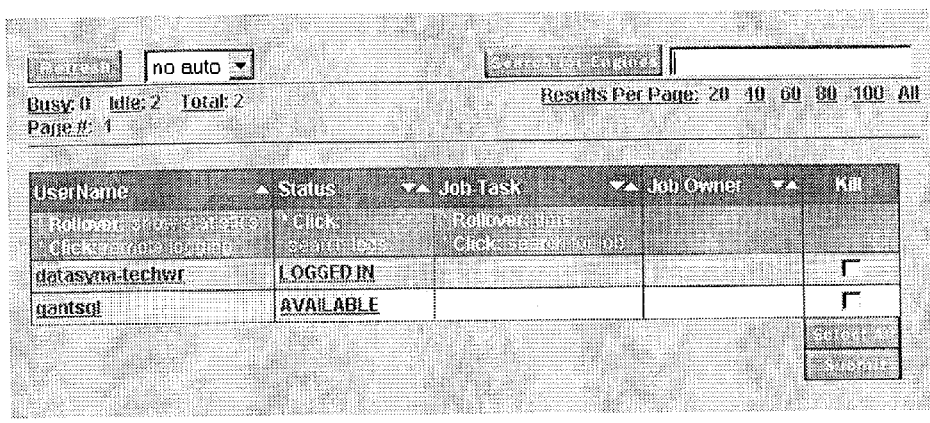

This tool (see FIG. 43) enables one to view and control any Engines currently controlled by one's Server. To update the list and display the most current information, click the Refresh button. One can also automatically update the list by selecting a value from the list next to the Refresh button.

Engines are displayed by username, with 20 Engines per page by default. One can select a greater number of lists per page, or display all of the Engines, by clicking a number or All next to Results Per Page on the top right of the screen. One can also find a specific Engine by entering the username in the box and clicking Search For Engines. The Status column displays if an Engine is available for work. If "Available" is displayed, the Engine is logged on and is ready for work. Engines marked as "Logged off" are no longer available. "Busy" Engines are currently working on a Task. Engines shown as "Logging in" are in the login process, and are possibly transferring files. One can also click the text in the Status column to open a window containing current server logs for that Engine.

To quickly find out more information about an Engine, one may move the mouse over the Engine username without clicking it. A popup window containing statistics will be shown (see FIG. 44). One can also click on an Engine username to display detailed logging on that Engine. If the Engine is currently processing a Job, it is displayed in the Job-Task column. Hover the mouse over the entry to display a popup with brief statistics on the Job currently being processed, or click on the entry for a more detailed log. Current Jobs also have their owner displayed in the Owner column.

Job Administration

One can view and administer Jobs posted to a Broker in the Job Administration section (see FIG. 45). Here, one is presented with a list of running, completed, and cancelled Jobs on the Broker. To get the most up-to-date information, click the Refresh button. One can also automatically refresh the page by selecting an interval from the list next to the Reload button.

While a Job is running, one can change its priority by selecting a new value from the list in the Priority column. Possible values range from 10, the highest, to 0, the lowest. One can click Remove Finished Jobs to display only pending Jobs, vary the number of results per page by clicking on a number, or find a specific Job by searching on its name, similar to the Engine Administration.

Jobs are shown in rows with UserName, JobName, Submit Time, Tasks Completed, and Status. To display information on a Job, point to the Job Name and a popup window containing statistics on the Job appears. For more information, click the Job Name and a graph will be displayed in a new window. One can also click on a Job's status to view its Broker and Director log files. To kill Jobs, select one or more Jobs by clicking the check box in the Kill column, or click Select All to kill all Jobs, then click Submit.

Data Set Administration

Jobs can utilize a DataSet, which is a reusable set of TaskInputs. Repeated Jobs will result in caching TaskInputs on Engines, resulting in less transfer overhead. One can click Data Set Administration to view all of the active Data Sets. One can also select Data Sets and click Submit to remove them; however, one will also need to kill the related Jobs. DataSets are usually created and destroyed with the Java API.

Batch Administration

Batch Jobs are items that have been registered with a Server, either by LiveDeveloper, by copying XML into a directory on the Server, or by a Driver. Unlike a Job, they don't immediately enter the queue for processing. Instead, they contain commands, and instructions to specify at what time the tools will execute. These events can remain on the Server and run more than once. Typically, a Batch Job is used to run a Job at a specific time or date, but can be used to run any command.

The Batch Administration tool (see FIG. 46) displays all Batch Jobs on the Server, and enables one to suspend, resume, or remove them. Each Batch Job is denoted with a name. A Type and Time specify when the Batch Job will start. If a Batch Job is Absolute, it will enter the queue at a given time. A Relative Batch Job is defined with a recurring time or a time relative to the current time, such as a Batch Job that runs every hour, or one defined in the cron format. Immediate jobs are already in the queue.

To suspend a Batch Job or resume a suspended Batch Job, select it in the Suspend/Resume column, and click the Submit button below that column. Batch Jobs can be killed by selecting them in the Remove column and clicking the Submit button below that column, or clicking Select All and then Submit. Killing a Batch Job does not kill any currently running Jobs that were created by that Batch Job. To kill these, one must use the Job Administration tool. Likewise, if one kills a Job from the Job Administration tool, one won't kill the Batch Job. For example, if there exists a Batch Job that runs a Job every hour, it is after 4:00, and one kills the Job that appears in the Job Administration tool, another Job will appear at 5:00. One must kill both the Job and the Batch Job to stop the Jobs completely.

Batch Jobs that are submitted by a Driver will only stay resident until the Server is restarted. To create a Batch Job that will always remain resident, one can create a Batch Job file. To do this, click new batch file to open the editor. One can also click the name of a Batch Job that was already created on the Server. One can then enter the XML for the Batch Job, specify a filename, and click Save to save the file, Submit to enter the file, or Revert to abandon the changes.

Test Job

To test a configuration, one can submit a test Job. This tool submits a Job using the standard Linpack benchmark, using an internal Driver. One can set the following parameters for a Linpack test:

| | |
|---|---|
| Job Name | Name of the Job in the Job Admin. |
| User Name | Name of the User in the Job Admin. |
| Tasks | Number of Tasks in the Job. |
| Priority | Job execution priority, with 10 being the highest, and 0 the lowest. |
| Duration | Average duration for Tasks in seconds. |
| Std Dev | Standard deviation of Task duration in percent. |
| Input Data | Size of Task input data in kilobytes. |
| Output Data | Size of Task output data in kilobytes. |
| Compression | Compress input and output data. |
| Parallel Collection | Start collecting results before all Tasks are submitted. |

After one has set the parameters, one clicks Submit to submit the Job. Once the Job is submitted, the Job Administration screen from the Manage section will be displayed. One can then view, update, or kill the Job.

Log Retrieval

Figure 47:
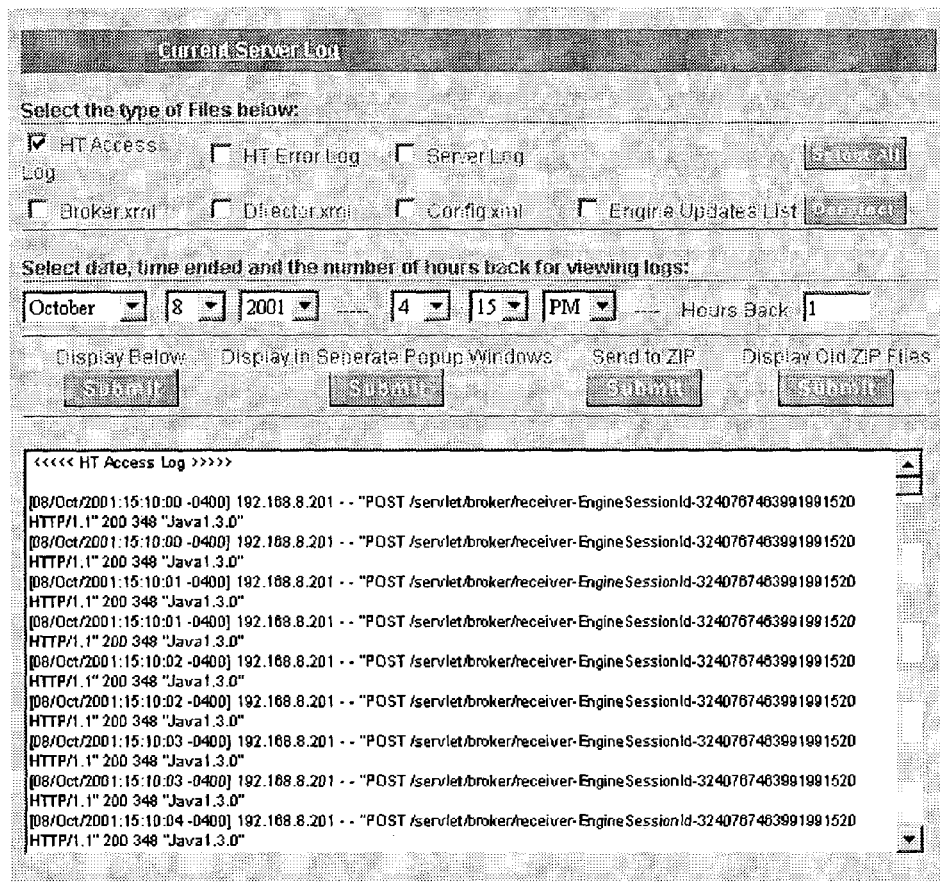

One can display current and historical log information for the Server with the Log Retrieval tool. The interface, displayed below, enables one to select a type of log file, a date range, and how one would like to display the log file. To view the current log file, click Current Server Log. The current log file is displayed (see FIG. 47), and any new log activity will be continuously added. One can use this feature to watch an ongoing Job's progress, or troubleshoot errors. At any time one is viewing the current log, click Snapshot to freeze the current results and open them in a new window. Also, one can click Clear to clear the current results. Click Past Logs to return to the original display.

To view a past log file, first choose what should be included in the file. Select one or more choices: HT Access Log, HT Error Log, Broker Log, Director Log, Broker.xml, Director.xml, Config.xml, and Engine Updates List. One can also click Select All to select all of the information. Next, select a date and time that the logs will end, and select the number of hours back from the end time that will be displayed. After one has chosen your data and a range, click one of the Submit buttons to display the data. One can choose to display data in the window below, in a new window, or in a zip file. One can also view any zip files you made in the past.

The View Section

The View section contains tools to list and examine Brokers, Engines, Jobs, and data sets. It's different from the Manage section in that tools focus on viewing information instead of modifying it, changing configuration, or killing Jobs. One can examine historical values to gauge performance, or troubleshoot the configuration by watching the interaction between Brokers and Engines interactively. In general, Lists are similar to the listed displays found in the Manage section, which can be refreshed on demand and display more information. Views are graphs implemented in a Java applet that updates in real-time. The following tools are available:

Broker List

The Broker List tool (see FIG. 48) displays all Brokers currently logged in. It also gives a brief overview of the number of Engines handled by each Broker. To update the list, click the Refresh button. One can also automatically update the display by selecting an interval from the list next to the Refresh button. Click a Broker's hostname to display its list of Engines. One can also click Create to show the Broker Monitor graph, described below.

Broker Monitor

Figure 49:
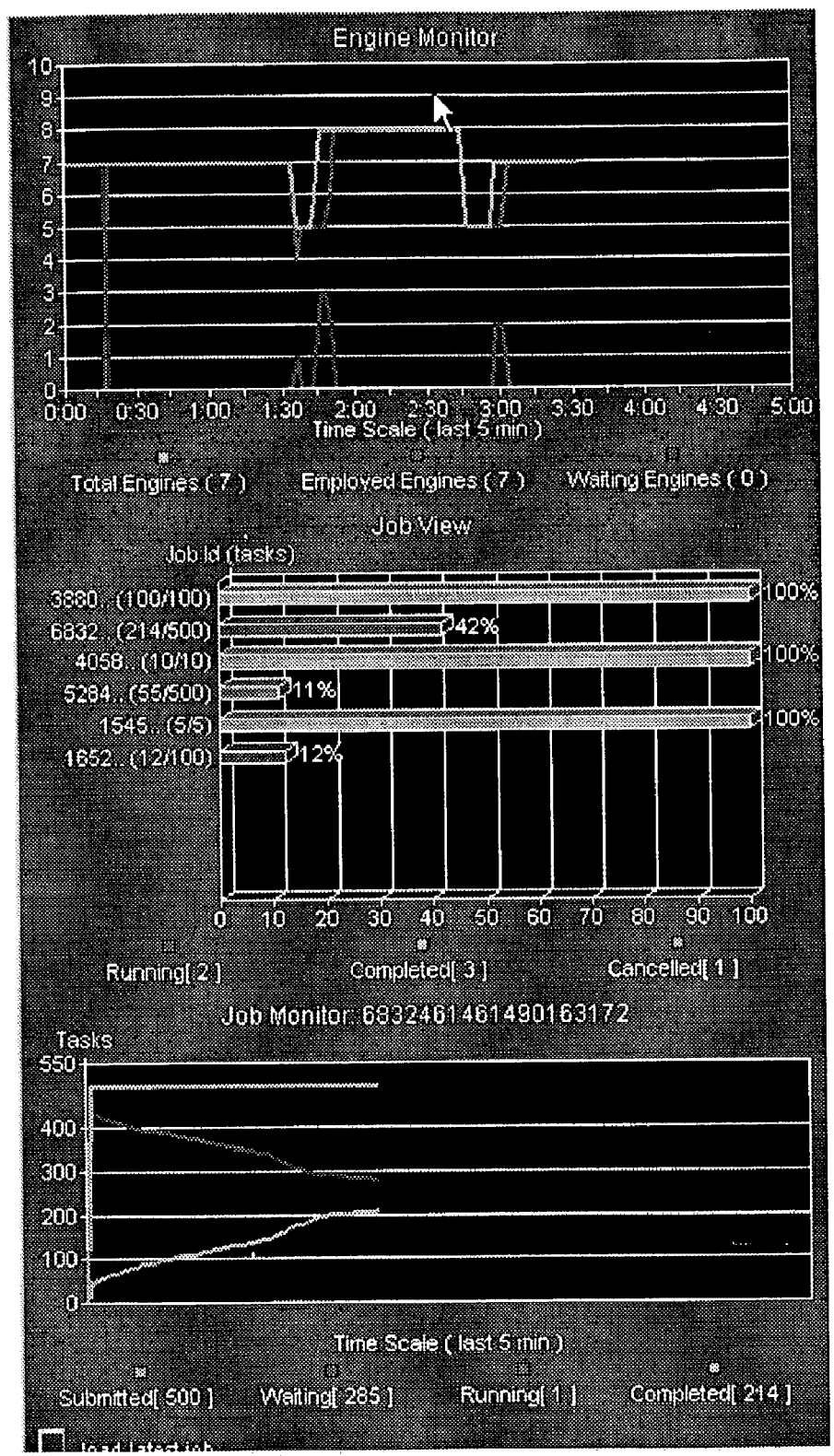

The Broker Monitor tool opens an interactive graph display (see FIG. 49) showing current statistics on a Broker. The top graph is the Engine Monitor, a view of the Engines reporting to the Broker, and their statistics over time. The total number of Engines is displayed in green. The employed Engines (Engines currently completing work for the Broker) are displayed in blue, and Engines waiting for work are displayed in red.

The middle graph is the Job View, which displays what Jobs have been submitted, and the number of Tasks completed in each Job. Running Jobs are displayed as blue bars, completed Jobs are grey, and cancelled Jobs are purple. The bottom graph, the Job Monitor, shows the current Job's statistics. Four lines are shown, each depicting Tasks in the Job. They are submitted (green), waiting (red), running (blue), and completed (grey) Tasks. If a newer Job has been submitted since you opened the Broker Monitor, click load latest job to display the newest Job.

Engine List

The Engine List provides the same information as the Engine Administration tool in the Manage section, such as Engines and what Jobs they are running. The only difference is the list only allows one to view the Engine list, while the Engine Administration tool also has controls that enable one to kill Jobs.

Engine View

The Engine View tool opens an interactive graph displaying Engines on the current Broker, similar to the Engine Monitor section of the Broker Monitor graph, described above.

Job List

The Job List (see FIG. 50) provides the same information as the Job Administration tool in the Manage section. The only difference is the list only allows one to view Jobs, while the Job Administration tool also has controls that enable you to kill Jobs and change their priority.

Data Set List

Figure 51:
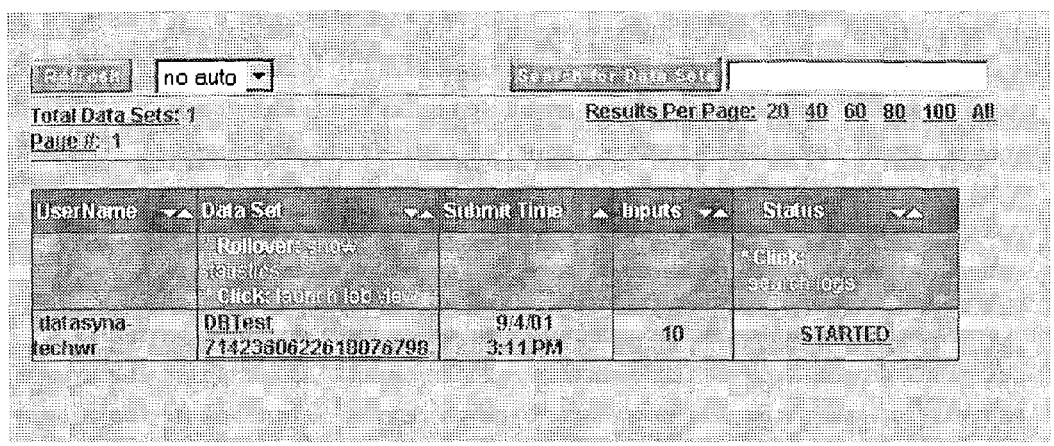

The Data Set List (see FIG. 51) provides the same information as the Data Set Administration tool in the Manage section. The only difference is the list only allows one to view Data Sets, while the Data Set Administration tool also has controls that enable one to make Data Sets unavailable.

Cluster Capacity

The Cluster Capacity tool (see FIG. 52) displays the capabilities of Engines reporting to a Server. This includes number of CPUs, last login, CPU speed, free disk space, free memory, and total memory. All Engines, including those not currently online, are displayed. One may click Online Engines Only to view only those Engines currently reporting to the Server, or click Offline Engines Only to view Engines that are not currently available.

The Install Section

The install section contains tools used to install Engine on one or more machines.

Engine Installation

The install screen (see FIG. 53) enables one to install Engines on a Windows machine, or download the executable files and scripts needed to build installations distributable to Unix machines.

Remote Engine Script

The remote Engine script is a Perl script written for Unix that enables one to install or start several DataSynapse Engines from a central Server on remote nodes. To use this script, download the file at the Remote Engine Script by can holding Shift and clicking the link, or right-click the link and selecting Save File As . . . .

The usage of the script is as follows:

dslremoteadmin.pl [ACTION] [-f filename|-m MACHINE-_NAME -p PATH_TO_DS]-s server [-n num_engines] [-i ui_idle_wait] [-D dist_name] [-c min_cpu_busy] [-C max-_cpu_busy] ACTION can be either install, configure, start, or stop: install installs the DSEngine tree on the remote node and configures the Engine with parameters specified on the command line listed above; configure configures the Engine with parameters specified on the command line as listed above; start starts the remote Engine; and stop stops the remote Engine.

One can specify resources either from a file or singularly on the command line using the -m machine and -p path options. The format of the resource file is: machine_name /path/to/install/dir.

Driver Downloads

The Driver is available in Java and C++ and source code is available for developers to download from this page. One can also obtain the Live Developer suite from this link.

LiveCluster API

One can view the LiveCluster API by selecting this tool. API documents are available in HTML as generated by JavaDoc for Java and by Doxygen for C++. Also, documentation is available for the LiveCluster XML API, in HTML format.

Documentation

This screen contains links to documentation about LiveCluster. Guides are included with the software distribution, in Adobe Acrobat format. To view a guide, click its link to open it. Note: one must have Adobe Acrobat installed to view the guides in pdf format.

Release Notes

This link opens a new browser containing notes pertaining to the current and previous releases.

Debug Engine Installation

A version of the Engine is available to provide debugging information for use with the Java Platform Debugger Architecture, or JPDA. This Engine does not contain the full functionality of the regular Engine, but does provide information for remote debugging via JPDA. One may select this tool to download an archive containing the Debug Engine.

Basic Scheduling

The Broker is responsible for managing the job space: scheduling Jobs and Tasks on Engines and supervising interactions with Engines and Drivers Overview Most of the time, the scheduling of Jobs and Tasks on Engines is completely transparent and requires no administration—the "Darwinian" scheduling scheme provides dynamic load balancing and adapts automatically as Engines come and go. However, one needs a basic understanding of how the Broker manages the job space in order to understand the configuration parameters, to tune performance, or to diagnose and resolve problems.

Recall that Drivers submit Jobs to the Broker. Each Job consists of one or more Tasks, which may be performed in any order. Conceptually, the Broker maintains a first-in/first-out queue (FIFO) for Tasks within each Job. When the Driver submits the first Task within a Job, the Broker creates a waiting Task list for that job, then adds this waiting list to the appropriate Job list, according to the Job's priority (see "Job-Based Prioritization," below). Additional Tasks within the Job are appended to the end of the waiting list as they arrive.

Whenever an Engine reports to the Broker to request Work, the Broker first determines which Job should receive service, then assigns the Task at the front of that Job's waiting list to the Engine. (The Engine may not be eligible to take the next Task, however—this is discussed in more detail below.) Once assigned, the Task moves from the waiting list to the pending list; the pending list contains all the Tasks that have been assigned to Engines. When an Engine completes a task, the Broker searches both the pending and waiting lists. If it finds the Task on either list, it removes it from both, and adds it to the completed list. (The Broker may also restart any Engines that are currently processing redundant instances of the same Task. If the Task is not on either list, it was a redundant Task that completed before the Engine restarted, and the Broker ignores it.)

Tasks migrate from the pending list back to the waiting list when the corresponding Engine is interrupted or drops out. In this case, however, the Broker appends the Task to the front, rather than the back, of the queue, so that Tasks that have been interrupted are rescheduled at a higher priority than other waiting Tasks within the same Job. Also, the Broker can be configured to append redundant instances of Tasks on the pending list to the waiting list; "Redundant Scheduling," below, provides a detailed discussion of this topic.

Discriminators: Task-Specific Engine Eligibility Restrictions

As indicated above, not every Task is eligible to run on every Engine. The Discriminator API supports task discrimination based on Engine-specific attributes. In effect, the application code attaches IDiscriminator objects to Tasks at runtime to restrict the class of Engines that are eligible to process them. This introduces a slight modification in the procedure described above: When an Engine is ineligible to take a Task, the Broker proceeds to the next Task, and so on, assigning the Engine the first Task it is eligible to take. Note that Discriminators establish hard limits; if the Engine doesn't meet the eligibility requirements for any of the Tasks, the Broker will send the Engine away empty-handed, even though Tasks may be waiting.

The Broker tracks a number of predefined properties, such as available memory or disk space, performance rating (megaflops), operating system, and so forth, that the Discriminator can use to define eligibility. The site administrator can also establish additional attributes to be defined as part of the Engine installation, or attach arbitrary properties to Engines "on the fly" from the Broker.

Job-Based Prioritization

Every LiveCluster Job has an associated priority. Priorities can take any integer value between zero and ten, so that there are eleven priority levels in all. 0 is the lowest priority, 10 is the highest, and 5 is the default. The LiveCluster API provides methods that allow the application code to attach priorities to Jobs at runtime, and priorities can be changed while a Job is running from the LiveCluster Administration Tool.

When the Driver submits a job at a priority level, it will wait in that priority queue until distributed by the Broker. Two boolean configuration parameters determine the basic operating mode: Serial Priority Execution and Serial Job Execution. When Serial Priority Execution is true, the Broker services the priority queues sequentially. That is, the Broker distributes higher priority Jobs, then moves to lower priority Jobs when higher priority Jobs are completed. When Serial Priority Execution is false, the Broker provides interleaved service, so that lower-priority queues with Jobs will receive some level of service even when higher-priority Jobs are competing for resources. Serial Job Execution has similar significance for Jobs of the same priority: When Serial Job Execution is true, Jobs of the same priority receive strict sequential service; the first Job to arrive is completed before the next begins. When Serial Job Execution is false, the Broker provides round-robin service to Jobs of the same priority, regardless of arrival time.

The Broker allocates resources among the competing priority queues based on the Priority Weights setting. Eleven integer weights determine the relative service rate for each of the eleven priority queues. For example, if the weight for priority 1 is 2, and the weight for priority 4 is 10, the Broker will distribute five priority-4 Tasks for every priority-1 Task whenever Jobs of these two priorities compete. (Priorities with weights less than or equal to zero receive no service when higher priority Tasks are waiting.) The default setting for both Serial Execution flags is false, and the default setting for the Priority Weights scales linearly, ranging from priority 0 at 1, and priority 10 at 11.

It is generally best to leave the flags at their default settings, so that low-priority Tasks don't "starve," and Jobs can't monopolize resources based on time of arrival. Robust solutions to most resource-contention problems require no more than two or three priority levels, but they do require some planning. In particular, the client application code needs to assign the appropriate priorities to Jobs at runtime, and the priority weights must be tuned to meet minimum service requirements under peak load conditions.

Polling Rates for Engines and Drivers

In addition to the serial execution flags and the priority weights, there are four remaining parameters under Job Space that merit some discussion. These four parameters govern the polling frequencies for Engines and Drivers and the rate at which Drivers upload Tasks to the Server; occasionally, they may require some tuning.

Engines constantly poll the Broker when they are available to take work. Likewise, Drivers poll the Broker for results after they submit Jobs. Within each such transaction, the Broker provides the polling entity with a target latency; that is, it tells the Engine or Driver approximately how long to wait before initiating the next transaction.

Total Engine Poll Frequency sets an approximate upper limit on the aggregate rate at which the available Engines poll the Broker for work. The Broker computes a target latency for the individual Engines, based on the number of currently available Engines, so that the total number of Engine polling requests per second is approximately equal to the Total Engine Poll Frequency. The integer parameter specifies the target rate in polls per second, with a default setting of 30.

The Result Found/Not Found Wait Time parameters limit the frequency with which Drivers poll the Server for Job results (TaskOutputs). Result Found Wait Time determines approximately how long a Driver waits, after it retrieves some results, before polling the Broker for more, and Result Not Found Wait Time determines approximately how long it waits after polling unsuccessfully. Each parameter specifies a target value in milliseconds, and the default settings are 0 and 1000, respectively. That is, the default settings introduce no delay after transactions with results, and a one-second delay after transactions without results.

The Task Submission Wait Time limits the rate at which Drivers submit TaskInputs to the Server. Drivers buffer the TaskInput data, and this parameter determines the approximate waiting time between buffers. The integer value specifies the target latency in milliseconds, and the default setting is 0.

The default settings are an appropriate starting point for most intranet deployments, and they may ordinarily be left unchanged. However, these latencies provide the primary mechanism for throttling transaction loads on the Server.

The Task Rescheduler

The Task Rescheduler addresses the situation in which a handful of Tasks, running on less-capable processors, might significantly delay or prevent Job completion. The basic idea is to launch redundant instances of long-running Tasks. The Broker accepts the first TaskOutput to return and cancels the remaining instances (by terminating and restarting the associated Engines). However, it's important to prevent "runaway" Tasks from consuming unlimited resources and delaying Job completion indefinitely. Therefore, a configurable parameter, Max Attempts limits the number of times any given Task will be rescheduled. If a Task fails to complete after the maximum number of retries, the Broker cancels all instances of that Task, removes it from the pending queue, and sends a FatalTaskOutput to the Driver.

Three separately configurable strategies govern rescheduling. The three strategies run in parallel, so that tasks are rescheduled whenever one or more of the three corresponding criteria are satisfied. However, none of the rescheduling strategies comes into play for any Job until a certain percentage of Tasks within that Job have completed; the Strategy Effective Percent parameter determines this percentage.

More precisely, the Driver notifies the Broker when the Job has submitted all its Tasks (from Java or C++, this notification is tied to the return from the createTaskInputs method within the Job class). At that point, the number of Tasks that have been submitted is equal to the total Task count for the Job, and the Broker begins monitoring the number of Tasks that have completed. When the ratio of completed Tasks to the total exceeds the Strategy Effective Percent, the rescheduling strategies begin operating.

The rescheduler scans the pending Task list for each Job at regular intervals, as determined by the Interval Millis parameter. Each Job has an associated taskMaxTime, after which Tasks within that Job will be rescheduled. When the strategies are active (based on the Strategy Effective Percent), the Broker tracks the mean and standard deviation of the (clock) times consumed by each completed Task within the Job. Each of the three strategies uses one or both of these statistics to define a strategy-specific time limit for rescheduling Tasks.

Each time the rescheduler scans the pending list, it checks the elapsed computation time for each pending Task. Initially, rescheduling is driven solely by the taskMaxTime for the Job; after enough Tasks complete, and the strategies are active, the rescheduler also compares the elapsed time for each pending Task against the three strategy-specific limits. If any of the limits is exceeded, it adds a redundant instance of the Task to the waiting list. (The Broker will reset the elapsed time for that Task when it gives the redundant instance to an Engine.)

The Reschedule First flag determines whether the redundant Task instance is placed at the front of the back of the waiting list; that is, if Reschedule First is true, rescheduled Tasks are placed at the front of the queue to be distributed before other Tasks that are waiting. The default setting is false, which results in less aggressive rescheduling. Thus, the algorithm that determines the threshold for elapsed time, after which Tasks are rescheduled, can be summarized as:

```
if (job.completedPercent > strategyEffectivePercent) {
    threshold := min(job.taskMaxTime,
        percentCompletedStrategy.limit,
        averageStrategy.limit,
        standardDevStrategy.limit)
} else threshold := job.taskMaxTime
```

Each of the three strategies computes its corresponding limit as follows:

The Percent Completed Strategy returns the maximum long value (effectively infinite, so there is no limit) until the number of waiting Tasks, as a fraction of the total number of Tasks, falls below the Remaining Task Percent parameter, after which it returns the mean completion time. In other words, this strategy only comes into play when the Job nears completion (as determined by the Remaining Task Percent setting), after which it begins rescheduling every pending Task at regular intervals, based on the average completion time for Tasks within the Job:

```
if (percentCompleted < remainingTaskPercent) {
    percentCompletedStrategy.limit := Long.MAX_VALUE
} else percentCompletedStrategy.limit := mean
```

The default setting for Remaining Task Percent is 1, which means that this strategy becomes active after the Job is 99% completed.

The Average Strategy returns the product of the mean completion time and the Average Limit parameter (a double). That is, this strategy reschedules Tasks when their elapsed time exceeds some multiple (as determined by the Average Limit) of the mean completion time:

averagestrategy.limit :=averagelimit*mean

The default setting for Average Limit is 3.0, which means that it reschedules Tasks after they take at least three times as long as average.

The Standard Dev Strategy returns the mean plus the product of the Standard Dev Limit parameter (a double) and the standard deviation of the completion times. That is, this strategy reschedules Tasks when their elapsed time exceeds the mean by some multiple (as determined by the Standard Dev Limit) of the standard deviation:

standardDevStrategy.limit :=mean+
(standardDevLimit*standardDeviation)

The default setting for Standard Dev Limit is 2.0, which means that it reschedules Tasks after they exceed the average by two standard deviations, or in other words, after they've taken longer than about 98% of the completed Tasks.

(Note that if Reschedule First is true, then Tasks are guaranteed to either complete or fail within MaxAttempts*MaxTaskTime.)

Tuning the Rescheduler

Task rescheduling addresses three basic issues:

It prevents a small number of less capable processors from significantly degrading Job performance and provides fault tolerance and graceful failure when Engine-specific problems prevent Tasks from completing on individual Engines.

It prevents "runaway" Tasks from consuming unlimited resources and delaying Job completion indefinitely.

It provides a fail-safe system to insure that all Tasks will complete, despite unexpected problems from other systems.

The default settings are reasonable for many environments, but any configuration represents a compromise, and there are some pitfalls to watch out for. In general, aggressive rescheduling is appropriate when there are abundant resources, but with widely differing capabilities. Conversely, to utilize smaller pools of more nearly identical Engines most efficiently, rescheduling should only be configured to occur in exceptional situations.

In case this is not possible, it may be necessary to substantially curtail, or even disable, the rescheduling strategies, to prevent repeated rescheduling and ultimately, cancellation, of long-running Tasks, In many cases, it may be possible to reduce the impact of heterogeneous resources by applying discriminators to route long-running Tasks (at least, those that can be identified a priori) to more capable processors. (This is generally a good idea in any case, since it smoothes turnaround performance with no loss of efficiency.)

Another approach that can be effective in the presence of abundant resources is simply to increase the Max Attempts setting, to allow more rescheduling attempts before a Task is cancelled and returns a FatalTaskOutput. Jobs with very few Tasks also work best without rescheduling. For example, with a setting of 40% for Strategy Effective Percent, the strategies would become active for a Job with ten Tasks after only four of those Tasks had completed. Therefore, in cases where Jobs have very few Tasks, Strategy Effective Percent should be increased. (For example, a setting of 90% ensures that at least nine Tasks complete before launching the strategies, and a setting of 95% requires at least nineteen.)

Finally, note that it is seldom a good idea to disable rescheduling altogether, for example by setting Max Attempts to zero. Otherwise, a single incapacitated or compromised Engine can significantly degrade performance or prevent Tasks from completing. Nor should one completely disable the rescheduling strategies without ensuring that every Job is equipped with a reasonable taskMaxTime. Without this backstop, runaway application code can permanently remove Engines from service (that is, until an administrator cancels the offending Job manually from the management area on the Server).

The Task Data Set Manager

TaskDataSet addresses applications in which a sequence of operations are to be performed on a common input dataset, which is distributed across the Engines. A typical example would be a sequence of risk reports on a common portfolio, with each Engine responsible for processing a subset of the total portfolio.

In terms of the LiveCluster API, a TaskDataSet corresponds to a sequence of Jobs, each of which shares the same collection of TaskInputs, but where the Tasklet varies from Job to Job. The principal advantage of the TaskDataSet is that the scheduler makes a "best effort" to assign each TaskInput to the same Engine repeatedly, throughout the session. In other words, whenever possible, Engines are assigned TaskInputs that they have processed previously (as part of earlier Jobs within the session). If the TaskInputs contain data references, such as primary keys in a database table, the application developer can cache the reference data on an Engine and it will be retained.

The Broker minimizes data transfer by caching the TaskInputs on the Engines. The Task Data Set Manager plug-in manages the distributed data. When Cache Type is set to 0, the Engines cache the TaskInputs in memory; when Cache Type is set to 1, the Engines cache the TaskInputs on the local file system. Cache Max and Cache Percent set limits for the size of each Engine's cache. Cache Max determines an absolute limit, in megabytes. Cache Percent establishes a limit as a percentage of the Engine's free memory or disk space (respectively, depending on the setting of Cache Type).

The Data Transfer Plug-In

The Data Transfer plug-in manages the transfer of TaskInput and Tasklet objects from the Broker to the Engines and the transfer of TaskOutput objects from the Broker to the Drivers. By default, direct data transfer is configured, and the data transfer configuration specified in this plug-in is not used. However, if direct data transfer is disabled, these settings are used. Under the default configuration, the Broker saves the serialized data to disk. When the Broker assigns a Task to an Engine, the Engine picks up the input data at the location specified by the Base URL. Similarly, when the Broker notifies a polling Driver that output data is available, the Driver retrieves the data from the location specified by the Output URL. Both of these URLs must point to the same directory on the Server, as specified by the Data Directory. This directory is also used to transfer instructions (the Tasklet definitions) to the Engines. Alternatively, the Broker can be configured to hold the data in memory and accomplish the transfer directly, by enclosing the data within messages. Two flags, Store Input to Disk and Store Output to Disk, determine which method is used to transfer input data to Engines and output data to Drivers, respectively. (The default setting is true in each case; setting the corresponding flag to false selects direct transfer from memory.) This default configuration is appropriate for most situations. The incremental performance cost of the round trip to disk and slight additional messaging burden is rarely significant, and saving the serialized Task data to disk reduces memory consumption on the Server. In particular, the direct-transfer mode is feasible only when there is sufficient memory on the Server to accommodate all of the data. Note that in making this determination, it is important to account for peak loads. Running in direct-transfer mode with insufficient memory can result in java.lang.OutOfMemory-Errors from the Server process, unpredictable behavior, and severely degraded performance.

The Job Cleaner

The Job Cleaner plug-in is responsible for Job-space housekeeping, such as cleaning up files and state history for Jobs that have been completed or canceled. This plug-in deletes data files associated with Jobs on a regular basis, and cleans the Job Manage and View pages. It uses the Data Transfer plug-in to find the data files. If a Job is finished or cancelled, the files are deleted on the next sweep. The plug-in sweeps the Server at regular intervals, as specified by the integer Attempts Per Day (the default setting of 2 corresponds to a sweep interval of every 12 hours). The length of time in hours Jobs will remain on the Job Admin page after finished or cancelled is specified by the integer Expiration Hours.

The Driver and Engine Managers

The Driver and Engine Managers play analogous roles for Drivers and Engines, respectively. They maintain the server state for the corresponding client/server connections. The Broker maintains a server-side proxy corresponding to each active session; there is one session corresponding to each Driver and Engine that is logged in.

The Driver Service and Employment Office Plug-Ins

The Driver Service plug-in is responsible for the Driver proxies. Max Number of Proxies sets an upper limit on the number of Drivers that can log in concurrently. The default value of 100,000, and is typically not modified.

The Employment Office plug-in maintains the Engine proxies. In this case, Max Number of Proxies is set by the license, and cannot be increased be increased beyond the limit set by the license. (Although it can be set below the limit imposed by the license.)

The Login Managers

Both the Driver and Engine Managers incorporate Login Managers. The Login Managers maintain the HTTP connections with corresponding clients (Drivers and Engines), and monitor the heartbeats from active connections for timeouts. User-configurable settings under the HTTP Connection Managers include the URL (on the Broker) for the connections, timeout periods for read and write operations, respectively, and the number times a client will retry a read or write operation that times out before giving up and logging a fatal error. The Server install script configures the URL settings, and ordinarily, they should never be modified thereafter. The read/write timeout parameters are in seconds; their default values are 10 and 60, respectively. (Read operations for large blocks of data are generally accomplished by direct downloads from file, whereas uploads may utilize the connection, so the write timeout may be substantially longer.) The default retry limit is 3. These default settings are generally appropriate for most operating scenarios; they may, however, require some tuning for optimal performance, particularly in the presence of unusually large datasets or suboptimal network conditions.

The Driver and Engine Monitors track heartbeats from each active Driver and Engine, respectively, and ends connections to Drivers and Engines which no longer respond. The Checks Per Minute parameters within each plug-in determine the frequency with which the corresponding monitor sweeps its list of active clients for connection timeouts. Within each monitor, the heartbeat plug-in determines the approximate target rate at which the corresponding clients (Drivers or Engines) send heartbeats to the Broker, and set the timeout period on the Broker as a multiple of the target rate. That is, the timeout period in milliseconds (which is displayed in the browser as well) is computed as the product of the Max Millis Per Heartbeat and the Timeout Factor. (It may be worth noting that the actual latencies for individual heartbeats vary randomly between the target maximum and ⅔ of this value; this randomization is essential to prevent ringing for large clusters.)

The default setting for each maximum heartbeat period is 30,000 (30 seconds) and for each timeout factor, 3, so that the default timeout period for both Drivers and Engines is 90 seconds. By default, the Broker Manager checks for timeouts 10 times per minute, while the Engine Manager sweeps 4 times per minute. (Typically, there are many more Engines than Drivers, and Engine outages have a more immediate impact on application performance.)

Other Manager Components

The Engine File Update Server manages file updates on the Engines, including both the DataSynapse Engine code and configuration itself, and user files that are distributed via the directory replication mechanism.

The Native Job Adapter

The Native Job Adapter provides services to support applications that utilize the C++ or XML APIs. The basic idea is that the Broker maintains a "pseudo Driver" corresponding to each C++ or XML Job, to track the connection state and perform some of the functions that would otherwise be performed by the Java Driver.

The Result Found and Result Not Found Wait Times have the same significance as the corresponding settings in the Job Space plug-in, except that they apply only to the pseudo Drivers. The Base URL for connections with native Jobs is set by the install script, and should ordinarily never change thereafter.

The other settings within the Native Job Adapter plug-in govern logging for the Native Bridge Library, which is responsible for loading the native Driver on each Engine: a switch to turn logging on and off, the log level (1 for the minimum, 5 for the maximum), the name of the log file (which is placed within the Engine directory on each Engine that processes a native Task), and the maximum log size (after which the log rolls over). By default, logging for the Native Bridge is disabled.

The Native Job Store plug-in comes into play for native Jobs that maintain persistence of Task-Outputs on the Broker. (Currently, these include Jobs that set a positive value for hoursTo-KeepData or are submitted via the JobSubmitter class.) The Data Directory is the directory in the Broker's local file system where the TaskOutputs are stored; this directory is set by the install script, and should ordinarily not be changed. The Attempts Per Day setting determines the number of times per day that the Broker sweeps the data directory for TaskOutputs that are no longer needed; the default setting is 24 (hourly).

Utilities

The Utilities plug-in maintains several administrative functions. The Revision Information plug-in provides read-only access to the revision level and build date for each component associated with the Broker. The License plug-in, together with its License Viewer component, provides similar access to the license settings.

The Log File plug-in maintains the primary log file for the Broker itself. Settings are available to determine whether log messages are written to file or only to the standard output and error streams, the location of the log file, whether to log debug information or errors only, the log level (when debug messages are enabled), the maximum length of the log file before it rolls over, and whether or not to include stack traces with error messages.

The Mail Server generates mail notifications for various events on the Broker. The SMTP host can be set here, or from the Edit Profile screen for the site administrator. (If this field is blank or "not set," mail generation is disabled.)

The Garbage Collector monitors memory consumption on the Broker and forces garbage collection whenever the free memory falls below a threshold percentage of the total available memory on the host. Configuration settings are available to determine the threshold percentage (the default value is 20%) and the frequency of the checks (the default is once per minute).

The remaining utility plug-ins are responsible for cleaning up log and other temporary files on the Broker. Each specifies a directory or directories to sweep, the sweep frequency (per day), and the number of hours that each file should be maintained before it is deleted. There are also settings to determine whether or not the sweep should recurse through subdirectories and whether to clean out all pre-existing files on startup. Ordinarily, the only user modification to these settings might be to vary the sweep rate and expiration period during testing.

Directory Replication and Synchronization

Mechanism Overview

The LiveCluster system provides a simple, easy-to-use mechanism for distributing dynamic libraries (.dll or .so), Java class archives (.jar), or large data files that change relatively infrequently. The basic idea is to place the files to be distributed within a reserved directory on the Server. The system maintains a synchronized replica of the reserved directory structure for each Engine. Updates can be automatically made, or manually triggered. Also, an Engine file update watchdog can be configured to ensure updates only happen when the Broker is idle.

Server-Side Directory Locations

A directory system resides on the Server in which you can put files that will be mirrored to the Engines. The location of these directories is outlined below.

Server-Side Directories for Windows

Server-side directories are located in the Server install location (usually c:\Datasynapse\Server) plus \livecluster\public_html\updates. Within that directory are two directories: datasynapse and resources. The datasynapse directory contains the actual code for the Engine and support binaries for each platform. The resources directory contains four directories: shared, win32, solaris, and linux. This shared directory is mirrored to all Engine types, and the other three are mirrored to Engines running the corresponding operating system.

Server-Side Directories for Unix

For Servers installed under Unix, the structure is identical, but the location is the installation directory (usually /opt/datasynapse) plus /Server/Broker/public_html/updates/resources. The directories are also shared, win32, solaris, and linux.

Engine-Side Directory Locations

A similar directory structure resides in each Engine installation. This is where the files are mirrored. The locations are described below.

Engine-Side Directories for Windows

The corresponding Engine-side directory is located under the root directory for the Engine installation. The default location on Windows is: C:\Program Files\DataSynapse\Engine\resources and contains the replicated directories shared and win32.

Engine-Side Directories for Unix

The corresponding Engine-side directory on Unix is the Engine install directory (for example, /usr/local) plus /DSEngine/resources and contains the replicated directories shared and linux for Linux Engines or solaris for Solaris Engines.

Configuring directory replication

The system can be configured to trigger updates of the replicas in one of two modes:

Automatic update mode. The Server continuously polls the file signatures within the designated subdirectories and triggers Engine updates whenever it detects changes; to update the Engines, the system administrator need only add or overwrite files within the directories.

Manual update mode. The administrator ensures that the correct files are located in the designated subdirectories and triggers the updates manually by issuing the appropriate tools through the Administration tool.

Configuring Automatic Directory Updates

1. In the Configure section of the Administration tool, select the Broker Configuration tool.

2. Click Engine Manager, then select Engine File Update Server.

3. Set the value of Enabled to true.

Once this is set, files added or overwritten within the Server resources directory hierarchy will automatically update on the Engines. The value of Minutes Per Check determines the interval at which the Server polls the directory for changes Manually Updating files To update all files to the Engines manually, set Update Now to true, and click Submit. This triggers the actual transfer of files from the Server to the Engines, and returns the value of Update Now.to false.

The Engine File Update Watchdog

By default, the Broker is configured so updates to the Engine files will only happen when the Broker is idle. The Engine file update watchdog provides this function when enabled, and ensures that all Engines have the same files. When enabled, the watchdog ensures that Engine files are not updated unless there are no Jobs in progress. If a file update is requested (either automatically or manually), the watchdog does not allow any new Jobs to start, and waits for currently running Jobs to complete. When no Jobs are running or waiting, the update will occur.

If the running Jobs don't complete within the specified update period (the default is 60 minutes), the update will not happen, and Jobs will once again be allowed to start. If this happens, one can either try to trigger an update again, specify a longer update period, or try to manually remove Jobs or stop sending new Jobs. When there is a pending update, a notice will be displayed at the top of the Administration Tool. Also, an email notification is sent on update requests, completions, and timeouts if one subscribes to the FileUpdateEvent with the Event Subscription tool.

Using Engines with Shared Network Directories

Instead of using directory replication, one can also provide Engines with common files with a shared network directory, such as an NFS mounted directory. To do this, simply provide a directory on a shared server that can be accessed from all of the Engines. Then, go to the Configure section of the Administration tool, select Engine Configuration, and change the Class directory to point to the shared directory. When one updates the files on the shared server, all of the Engines will be able to use the same files.

CPU Scheduling for Unix

Unix Engines provide the ability to tune scheduling for multi-CPU platforms. This section explains the basic theory of Engine distribution on multi-CPU machines, and how one can configure CPU scheduling to run an optimal number of Engines per machine.

A feature of LiveCluster is that Engines completing work on PCs can be configured to avoid conflicts with regular use of the machine. By configuring an Engine, one can specify at what point other tasks take greater importance, and when a machine is considered idle and ready to take on work. This is called adaptive scheduling, and can be configured to adapt to one's computing environment, be it an office of PCs or a cluster of dedicated servers.

With a single-CPU computer, it's easy to determine when this work state takes place. For example, using the Unix Engine, one can specify a minimum and maximum CPU threshold, using the -c and -C switches when running the configure.sh Engine installation script. When non-Engine CPU utilization crosses below the minimum threshold, an Engine is allowed to run; when the maximum CPU usage on the machine is reached, the Engine exits and any Jobs it was processing are rescheduled.

With a multi-CPU machine, the processing power is best utilized if an Engine is run on each processor. However, determining a machine's collective available capacity isn't as straightforward as with a single-CPU system. Because of this, Unix Engines have two types of CPU scheduling available to determine how Engines behave with multiprocessor systems.

Nonincremental Scheduling

The simple form of CPU scheduling is called absolute, or nonincremental scheduling. In this method, minimum and maximum CPU utilization refers to the total system CPU utilization, and not individual CPU utilization. This total CPU utilization percentage is calculated by adding the CPU utilization for each CPU and dividing by the number of CPUs. For example, if a four-CPU computer has one CPU running at 50% utilization and the other three CPUs are idle, the total utilization for the computer is 12.5%.

With nonincremental scheduling, a minimum CPU and maximum CPU are configured, but they refer to the total utilization. Also, they simultaneously apply to all Engines. So if the maximum CPU threshold is set at 25% on a four-CPU machine and four Engines are running, and a non-Engine program pushes the utilization of one CPU to 100%, all four Engines will exit. Note that even if the other three CPUs are idle, their Engines will still exit. In this example, if the minimum CPU threshold was set at 5%, all four Engines would restart when total utilization was below 5%. By default, the Unix Engine uses nonincremental scheduling. Also, Windows Engines always use this method.

Incremental Scheduling

Incremental scheduling is an alternate method implemented in Unix Engines to provide better scheduling of when Engines can run on multi-CPU computers. To configure incremental scheduling, use the -I switch when running the configure.sh Engine installation script. With incremental scheduling, minimum CPU and maximum CPU utilization refers to each CPU. For example, if there is an Engine running on each CPU of a multi-CPU system, and the maximum CPU threshold is set at 80%, and a non-Engine program raises CPU utilization above 80% on that CPU, that Engine will exit, and other Engines will continue to run until their CPU reaches the maximum utilization threshold. Also, an Engine would restart on that CPU when that CPU's utilization dropped below the minimum CPU utilization threshold.

The CPU scheduler takes the minimum and maximum per/CPU settings specified at Engine installation and normalizes the values relative to total system utilization. When these boundaries are crossed, and Engine is started or shut down and the boundaries are recalculated to reflect the change in running processes. This algorithm is used because, for example, a 50% total CPU load on an eight processor system is typically due to four processes each using 100% of an individual CPU, rather than sixteen processes each using 25% of a CPU.

The normalized values are calculated with the following assumptions:

1. System processes will be scheduled such that a single CPU is at maximum load before other CPUs are utilized.
2. For computing maximum thresholds, CPUs which do not have Engines running on them are taken to run at maximum capacity before usage encroaches onto a CPU being used by an Engine.
3. For computing minimum thresholds, CPUs which do not have Engines running on them are taken to be running at least the per/CPU maximum threshold.

The normalized utilization of the computer is calculated by the following formulas. The maximum normalized utilization (Unmax) equals:.

$$U_{n\max} = \frac{U_{\max}}{C_t} + \frac{U_{tot}}{C_t}[C_t - C_r]$$

Where
 $U_{max}$=Per-CPU maximum (user specified);
 $U_{tot}$=Maximum value for CPU utilization (always 100);
 $C_t$=Total number of CPUs; and,
 Cr=Number of CPUs running Engines.

The minimum normalized utilization ($U_{nmin}$) equals:

$$U_{n\min} = \frac{U_{\min}}{C_t} + \frac{U_{\max}}{C_t}[C_t - C_r - 1]$$

The variables are the same as above, with the addition of $U_{min}$=per-CPU minimum.

The LiveCluster API

The LiveCluster API is available in both C++, called Driver++, and Java, called JDriver. There is also an XML facility that can be used to configure or script Java-based Job implementations.

The Tasklet is analogous with the Servlet interface, part of the Enterprise Java Platform. For example, a Servlet handles web requests, and returns dynamic content to the web user. Similarly, a Tasklet handles a task request given by a TaskInput, and returns the completed task with TaskOutput.

The three Java interfaces (TaskInput, TaskOutput, and Tasklet) have corresponding pure abstract classes in C++. There is also one partially implemented class, with several abstract/virtual methods for the developer to define, called Job.

The C++ API also introduces one additional class, Serializable, to support serialization of the C++ Task objects.

How It Works

To write an application using LiveCluster, one's application should organize the computing problem into units of work, or Jobs. Each Job will be submitted from the Driver to the Server. To create a Job, the following steps take place:

3. Each Job is associated with an instance of Tasklet.
4. One TaskOutput is added to the Job to collect results.
5. The unit of work represented by the Job is divided into Tasks. For each Task, a TaskInput is added to the Job.
6. Each TaskInput is given as input to a Tasklet running on an Engine. The result is returned to a TaskOutput. Each TaskOutput is returned to the Job, where it is processed, stored, or otherwise used by the application.

All other handling of the Job space, Engines, and other parts of the system are handled by the Server. The only classes one's program must implement are the Job, Tasklet, TaskletInput, and TaskletOutput. This section discusses each of these interfaces, and the corresponding C++ classes.

TaskInput

TaskInput is a marker that represents all of the input data and context information specific to a Task. In Java, TaskInput extends the java. 10. Serializable interface:

public interface TaskInput extends java.io.Serializable {
}.

In C++, TaskInput extends the class Serializable, so it must define methods to read and write from a stream (this is discussed in more detail below):

```
class TaskInput : public Serializable {
    public: virtual ~TaskInput( ) { }
};
```

The examples show a Monte Carlo approach to calculating Pi (see FIGS. 54–55).

TaskOutput

TaskOutput is a marker that represents all of the output data and status information produced by the Task. (See FIGS. 56–57.)

Like TaskInput, TaskOutput extends the java.io.Serializable interface:

public interface TaskOutput extends java.io.Serializable { }

Similarly, the C++ version extends the class Serializable, so it must define methods to read and write from a stream:

```
class TaskOutput : public Serializable {
    public:
        virtual ~TaskOutput( ) { }
};
```

Tasklet

The Tasklet defines the work to be done on the remote Engines. (See FIGS. 58 and 59A–B.) There is one command-style method, service, that must be implemented.

Like TaskInput and TaskOutput, the Java Tasklet extends java.io.Serializable. This means that the Tasklet objects may contain one-time initialization data, which need only be transferred to each Engine once to support many Tasklets from the same Job. (The relationship between Tasklets and TaskInput/TaskOutput pairs is one-to-many.) In particular, for maximum efficiency, shared input data that is common to every task invocation should be placed in the Tasklet, and only data that varies across invocations should be placed in the TaskInputs.

As above, the Java implementation requires a default constructor, and any non-transient fields must themselves be serializable:

```
public interface Tasklet extends java.io.Serializable {
    public TaskOutput service(TaskInput input);
}
```

The C++ version is equivalent. It extends the class Serializable, so it must define methods to read and write from a stream:

```
class Tasklet : public Serializable {
    public:
        virtual TaskOutput* service(TaskInput* input) = 0;
        virtual ~Tasklet( ) { }
};
```

Job

A Job is simply a collection of Tasks. One must implement three methods:
  createTaskInputs
  processTaskOutput
  processFatalOutput (C++ implementations require another method, getLibraryName, which specifies the library that contains the Tasklet implementation to be shipped to the remote Engines.)

Implementations of createTaskInputs call addTaskInput to add Tasks to the queue. (See FIGS. 60–61.) In addition, Job defines static methods for instantiating Job objects based on XML configuration scripts and call-backs to notify the application code when the Job is completed or encounters a fatal error. A Job also implements processTaskOutput to read output from each Task and output, process, store, add, or otherwise utilize the results. Both the C++ and Java versions provide both blocking (execute) and non-blocking (executeInThread) job execution methods, and execute locally to run the job in the current process. This last function is useful for debugging prior to deployment.

JobOptions

Each Job is equipped with a JobOptions object, which contains various parameter settings. The getOptions method of the Job class can be used to get or set options in the JobOptions object for that Job. A complete list of all methods available for the JobOptions object is available in the API reference documentation. Some commonly used methods include setJobName, setJarFile, and setDiscriminator.

setJobname

By default, the name associated with a Job and displayed in the Administration Tool is a long containing a unique number. One can set a name that will also be displayed in the Administration Tool with the Job ID. For example, if one's Job is named job, add this code:

job.getOptions( ).setJobname("Job Number 9");

setJarFile

A difference between the C++ and Java versions of the Driver API has to do with the mechanism for distributing code to the Engines.

For both APIs, the favored mechanism of code distribution involves distributing the Jar file containing the concrete class definitions to the Engines using the directory replication mechanism. The C++ version supports this mechanism. The dynamic library containing the implementation of the concrete classes must be distributed to the Engines using the native code distribution mechanism, and the corresponding Job implementation must define getLibraryName to specify the name of this library, for example picalc (for picalc.dll onWin32 or libpicalc.so on Unix).

With Java, a second method is also available, which can be used during development. The other method of distributing concrete implementations for the Tasklet, TaskInput, and TaskOutput is to package them in a Jar file, which is typically placed in the working directory of the Driver application. In this case, the corresponding Job implementation calls setJarFile with the name of this Jar file prior to calling one of the execute methods, and the Engines pull down a serialized copy of the file when they begin work on the corresponding Task. This method requires the Engine to download the classes each time a Job is run.

setDiscriminator

A discriminator is a method of controlling what Engines accept a Task. FIG. 76 contains sample code that sets a simple property discriminator.

Additional C++ Classes

Serializable

The C++ API incorporates a class Serializable, since object serialization is not a built-in feature of the C++ language. This class (see FIG. 62) provides the mechanism by which the C++ application code and the LiveCluster middleware exchange object data. It contains two pure virtual methods that must be implemented in any class that derives from it (i.e., in TaskInput, TaskOutput, and Tasklet).

API Extensions

The LiveCluster API contains several extensions to classes, providing specialized methods of handling data. These extensions can be used in special cases to improve performance or enable access to information in a database.

DataSetJob and TaskDataSet

A TaskDataSet is a collection of TaskInputs that persist on the Server as the input for any subsequent DataSetJob. The TaskInputs get cached on the Engine for subsequent use for the TaskDataSet. This API is therefore appropriate for doing repeated calculations or queries on large datasets. All Jobs using the same DataSetJob will all use the TaskInputs added to the TaskDataSet, even though their Tasklets may differ.

Also, TaskInputs from a set are cached on Engines. Engines which request a task from a Job will first be asked to use input that already exists in its cache. If it has no input in its cache, or if other Engines have already taken input in its cache, it will download a new input, and cache it.

An ideal use of TaskDataSet would be when running many Jobs on a very large dataset. Normally, one would create TaskInputs with a new copy of the large dataset for each Job, and then send this large TaskInputs to Engines and incur a large amount of transfer overhead each time another Job is run. Instead, the TaskDataSet can be created once, like a database of TaskInputs. Then, small Tasklets can be created that use the TaskDataSet for input, like a query on a database. As more jobs are run on this session, the inputs become cached among more Engines, increasing performance.

Creating a TaskDataSet

To create a TaskDataSet, first construct a new TaskDataSet, then add inputs to it using the addTaskInput method. (See FIG. 63.) If one is using a stream, one can also use the createTaskInput method. After one has finished adding inputs, call the doneSubmitting method. If a name is assigned using setName, that will be used for subsequent references to the session; otherwise, a name will be assigned. The set will remain on the Server until destroy is called, even if the Java VM that created it exits.

Creating a DataSetJob

After creating a TaskDataSet, implement the Job using DataSetJob, and create a TaskOutput. (See FIG. 64.) The main difference is that to run the Job, one must use setTaskDataSet to specify the dataset one created earlier. Note that the ExecuteLocally method cannot be used with the DataSetJob.

StreamJob and StreamTasklet

A StreamJob is a Job which allows one to create input and read output via streams rather than using defined objects. (See FIG. 65.) A StreamTasklet reads data from an InputStream and writes to an OutputStream, instead of using a TaskInput and TaskOutput. When the StreamJob writes input to a stream, the data is written directly to the local file system, and given to Engines via a lightweight webserver. The Engine also streams the data in via the StreamTasklet. In this way, the memory overhead on the Driver, Broker, and Engine is reduced, since an entire TaskInput does not need to be loaded into memory for transfer or processing. The StreamTasklet must be used with a StreamJob.

SQLDataSetJob and SQLTasklet

Engines can use information in an SQL database as input to complete a Task by the use of SQL. An SQLDataSetJob queries the database and receives a result set. Each SQLTasklet is given a subset of the result set as an input. This feature is only available from the Java Driver.

Starting the Database

To use an SQL database, one must first have a running database with a JDBC interface. (See FIG. 66.) The sample code loads a properties file called sqltest.properties. It contains properties used by the database, plus the properties tasks and query, which are used in our Job. (See FIG. 67.)

SQLDataSetJob

An SQLDataSetJob is created by implementing DataSet-Job. (See FIG. 67) Task inputs are not created, as they will be from the SQL database. (See FIG. 68.)

SQLTasklet

An SQLTasklet is implemented similar to a normal Tasklet, except the input is an SQL table. (See FIG. 69.)

Running the Job

After defining a TaskOutput, the Job can be run. The SQLDataSet is created on the server and is prepared with setJDBCProperties, setMode, setQuery, and prepare. Then the Job is run. (See FIG. 70.) Note that in order to use most recent information in the database, the SQLDataSet needs to be destroyed and created again. This may be important if one is using a frequently updated database.

The Propagator API

This section discusses how to use the Propagator API to run parallel code with inter-node communication.

Overview

The Propagator API is a group of classes that can be used to distribute a problem over a variable number of compute Engines instead of fixed-node cluster. It is an appropriate alternative to MPI for running parallel codes which require inter-node communication. Unlike most MPI parallel codes, Propagator implementations can run over heterogeneous resources, including interruptible desktop PCs.

A Propagator application is divided into steps, with steps sent to nodes. Using adaptive scheduling, the number of nodes can vary, even changing during a problem's computation. After a step has completed, a node can communicate with other nodes, propagating results and collecting information from nodes that have completed earlier steps. This checkpointing allows for fault-tolerant computations.

Figure 71:
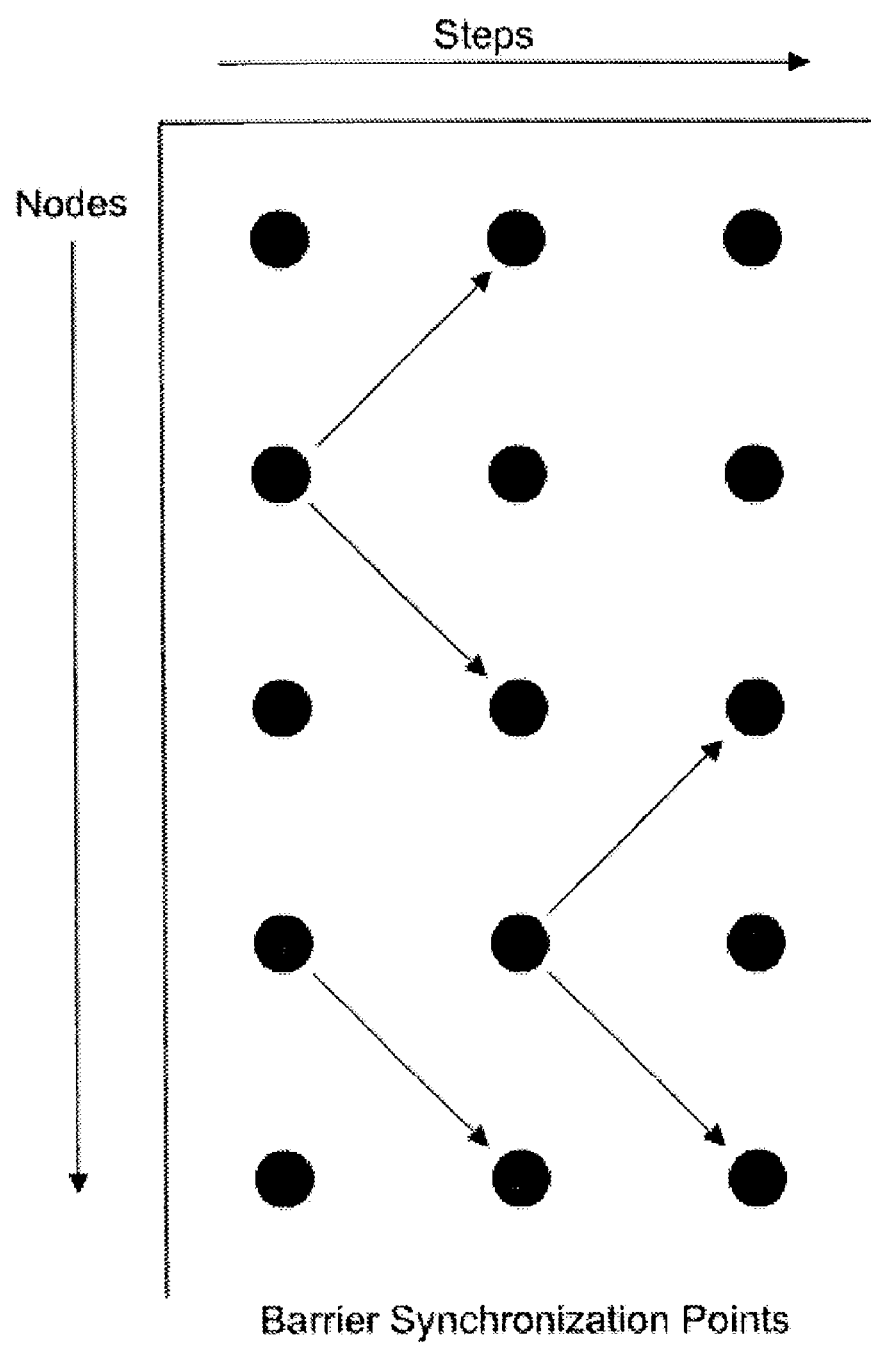
FIG. 71 illustrates data propagation using propagators in accordance with the preferred LiveCluster embodiment of the invention.

FIG. 71 illustrates how nodes communicate at barrier synchronization points when each step of an algorithm is completed.

Using the Propagator API

The Propagator API consists of three classes: Group-Propagator and NodePropagator and the Interface Group-Communicator.

The GroupPropagator is used as the controller. A GroupPropagator is created, and it is used to create the nodes and the messaging system used between nodes.

The NodePropagator contains the actual code that each node will execute at each step. It also contains whatever code each node will need to send and receive messages, and send and receive the node state.

The GroupCommunicator is the interface used by the nodes to send and receive messages, and to get and set node state.

Group Propagator

The GroupPropagator is the controlling class of the NodePropagators and GroupCommunicator. One should initially create a GroupPropagator as the first step in running a Propagator Job.

After creating a GroupPropagator, one can access the GroupCommunicator, like this:

GroupCommunicator go=gp.getGroupCommunicator( );

This will enable one to communicate with nodes, and get or set their state.

Next, one will need to set the NodePropagator used by the nodes. Given a simple NodePropagator implementation called TestPropagator that is passed the value of the integer x, one would do this:

gp.setNodePropagator(new TestPropagator(x));

After one has defined a NodePropagator, one can tell the nodes to execute a step of code by calling the propagate method, and passing a single integer containing the step number one wishes to run.

When a program is complete, the endSession method should be called to complete the session.

Node Propagator

The NodePropagator contains the actual code run on each node. The NodePropagator code is run on each step, and it communicates with the GroupCommunicator to send and receive messages, and set its state.

To create one's own NodePropagator implementation, create a class that extends NodePropagator. The one method the created class must implement is propagate. It will be run when propagate is run in the GroupPropagator, and it contains the code which the node actually runs.

The code in the NodePropagator will vary depending on the problem. But several possibilities include getting the state of a node to populate variables with partial solutions, broadcasting a partial solution so that other nodes can use it, or sending messages to other nodes to relay work status or other information. All of this is done using the GroupCommunicator.

Group Communicator

The GroupCommunicator communicates messages and states between nodes and the GroupPropagator. It can also transfer the states of nodes. It's like the bus or conduit between all of the nodes.

The GroupCommunicator exists after one creates the GroupPropagator. It is passed to each NodePropagator through the propagate method. Several methods enable communication. They include the following (there are also variations available to delay methods until a specified step or to execute them immediately):

| | |
|---|---|
| broadcast | Send a message to all recipients, except current node. |
| clearMessages | Clear all messages and states on server and Engines. |
| getMessages | Get the messages for current node. |
| getMessagesFromSender | Get the message from specified node for current node. |
| getNodeState | Get the state of specified node. |
| getNumNodes | Get the total number of nodes. |
| sendNessage | Send the message to nodeId. |
| setNodeState | Set the state of the node. |

FIGS. 88, 89A–E, 90A–J, 91A–F, and 92 depict self-explanatory, illustrative screen images that document the various classes and interfaces used in connection with the Propagator API. These documentary figures contain reference information that may enhance the skilled reader's appreciation of the application examples of FIGS. 72–75 and 93–100.

The 2-D Heat Equation—A Propagator API Example

We will now explain how to use the Propagator API to solve an actual problem. In this example, it is used to calculate a two-dimensional heat equation. This example uses three files: Test.java, which contains the main class, HeatEqnSolver.java, which implements the GroupPropagator, and HeatPropagator, which implements the NodePropagator.

Test.java

This file (see FIG. 72A) starts like most other LiveCluster programs, except we import com.livecluster.tasklet.propagator.*. Also, a Test class is created as our main class.

Continuing (see FIG. 72B), properties are loaded from disk, and variables needed for the calculations are initialized, either from the properties file, or to a default value. If anything fails, an exception will be thrown.

Next (see FIG. 72C), the GroupPropagator is created. It's passed all of the variables it will need to do its calculations. Also, a message is printed to System.out, displaying the variables used to run the equation.

The solve method for the HeatEqnSolver object, which will run the equation, is called (see FIG. 72D), and the program ends.

HeatEqnSolver.java

The class HeatEqnSolver is defined with a constructor that is passed the values used to calculate the heat equation. It has a single public method, Solve, which is called by Test to run the program. (See FIG. 73A.) This creates the GroupPropagator, which controls the calculation on the nodes.

solver.solve( );

A GroupPropagator gp is created (see FIG. 73B) with the name "heat2d," and the number of nodes specified in the properties. Then, a GroupCommunicator gc is assigned with the GroupPropagator method getGroupCommunicator. A new HeatPropagator is created, which is the code for the NodePropagator, which is described in the next section. The HeatPropagator is set as the NodePropagator for gp. It will now be used as the NodePropagator, and will have access to the GroupCommunicator. A Jarfile is set for the GroupPropagator.

The code (see FIG. 73C) then defines a matrix of random values and a mirror of the matrix for use by the nodes. After the math is done, the i loop uses setNodeState to push the value of the matrix to the nodes. Now, all of the nodes will be using the same starting condition for their calculations.

The main iteration loop (see below) uses the propagate method to send the steps to the nodes. This will cause _iters number of iterations by the nodes using their code.

```
// main iteration loop
for ( int i=0; i < _iters; i++ ) {
    gp.propagate(i);
}
```

As nodes return their results, the code (see FIGS. 73D–E) uses getNodeState to capture back the results and copy them into the matrix.

HeatPropagator.java

The HeatPropagator class (see FIG. 74) implements the NodePropagator, and is the code that will actually run on each node. When created, it is given lastIter, fax and facy. It obtains the boundary information as a message from the last step that was completed. It completes its equations, then broadcasts the results so the next node that runs can continue.

The first thing propagate does is use getNodeState to initialize its own copy of the matrix. (See FIG. 75A.)

Next, boundary calculations are obtained. (See FIG. 75B.) These are results that are on the boundary of what this node will calculate. If this is the first node, there aren't any boundaries, and nothing is done. But if this isn't step 0, there will be a message waiting from the last node, and it's obtained with getMessagesFromSender.

Next, the actual calculation takes place (see FIG. 75C), and then copied back into the matrix. The matrix is then set into the node state for the next iteration using setNodeState. (see FIG. 75D.) The boundaries are also sent on for the next node using sendMessage.

3-D FFT—Another Propagator API Example

To further illustrate the possible applications of the Propagator API, FIGS. 93A–D, 94A–C, 95A–D, 96A–E, 97A–B, 98, 99, and 100A–B depict its use in connection with a LiveCluster-based implementation of a parallel, three-dimensional FFT program. FIGS. 93A–D depict the "main" program—i.e., the code which parses the command line and launches the calculation. FIGS. 94A–C show the code that implements the "node calculation" on the remote Engines. FIGS. 95A–D hold the bulk of the program's logic; each node has an Xposer object that it calls to do the real work.

Discriminators

This section explains how to use Engine Discriminators, a powerful method of controlling which Engines are eligible to receive specific Jobs.

About Discriminators

In a typical business environment, not every PC will be identical. Some departments may have slower machines that are utilized less. Other groups may have faster PCs, but it may be a priority to use them to capacity during the day. And server farms of dedicated machines may be available all the time, without being interrupted by foreground tasks.

Depending on the Jobs one has and the general demographics of one's computing environment, the scheduling of Tasks to Engines may not be linear. And sometimes, a specific Job may require special handling to ensure the optimal resources are available for it. Also, in some LiveCluster installations, you one want to limit what Engines report to a given Broker for work. Or, one may want to limit what Driver submits work to a given Broker.

A discriminator enables one to specify what Engines can be assigned to a Task, what Drivers can submit Tasks to a Broker, and what Engines can report to a Broker. These limitations are set based on properties given to Engines or Drivers. Task discrimination is set in the Driver properties, and controls what Engines can be assigned to a Task. Broker discrimination is set in the LiveCluster Administration Tool, and controls what Drivers and Engines use that Broker.

For example: say one is implementing LiveCluster at a site that has 1000 PCs. However, 300 of the PCs are slower machines used by the Marketing department, and they are rarely idle. The Job will require a large amount of CPU time from each Engine processing tasks. Without using discriminators, the Tasks are sent to the slower machines and are regularly interrupted. This means that roughly 30% of the time, a Task will be scheduled on a machine that might not complete any work.

Discriminators provide a solution to this issue. First, one would deploy Engines to all of one's computers; Marketing computers would have a department property set to Marketing, and the rest of the machines in the company would have the department property set to something other than Marketing. Next, when the application sends a complex Job with the LiveCluster API, it attaches a Task discriminator specifying not to send any Tasks from the Job to any Engine with the department property set to Marketing. The large Job's Tasks will only go to Engines outside of Marketing, and smaller Jobs with no Task discriminator set will have Tasks processed by any Engine in the company, including those in Marketing.

Configuring Engines with Properties

Default Properties

An Engine has several properties set by default, with values corresponding to the configuration of the PC running the Engine. One can use these properties to set discriminators. The default properties, available in all Engines, are as follows:

| | |
|---|---|
| guid | The GUID (network card address) |
| id | The numerical ID of the Engine |
| instance | The instance, for multi-processor machines |
| username | The Engine's username |
| cpuNo | The number of CPUs on the machine |
| cpuMFlops | The performance, in Megaflops |
| totalMemInKB | Total available memory, in Kilobytes |
| freeMemInKB | Free memory, in Kilobytes |
| freeDiskInMB | Free disk space, in Megabytes |
| os | Operating system (win32, solaris or linux) |

Custom Properties

To set other properties, one can add the properties to the Engine Tracker, and install the Engine using tracking. One may also add and changes properties individually after installation using the Engine Properties command.

In Windows:

To add custom properties to an Engine, in the LiveCluster Administration Tool, one must make changes using the Engine Tracking Editor. After one changes the properties in the editor, one will be prompted for values for the properties each time one installs an Engine with the 1-Click Install with Tracking option. One can also change these at any time on any Engine with the Engine Properties command.

To access the editor, go to the Configure section, and click Engine Tracking Editor.

By default, the following properties are defined:

| | |
|---|---|
| MachineName | hostname of the machine where the Engine is being installed; |
| Group | work group to attach Engine; |
| Location | machine location; |
| Description | brief description of machine. |

When one installs an Engine with the 1-Click Install with Tracking option, one will be prompted to enter values for all four of the properties. If one doesn't want to use all four properties, one may click the Remove button next to the properties one does not want to use. (Note that you cannot remove the MachineName property.)

To add another property to the above list, enter the property name in the Property column, then enter a description of the property in the Description column, and click Add.

Configuring Driver Properties

Broker discrimination can be configured to work on either Engines or Drivers. For discrimination on Drivers, one can add or modify properties in the driver.properties file included in the top-level directory of the Driver distribution.

Configuring Broker Discriminators

One can configure a Broker to discriminate which Engines and Drivers from which it will accept login sessions. This can be done from the LiveCluster Administration Tool by selecting Broker Discrimination in the Configure section.

First, select the Broker to be configured from the list at the top of the page. If one is only running a single Broker, there will only be one entry in this list.

One can configure discriminators for both Driver properties and Engine properties. For Drivers, a discriminator is set in the Driver properties, and it prevents Tasks from a defined group of Drivers from being taken by this Broker. For Engines, a discriminator prevents the Engine from being able to log in to a Broker and take Tasks from it.

Each discriminator includes a property, a comparator, and a value. The property is the property defined in the Engine or Driver, such as a group, OS or CPU type. The value can be either a number (double) or string. The comparator compares the property and value. If they are true, the discriminator is matched, and the Engine can accept a Task, or the Driver can submit a Job. If they are false, the Driver is returned the Task, or in the case of an Engine, the Broker will try to send the Task to another Engine.

The following comparators are available:

| | |
|---|---|
| equals | A string that must equal the client's value for the property. |
| not equals | A string that must not equal the client's value for the property. |
| includes | A comma-delimited string that must equal the client's value for that property. ("*" means accept all.) |
| excludes | A comma-delimited string that cannot equal the client's value for that property. ("*" means deny all.) |
| = | The value is a number (double, for any to be used) that must equal the value for that property. |
| != | The value is a number (double, for any to be used) that must not equal the value for that property. |
| < | The value is a number, the client's value must be less than this value. |
| <= | The value is a number, the client's value must be less than or equal to this value. |
| > | The value is a number, the client's value must be greater than this value. |
| >= | The value is a number, the client's value must be greater than or equal to this value. |

One further option for each discriminator is the Negate other Brokers box. When this is selected, an Engine or Driver will be considered only for this Broker, and no others. For example, if one has a property named state and one sets a discriminator for when state equals NY and selects Negate other Brokers, any Engine with state set to NY will only go to this Broker and not others.

Once you has entered a property, comparator, and value, click Add. One can add multiple discriminators to a Broker by defining another discriminator and clicking Add again. Click Save to save all added discriminators to the Broker.

By default, if an Engine or Driver does not contain the property specified in the discriminator, the discriminator is not evaluated and considered false. However, one can select Ignore Missing Properties for both the Driver and Engine. This makes an Engine or Driver missing the property specified in a discriminator ignore the discriminator and continue. For example, if one sets a discriminator for OS=Linux, and an Engine doesn't have an OS property, normally the Broker won't give the Engine Jobs. But if one selects Ignore Missing Properties, the Engine without properties will still get Jobs from the Broker.

Task discriminators are set by the Driver, either in Java or in XML. (See FIG. 76.)

The LiveCluster Tutorial

This section provides details on how to obtain examples of using the LiveCluster API.

Using JNI Example

Often, the application, or some portion of it, is written in another (native) programming language such as C, C++, or Fortran, but it is convenient to use Java as the glue that binds the compute server to the application layer. In these cases the Java Native Interface (JNI) provides a simple mechanism for passing data and function calls between Java and the native code. [Note: One must create a separate wrapper to access the dynamically linked library (.dll or .so) from the Engine-side and insert a call to this wrapper in the service( ) method of the Tasklet interface.]

FIGS. 77–79 provide an example of a JNI for the previously-discussed Pi calculation program.

Submitting a LiveCluster Job

Using Java, jobs can be submitted to a LiveCluster Server in any of three ways:

From the command line, using XML scripting: java -cp DSDriver.jar MyApp picalc.xml This method uses properties from the driver.properties file located in the same directory as the Driver. One can also specify command-line properties.

At runtime using one of the createJob methods (this supports partial scripting of the Job Bean). PiCalcJob job=(PiCalcJob) Job.createJob(new File(picalc.xml)); job.execute( ); double pi=job.getPiValue( );

At runtime (entirely). PiCalcjob job=new PiCalcJob( ); job.getOptions( ).setJarFile(new File(picalc.jar)); job.setIterations(30000000); job.setNumTasks(500); job.execute( ); double pi=job.getpivalue( );

XML scripting also supports the Batch object, which enables one to submit a Job once and have it run many times on a regular schedule.

Using C++, jobs must be submitted to a LiveCluster Server using the run-time interface:

```
job = new PiJob( );
try {
    job->execute( ); // or executeInThread( ) or executeLocally( )
} catch (JobException je) {
    cerr << "testJob caught an exception" << je << endl;
}
delete job;
```

Driver Properties

Properties can be defined in the driver.properties file, located in the same directory as the Driver. One can edit this file and add properties, as property=value pairs. One can also specify properties on the command line using the -D switch, if they are prefixed with ds. For example:
    java -Dds.DSPrimaryDirector=server1:80 -Dds.DSSecondaryDirector=server2:80 -cp DSDriver.jar MyApp picalc.xml Properties specified on the command line are overwritten by properties specified in the driver.properties file. If one wants to set a property already defined in the driver.properties, one must first edit the driver.properties and comment out the property.

Using the Direct Data Transfer Property

Direct data transfer is enabled by setting DSDirectDataTransfer=true, which is the default setting in the driver.properties file. If one writes a shell script to create Jobs, each with their own Driver running from its own Java VM, one's script must provide a different port number for the DSWebserverPort property normally set in the driver.properties file. If one's script instantiates multiple Drivers from the same driver.properties file with the same port number, the first Driver will open a web server listening to the defined socket. Subsequent Drivers will not open another web server as long as the first Job is running, but will be able to continue running by using the first Job's server for direct data. However when the first Job completes, its server will be terminated, causing subsequent Jobs to fail.

To write a shell script for the above situation, one could remove the DSWebserverPort property from the driver.properties file and set a unique port number for each Job using a command line property, as described in the previous section.

XML Job Scripting

LiveCluster is packaged with XML-based scripting facilities one can use to create and configure Jobs. (see FIG. 80.) Since Java Jobs are JavaBeans components, their properties can be manipulated via XML and other Bean-compatible scripting facilities.

Batch Jobs

Jobs can be scheduled to run on a regular basis. Using XML scripting, one can submit a Job with specific scheduling instructions. Instead of immediately entering the queue, the Job will wait until the time and date specified in the instructions given.

Batch Jobs can be submitted to run at a specific absolute time, or a relative time, such as every hour. Also, a Batch Job can remain active, resubmitting a Job on a regular basis.

See, for example, FIG. 81, which submits the Linpack test at 11:20 AM on Sep. 28, 2001. The batch element contains the entire script, while the schedule element contains properties for type and startTime, defining when the Job will run. job actually runs the Job when it is time, and contains properties needed to run the Job, while command also runs at the same time, writing a message to a log.

Distributing Libraries, Shared Data, and Native Code

The LiveCluster system provides a simple, easy-to-use mechanism for distributing linked libraries (.dll or .so), Java class archives (.jar), or large data files that change relatively infrequently. The basic idea is to place the files to be distributed within a reserved directory associated with the Server. The system maintains a synchronized replica of the reserved directory structure for each Engine. This is called directory replication.

By default, four directories are replicated to Engines: win32, solaris, and linux directories are mirrored to Engines run on the respective operating systems, and shared is mirrored to all Engines.

The default location for these four directories are as follows:
    public_html/updates/resources/shared/
    public_html/updates/resources/win32/
    public_html/updates/resources/solaris/
    public_html/updates/resources/linux/

On the Server, these paths are relative to one's installation directory. For example, if one installs LiveCluster at c:\DataSynapse, one should append these paths to C:\DataSynapse\Server\livecluster on your server. On the Engine, the default installation in Windows puts the shared and win32 directories in C:\Program Files\DataSynapse\Engine\resources.

To configure directory replication, in the Administration Tool, go to the Configure section, and select Broker Configuration. Select Engine Manager, then Engine File Update Server.

When Auto Update Enabled is set to true (the default), the shared directories will automatically be mirrored to any Engine upon login to the Broker. Also, the Server will check for file changes in these directories at the time interval specified in Minutes Per Check. If changes are found, all Engines are signaled to make an update.

One can force all Engines to update immediately by setting Update All Now to true. This will cause all Engines to update, and then its value will return to false. If one has installed new files and wants all Engines to use them immediately, set this option to true.

Verifying the Application

Before deploying any application in a distributed environment, one should verify that it operates correctly in a purely local setting, on a single processor. The executeLocally( ) method in the Job class is provided for this purpose. Calling this method results in synchronous execution on the local processor; that is, the constituent Tasks execute sequentially on the local processor, without any intermediation from a Broker or distribution to remote Engines.

Optimizing LiveCluster Server Architecture

The LiveCluster Server architecture can be deployed to give varying degrees of redundancy and load sharing, depending on the computing resources available. Before installation, it's important to ascertain how LiveCluster will be used, estimate the volume and frequency of jobs, and survey what hardware and networking will be used for the installation. First, it's important to briefly review the architecture of a Server. The LiveCluster Server consists of two entities: the LiveCluster Director and the LiveCluster Broker:

Director—Responsible for authenticating Engines and initiating sessions between Engines and Brokers, or Drivers and Brokers. Each LiveCluster installation must have a Primary Director. Optionally, a LiveCluster installation can have a Secondary Director, to which Engines will log in if the Primary Director fails.

Broker—Responsible for managing jobs by assigning tasks to Engines. Every LiveCluster installation must have at least one Broker, often located on the same system as the primary Director. If more than one Broker is installed, then a Broker may be designated as a Failover Broker; it accepts Engines and Drivers only if all other Brokers fail.

A minimal configuration of LiveCluster would consist of a single Server configured as a Primary Director, with a single Broker. Additional Servers containing more Brokers or Directors can be added to address three primary concerns: redundancy, volume, and other considerations.

Redundancy

Given a minimal configuration of a single Director and single Broker, Engines and Drivers will log in to the Director, but failure of the Director (either by excessive volume, Server failure, or network failure) would mean a Driver or Engine not logged in would no longer be able to contact a Director to establish a connection.

Figure 82:
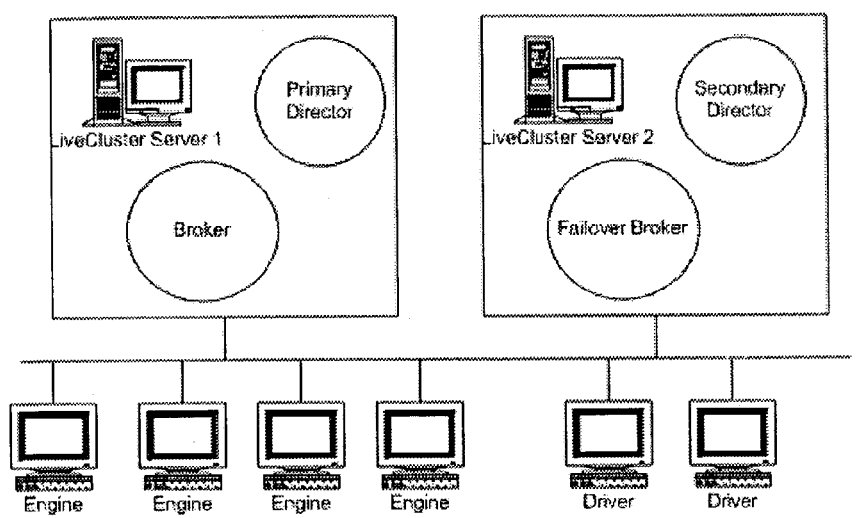
FIGS. 82–87 depict various illustrative configurations of the preferred LiveCluster embodiment f the invention.

To prevent this, redundancy can be built into the LiveCluster architecture. One method is to run a second Server with a Secondary Director, and configure Engines and Drivers with the address of both Directors. When the Primary Director fails, the Engine or Driver will contact the Secondary Director, which contains identical Engine configuration information and will route Engines and Drivers to Brokers in the same manner as the Primary Director. FIG. 82 shows an exemplary implementation with two Servers.

In addition to redundant Directors, a Broker can also have a backup on a second Server. A Broker can be designated a Failover Broker on a second Server during installation. Directors will only route Drivers and Engines to Failover Brokers if no other regular Brokers are available. When regular Brokers then become available, nothing further is routed to the Failover Broker. When a Failover Broker has finished processing any remaining jobs, it logs off all Engines, and Engines are then no longer routed to that Failover Broker. FIG. 82 shows a Failover Broker on the second Server.

Volume

Figure 83:
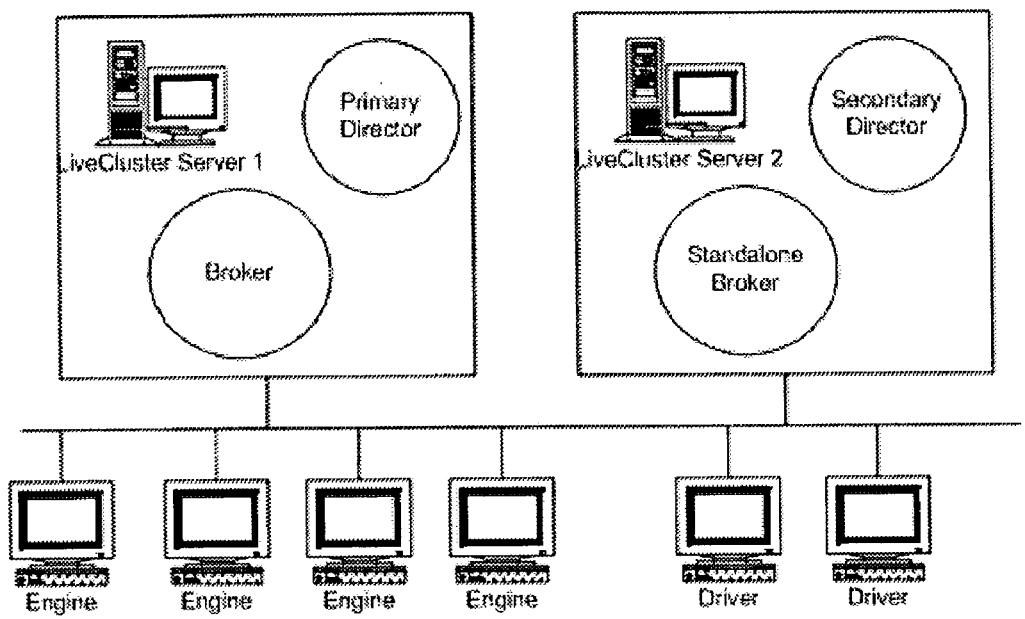

In larger clusters, the volume of Engines in the cluster may require more capability than can be offered by a single Broker. To distribute load, additional Brokers can be added to other Servers at installation. For example, FIG. 83 shows a two Server system with two Brokers. Drivers and Engines will be routed to these Brokers in round-robin fashion.

Other Considerations

Several other factors may influence how one may integrate LiveCluster with an existing computing environment. These include:

Instead of using one Cluster for all types of Jobs, one may wish to segregate different subsets of jobs (for example, by size or priority) to different Directors.

One's network may dictate how the Server environment should be planned. For example, if one has offices in two parts of the country and a relatively slow extranet but a fast intranet in each location, one could install a Server in each location.

Different Servers can support data used for different job types. For example, one Server can be used for Jobs accessing a SQL database, and a different Server can be used for jobs that don't access the database.

With this flexibility, it's possible to architect a Server model to provide a job space that will facilitate job traffic.

Configuring a Network

Since LiveCluster is a distributed computing application, successful deployment will depend on one's network configuration. LiveCluster has many configuration options to help it work with existing networks. LiveCluster Servers should be treated the same way one treats other mission-critical file and application servers: assign LiveCluster Servers static IP addresses and resolvable DNS hostnames. LiveCluster Engines and Drivers can be configured in several different ways. To receive the full benefit of peer-to-peer communication, one will need to enable communication between Engines and Drivers (the default), but LiveCluster can also be configured to work with a hub and spoke architecture by disabling Direct Data Transfer.

Name Service

LiveCluster Servers should run on systems with static IP addresses and resolvable DNS hostnames. In a pure Windows environment, it is possible to run LiveCluster using just WINS name resolution, but this mode is not recommended for larger deployments or heterogeneous environments.

Protocols and Port Numbers

LiveCluster uses the Internet Protocol (IP). All Engine-Server, Driver-Server, and Engine-Driver communication is via the HTTP protocol. Server components, Engines, and Drivers can be configured to use port 80 or any other available TCP port that is convenient for one's network configuration.

All Director-Broker communication is via TCP. The default Broker login TCP port is 2000, but another port can be specified at installation time. By default, after the Broker logs in, another pair of ephemeral ports is assigned for further communication. The Broker and Director can also be configured to use static ports for post-login communication.

Server-Engine and Driver-Server Communication

Figure 84:
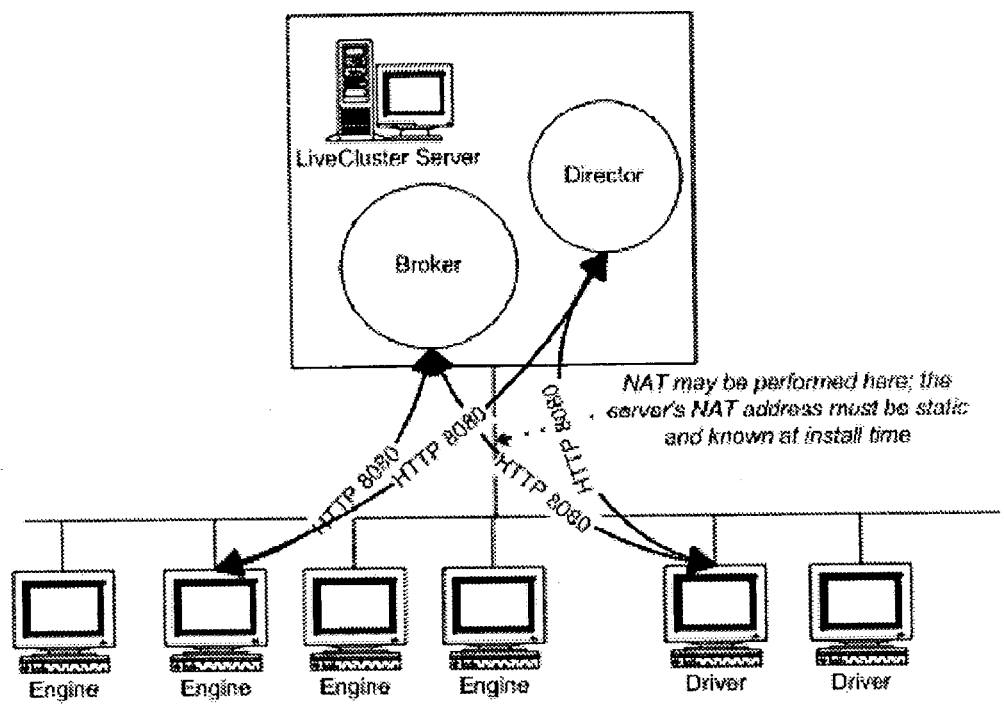

All communication between Engines and Servers (Directors and Brokers) and between Drivers and Servers is via the HTTP protocol, with the Engine or Driver acting as HTTP client and the Server acting as HTTP server. (See FIG. 84.)

The Server can be configured to work with an NAT device between the Server and the Engines or Drivers. To do this, specify the external (translated) address of the NAT device when referring to the Server address in Driver and Engine installation.

Win32 LiveCluster Engines can also support an HTTP proxy for communication between the Engine and the Broker. If the default HTML browser is configured with an HTTP proxy, the Win32 Engine will detect the proxy configuration and use it. However, since all LiveCluster communication is dynamic, the HTTP proxy is effectively useless, and for this reason it is preferred not to use an HTTP proxy.

Broker-Director Communication

Figure 85:
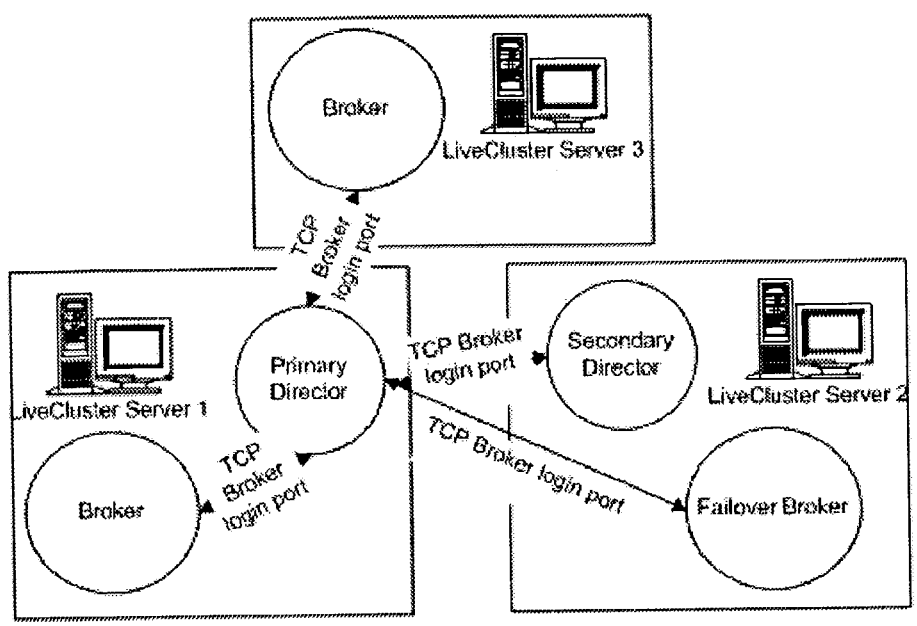

Communication between Brokers and Directors is via TCP. (See FIG. 85.) By default, the Broker will log in on port 2000, and ephemeral ports will then be assigned for further communication. This configuration does not permit a firewall or screening router between the Brokers and Directors. If a firewall or screening router must be supported between Brokers and Directors, then the firewall or screening must have the Broker login port (default 2000) open. Additionally, the Brokers must be configured to use static ports for post-login communication, and those ports must be open on the firewall as well.

Direct Data Transfer

Figure 86:
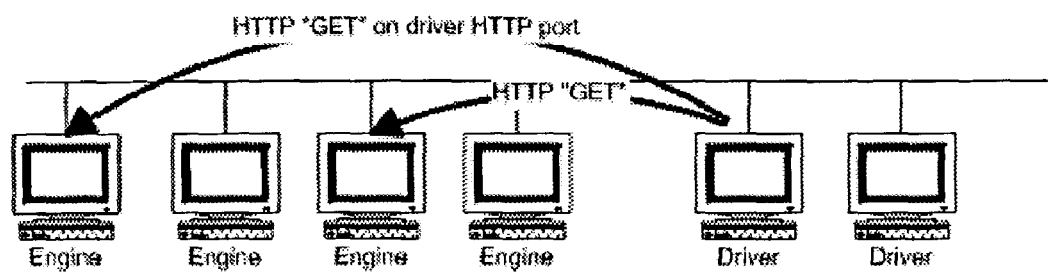
Figure 87:
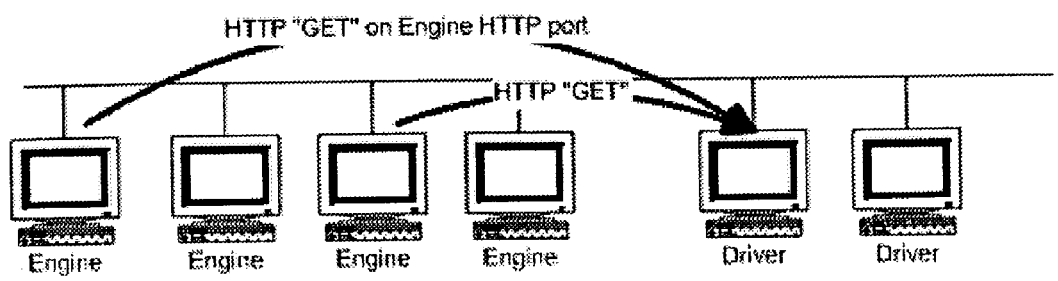

By default, LiveCluster uses Direct Data Transfer, or peer-to-peer communication, to optimize data throughput between Drivers and Engines. (See FIGS. 86–87.) Without Direct Data Transfer, all task inputs and outputs must be sent through the Server. Sending the inputs and outputs through the Server will result in higher memory and disk use on the Server, and lower throughput overall.

With Direct Data Transfer, only lightweight messages are sent though the Server, and the "heavy lifting" is done by the Driver and Engine nodes themselves. Direct data transfer requires that each peer knows the IP address that he presents to other peers. In most cases, therefore, Direct Data Transfer precludes the use of NAT between the peers. Likewise, Direct Data Transfer does not support proxies.

For LiveCluster deployments where NAT is already in.effect, NAT between Drivers and Engines can be supported by disabling peer-to-peer communication as follows:

If, from the perspective of the Drivers, the Engines appear to be behind an NAT device, then the Engines cannot provide peer-to-peer communication, because they won't know their NAT address. In this case Direct Data Transfer must be disabled in the Engine configuration.

Likewise, if, from the perspective of the Engines, the Drivers appear to be behind an NAT device, then the Drivers cannot provide peer-to-peer communication, as they do not know their NAT address. In this case Direct Data Transfer must be disabled in the Driver properties.

While the foregoing has described the invention by recitation of its various aspects/features and illustrative embodiment (s) thereof, those skilled in the art will recognize that alternative elements and techniques, and/or combinations and sub-combinations of the described elements and techniques, can be substituted for, or added to, those described herein. The present invention, therefore, should not be limited to, or defined by, the specific apparatus, methods, and articles-of-manufacture described herein, but rather by the appended claims (and others that may be contained in continuing applications), which claims are intended to be construed in accordance with well-settled principles of claim construction, including, but not limited to, the following Limitations should not be read from the specification or drawings into the claims (i.e., if the claim calls for a "chair," and the specification and drawings show a rocking chair, the claim term "chair" should not be limited to a rocking chair, but rather should be construed to cover any type of "chair").

The words "comprising," "including," and "having" are always open-ended, irrespective of whether they appear as the primary transitional phrase of a claim, or as a transitional phrase within an element or sub-element of the claim (e.g., the claim "a widget comprising: A; B; and C" would be infringed by a device containing 2A's, B, and 3C's; also, the claim a gizmo comprising: A; B, including X, Y, and Z; and C, having P and Q" would be infringed by a device containing 3A's, 2X's, 3Y's, Z, 6P's, and Q).

The indefinite articles "a" or "an" mean "one or more"; where, instead, a purely singular meaning is intended, a phrase such as "one," "only one," or "a single," will appear.

Where the phrase "means for" precedes a data processing or manipulation "function," it is intended that the resulting means-plus-function element be construed to cover any, and all, computer implementation(s) of the recited "function" using any standard programming techniques known by, or available to, persons skilled in the computer programming arts.

A claim that contains more than one computer-implemented means-plus-function element should not be construed to require that each means-plus-function element must be a structurally distinct entity (such as a particular piece of hardware or block of code); rather, such claim should be construed merely to require that the overall combination of hardware/firmware/software which implements the invention must, as a whole, implement at least the function(s) called for by the claim.

In light of the above, and reserving all rights to seek additional claims covering any subject matter disclosed herein.

We claim:

1. In a distributed computing system, a method for operating a broker that manages the execution of active jobs, each with at least one task to be assigned or completed, the method comprising:
   using the broker to maintain, for each active job, a list of associated: (i) waiting tasks that have not yet been assigned to a processing resource; (ii) pending tasks that have been assigned to at least one processing resource, but have not yet been completed by any processing resource; and (iii) completed tasks that have been completed by at least one processing resource;
   using the broker to maintain a priority for each active job;
   in response to an indication from a processing resource that the resource is available to accept tasks, using the broker to (i) select a job and (ii) assign at least one task associated with the selected job to the processing resource;
   in response to an indication from a processing resource that a task has completed its execution, using the broker to (i) identify the job with which the completed task is associated and (ii) update the identified job's associated task lists;
   using the broker to periodically compute statistical information regarding waiting, pending, and/or completed tasks, wherein said computed statistical information includes at least (i) a mean time-to-completion for completed tasks associated with each active job and (ii) a standard deviation of time-to-completion for completed tasks associated with each active job;
   using the broker to identify, based on at least some of said computed statistical information, at least one pending task for redundant assignment to an additional processing resource; and,
   adding said identified pending task to the waiting task list for the job with which said identified pending task is associated.

2. A method, as defined in claim 1, further comprising:
   using the broker to periodically scan the pending task lists of active jobs to determine an elapsed time since assignment to a processing resource for each pending task.

3. A method, as defined in claim 1, wherein maintaining lists of associated waiting, pending, and completed tasks comprises maintaining ordered lists of associated waiting, pending, and completed tasks.

4. A method, as defined in claim 1, wherein maintaining lists of associated waiting, pending, and completed tasks comprises maintaining FIFO queues of associated waiting and pending tasks.

5. A method, as defined in claim 1, wherein using the broker to maintain a priority for each active job comprises storing, at the broker, a numeric priority for each active job.

6. A method, as defined in claim 5, wherein using the broker to maintain a priority for each active job further comprises updating the stored priority for one or more of the active job(s).

7. A method, as defined in claim 1, wherein using the broker to update the identified job's associated task lists comprise: searching the identified job's associated pending task list; and, if the completed task appears on the pending task list, removing it from the list.

8. A method, as defined in claim 1, wherein using the broker to update the identified job's associated task lists comprises: searching the identified job's associated pending and waiting task lists; and, if the completed task appears on either list, removing it from both lists.

9. A method, as defined in claim 1, wherein using the broker to update the identified job's associated task lists further comprises: determining whether the completed task does not appear on either of the identified job's waiting or pending task lists; and, if the completed task does not appear on either list, identifying the completed task as an already-finished redundant task.

10. A method, as defined in claim 9, wherein using the broker to update the identified job's associated task lists further comprises: using the broker to free or restart computational resources that may be executing redundant instances of the already-finished redundant task.

11. A method, as defined in claim 1, wherein using the broker to select a job comprises: using a serial assignment strategy to select the highest-priority job that has at least one associated waiting task.

12. A method, as defined in claim 11, wherein, in the case that multiple jobs of the highest priority have one or more associated waiting tasks, using a serial assignment strategy further comprises: using a serial assignment strategy to select the earliest-submitted of the highest-priority jobs that have one or more associated waiting tasks.

13. A method, as defined in claim 11, wherein, in the case that multiple jobs of the highest priority have one or more associated waiting tasks, using a serial assignment strategy further comprises: using an interleaved assignment strategy to select, without favoritism, one of the highest-priority jobs that have one or more associated waiting tasks.

14. A method, as defined in claim 1, wherein using the broker to select a job comprises: using an interleaved assignment strategy to select a job that has at least one associated waiting task, whereby is multiple jobs have at least one associated waiting task, the probability of selecting a given job is weighted in accordance with its priority relative to the priorities of other jobs with at least one associated waiting task.

15. A method, as defined in claim 1, wherein periodically computing statistical information further comprises: normalizing the computed statistical information to account for the capabilities of the processing resources on which the completed tasks execute.

16. In a distributed computing system, a method for managing the execution of active jobs with at least one task to be assigned or completed, the method comprising:
   maintaining, for each active job, a record of associated: (i) waiting tasks that have not yet been assigned to a processing resource; (ii) pending tasks that have been assigned to at least one processing resource, but have not yet been completed by any processing resource; and (iii) completed tasks that have been completed by at least one processing resource;
   maintaining a priority for each active job;
   in response to an indication from a processing resource that the resource is available to accept tasks, (i) selecting a job and (ii) assigning at least one task associated with the selected job to the processing resource;
   in response to an indication from a processing resource that a task has completed its execution, (i) identifying the job with which the completed task is associated and (ii) updating the identified job's associated task records;
   periodically computing statistical information regarding waiting, pending, and/or completed tasks by computing at least (i) a mean time-to-completion for completed tasks associated with each active job and (ii) a standard deviation of time-to-completion for completed tasks associated with each active job;

identifying, based on at least some of said computed statistical information, at least one pending task for redundant assignment to an additional processing resource; and, adding said identified pending task to the waiting task list for the job with which said identified pending task is associated.

17. A method, as defined in claim 16, further comprising: periodically scaning the pending task lists of active jobs to determine an elapsed time since assignment to a processing resource for each pending task.

18. A method, as defined in claim 16, wherein maintaining lists of associated waiting, pending, and completed tasks comprises maintaining ordered lists of associated waiting, pending, and completed tasks.

19. A method, as defined in claim 16, wherein maintaining lists of associated waiting, pending, and completed tasks comprises maintaining FIFO queues of associated waiting and pending tasks.

20. A method, as defined in claim 16, wherein maintaining a priority for each active job comprises storing a numeric priority for each active job.

21. A method, as defined in claim 20, wherein maintaining a priority for each active job further comprises updating the stored priority for one or more of the active jobs.

22. A method, as defined in claim 16, wherein updating the identified job's associated task lists comprises: searching the identified job's associated pending task list; and, if the completed task appears on the pending task list, removing it from the list.

23. A method, as defined in claim 16, wherein updating the identified job's associated task lists comprises: searching the identified job's associated pending and waiting task lists; and, if the completed task appears on either list, removing it from both lists.

24. A method, as defined in claim 23, wherein updating the identified job's associated task lists further comprises: determining whether the completed task does not appear on either of the identified job's waiting or pending task lists; and, if the completed task does not appear on either list, identifying the completed task as an already-finished redundant task.

25. A method, as defined in claim 24, wherein updating the identified job's associated task lists further comprises: freeing or restarting computational resources that may be executing redundant instances of the already-finished redundant task.

26. A method, as defined in claim 16, wherein selecting a job comprises: using a serial assignment strategy to select the highest-priority job that has at least one associated waiting task.

27. A method, as defined in claim 26, wherein, in the case that multiple jobs of the highest priority have one or more associated waiting tasks, using a serial assignment strategy further comprises: using a serial assignment strategy to select the earliest-submitted of the highest-priority jobs that have one or more associated waiting tasks.

28. A method, as defined in claim 26, wherein, in the case that multiple jobs of the highest priority have one or more associated waiting tasks, using a serial assignment strategy further comprises: using an interleaved assignment strategy to select, without favoritism, one of the highest-priority jobs that has one or more associated waiting tasks.

29. A method, as defined in claim 16, wherein selecting a job comprises: using an interleaved assignment strategy to select a job that has at least one associated waiting task, whereby if multiple jobs have at least one associated waiting task, the probability of selecting a given job is weighted in accordance with its priority relative to the priorities of other jobs with at least one associated waiting task.

30. A method, as defined in claim 16, wherein periodically computing statistical information further comprises: normalizing the computed statistical information to account for the capabilities of the processing resources on which completed tasks execute.

31. In a distributed computing system, a method for managing the execution of active jobs with at least one task to be assigned or completed, the method comprising:

maintaining, for each active job, a record of associated: (i) waiting tasks that have not yet been assigned to a processing resource; (ii) pending tasks that have been assigned to at least one processing resource, but have not yet been completed by any processing resource; and (iii) completed tasks that have been completed by at least one processing resource;

maintaining a priority for each active job;

in response to an indication from a processing resource that the resource is available to accept tasks, (i) selecting a job and (ii) assigning at least one task associated with the selected job to the processing resource;

in response to an indication from a processing resource that a task has completed its execution, (i) identifying the job with which the completed task is associated and (ii) updating the identified job's associated task records;

periodically computing statistical information regarding waiting, pending, and/or completed tasks by computing at least (i) a mean time-to-completion for completed tasks associated with each active job, and (ii) a normalized mean time-to-completion for completed tasks associated with each active job, normalized to account for the capabilities of the processing resources on which the completed tasks execute;

identifying, based on at least some of said computed statistical information, at least one pending task for redundant assignment to an additional processing resource; and, adding said identified pending task to the waiting task list for the job with which said identified pending task is associated.

32. A method, as defined in claim 31, further comprising: periodically scaning the pending task lists of active jobs to determine an elapsed time since assignment to a processing resource for each pending task.

33. A method, as defined in claim 31, wherein maintaining lists of associated waiting, pending, and completed tasks comprises maintaining ordered lists of associated waiting, pending, and completed tasks.

34. A method, as defined in claim 31, wherein maintaining lists of associated waiting, pending, and completed tasks comprises maintaining FIFO queues of associated waiting and pending tasks.

35. A method, as defined in claim 31, wherein maintaining a priority for each active job comprises storing a numeric priority for each active job.

36. A method, as defined in claim 31, wherein maintaining a priority for each active job further comprises updating the stored priority for one or more of the active jobs.

37. A method, as defined in claim 31, wherein updating the identified job's associated task lists comprises: searching the identified job's associated pending task list; and, if the completed task appears on the pending task list, removing it from the list.

38. A method, as defined in claim 31, wherein updating the identified job's associated task lists comprises: searching the identified job's associated pending and waiting task lists; and, if the completed task appears on either list, removing it from both lists.

39. A method, as defined in claim 38, wherein updating the identified job's associated task lists further comprises: determining whether the completed task does not appear on either of the identified job's waiting or pending task lists; and, if the completed task does not appear on either list, identifying the completed task as an already-finished redundant task.

40. A method, as defined in claim 39, wherein updating the identified job's associated task lists further comprises: freeing or restarting computational resources that may be executing redundant instances of the already-finished redundant task.

41. A method, as defined in claim 31, wherein selecting a job comprises: using a serial assignment strategy to select the highest-priority job that has at least one associated waiting task.

42. A method, as defined in claim 41, wherein, in the case that multiple jobs of the highest priority have one or more associated waiting tasks, using a serial assignment strategy further comprises: using a serial assignment strategy to select the earliest-submitted of the highest-priority jobs that have one or more associated waiting tasks.

43. A method, as defined in claim 41, wherein, in the case that multiple jobs of the highest priority have one or more associated waiting tasks, using a serial assignment strategy further comprises: using an interleaved assignment strategy to select, without favoritism, one of the highest-priority jobs that has one or more associated waiting tasks.

44. A method, as defined in claim 31, wherein selecting a job comprises: using an interleaved assignment strategy to select a job that has at least one associated waiting task, whereby if multiple jobs have at least one associated waiting task, the probability of selecting a given job is weighted in accordance with its priority relative to the priorities of other jobs with at least one associated waiting task.

45. In a distributed computing system, a method for managing the execution of active jobs with at least one task to be assigned or completed, the method comprising:
   maintaining, for each active job, a record of associated: (i) waiting tasks that have not yet been assigned to a processing resource; (ii) pending tasks that have been assigned to at least one processing resource, but have not yet been completed by any processing resource; and (iii) completed tasks that have been completed by at least one processing resource;
   maintaining priority for each active job;
   in response to an indication from a processing resource that the resource is available to accept tasks, (i) selecting a job and (ii) assigning at least one task associated with the selected job to the processing resource;
   in response to an indication from a processing resource that a task has completed its execution, (i) identifying the job with which the completed task is associated and (ii) updating the identified job's associated task records;
   periodically computing statistical information regarding waiting, pending, and/or completed tasks by computing at least (i) a standard deviation of time-to-completion for completed tasks associated with each active job and (ii) a normalized standard deviation of time-to-completion for completed tasks associated with each active job, normalized to account for the capabilities of the processing resources on which the completed tasks execute;
   identifying, based on at least some of said computed statistical information, at least one pending task for redundant assignment to an additional processing resource; and,
   adding said identified pending task to the waiting task list for the job with which said identified pending task is associated.

46. A method, as defined in claim 45, further comprising: periodically scaning the pending task lists of active jobs to determine an elapsed time since assignment to a processing resource for each pending task.

47. A method, as defined in claim 45, wherein maintaining lists of associated waiting, pending, and completed tasks comprises maintaining ordered lists of associated waiting, pending, and completed tasks.

48. A method, as defined in claim 45, wherein maintaining lists of associated waiting, pending, and completed tasks comprises maintaining FIFO queues of associated waiting and pending tasks.

49. A method, as defined in claim 45, wherein maintaining a priority for each active job comprises storing a numeric priority for each active job.

50. A method, as defined in claim 49, wherein maintaining a priority for each active job further comprises updating the stored priority for one or more of the active jobs.

51. A method, as defined in claim 45, wherein updating the identified job's associated task lists comprises: searching the identified job's associated pending task list; and, if the completed task appears on the pending task list, removing it from the list.

52. A method, as defined in claim 45, wherein updating the identified job's associated task lists comprises: searching the identified job's associated pending and waiting task lists; and, if the completed task appears on either list, removing it from both lists.

53. A method, as defined in claim 52, wherein updating the identified job's associated task lists further comprises: determining whether the completed task does not appear on either of the identified job's waiting or pending task lists; and, if the completed task does not appear on either list, identifying the completed task as an already-finished redundant task.

54. A method, as defined in claim 53, wherein updating the identified job's associated task lists further comprises: freeing or restarting computational resources that may be executing redundant instances of the already-finished redundant task.

55. A method, as defined in claim 45, wherein selecting a job comprises: using a serial assignment strategy to select the highest-priority job that has at least one associated waiting task.

56. A method, as defined in claim 55, wherein, in the case that multiple jobs of the highest priority have one or more associated waiting tasks, using a serial assignment strategy further comprises: using a serial assignment strategy to select the earliest-submitted of the highest-priority jobs that have one or more associated waiting tasks.

57. A method, as defined in claim 55, wherein, in the case that multiple jobs of the highest priority have one or more associated waiting tasks, using a serial assignment strategy further comprises: using an interleaved assignment strategy to select, without favoritism, one of the highest-priority jobs that has one or more associated waiting tasks.

58. A method, as defined in claim 45, wherein selecting a job comprises: using an interleaved assignment strategy to select a job that has at least one associated waiting task, whereby if multiple jobs have at least one associated waiting task, the probability of selecting a given job is weighted in accordance with its priority relative to the priorities of other jobs with at least one associated waiting task.

59. In a distributed computing system, a method for managing the execution of active jobs with at least one task to be assigned or completed, the method comprising:
maintaining, for each active job, a record of associated: (i) waiting tasks that have not yet been assigned to a processing resource; (ii) pending tasks that have been assigned to at least one processing resource, but have not yet been completed by any processing resource; and (iii) completed tasks that have been completed by at least one processing resource;
maintaining a priority for each active job;
in response to an indication from a processing resource that the resource is available to accept tasks, (i) selecting a job and (ii) assigning at least one task associated with the selected job to the processing resource;
in response to an indication from a processing resource that a task has completed its execution, (i) identifying the job with which the completed task is associated and (ii) updating the identified job's associated task records;
periodically computing statistical information regarding waiting, pending, and/or completed tasks by computing at least (i) a mean elapsed time for pending tasks associated with each active job and (ii) a standard deviation of elapsed time for pending tasks associated with each active job;
identifying, based on at least some of said computed statistical information, at least one pending task for redundant assignment to an additional processing resource; and,
adding said identified pending task to the waiting task list for the job with which said identified pending task is associated.

60. A method, as defined in claim 59, further comprising:
periodically scaning the pending task lists of active jobs to determine an elapsed time since assignment to a processing resource for each pending task.

61. A method, as defined in claim 59, wherein maintaining lists of associated waiting, pending, and completed tasks comprises maintaining ordered lists of associated waiting, pending, and completed tasks.

62. A method, as defined in claim 59, wherein maintaining lists of associated waiting, pending, and completed tasks comprises maintaining FIFO queues of associated waiting and pending tasks.

63. A method, as defined in claim 59, wherein maintaining a priority for each active job comprises storing a numeric priority for each active job.

64. A method, as defined in claim 63, wherein maintaining a priority for each active job further comprises updating the stored priority for one or more of the active jobs.

65. A method, as defined in claim 59, wherein updating the identified job's associated task lists comprises: searching the identified job's associated pending task list; and, if the completed task appears on the pending task list, removing it from the list.

66. A method, as defined in claim 59, wherein updating the identified job's associated task lists comprises: searching the identified job's associated pending and waiting task lists; and, if the completed task appears on either list, removing it from both lists.

67. A method, as defined in claim 66, wherein updating the identified job's associated task lists further comprises: determining whether the completed task does not appear on either of the identified job's waiting or pending task lists; and, if the completed task does not appear on either list, identifying the completed task as an already-finished redundant task.

68. A method, as defined in claim 67, wherein updating the identified job's associated task lists further comprises: freeing or restarting computational resources that may be executing redundant instances of the already-finished redundant task.

69. In a distributed computing system, a method for managing the execution of active jobs with at least one task to be assigned or competed, the method comprising:
maintaining, for each active job, a record of associated: (i) waiting tasks that have not yet been assigned to a processing resource; (ii) pending tasks that have been assigned to at least one processing resource, but have not yet been completed by any processing resource; and (iii) completed tasks that have been completed by at least one processing resource;
maintaining a priority for each active job;
in response to an indication from a processing resource that the resource is available to accept tasks, (i) selecting a job and (ii) assigning at least one task associated with the selected job to the processing resource;
in response to an indication from a processing resource that a task has completed its execution, (i) identifying the job with which the completed task is associated and (ii) updating the identified job's associated task records;
periodically computing statistical information regarding waiting, pending, and/or completed tasks by computing at least (i) a mean time-to-completion for completed tasks associated with each active job and (ii) a fraction or percentage of waiting vs. pending tasks associated with each active job;
identifying, based on at least some of said computed statistical information, at least one pending task for redundant assignment to an additional processing resource; and,
adding said identified pending task to the waiting task list for the job with which said identified pending task is associated.

70. In a distributed computing system, a method for managing the execution of active jobs with at least one task to be assigned or completed, the method comprising:
maintaining, for each active job, a record of associated: (i) waiting tasks that have not yet been assigned to a processing resource; (ii) pending tasks that have been assigned to at least one processing resource, but have not yet been completed by any processing resource; and (iii) completed tasks that have been completed by at least one processing resource;
maintaining a priority for each active job;
in response to an indication from a processing resource that the resource is available to accept tasks, (i) selecting a job and (ii) assigning at least one task associated with the selected job to the processing resource;
in response to an indication from a processing resource that a task has completed its execution, (i) identifying the job with which the completed task is associated and (ii) updating the identified job's associated task records;

periodically computing statistical information regarding waiting, pending, and/or completed tasks by computing at least (i) a mean elapsed time for pending tasks associated with each active job and (ii) a fraction or percentage of waiting vs. pending tasks associated with each active job;

identifying, based on at least some of said computed statistical information, at least one pending task for redundant assignment to an additional processing resources; and, adding said identified pending task to the waiting task list for the job with which said identified pending task is associated.

71. In a distributed computing system, a method for managing the execution of active jobs with at least one task to be assigned or completed, the method comprising:

maintaining, for each active job, a record of associated: (i) waiting tasks that have not yet been assigned to a processing resource; (ii) pending tasks that have been assigned to at least one processing resource, but have not yet been completed by any processing resource; and (iii) completed tasks that have been completed by at least one processing resource;

maintaining a priority for each active job;

in response to an indication from a processing resource that the resource is available to accept tasks, (i) selecting a job and (ii) assigning at least one task associated with the selected job to the processing resource;

in response to an indication from a processing resource that a task has completed its execution, (i) identifying the job with which the completed task is associated and (ii) updating the identified job's associated task records;

periodically computing statistical information regarding waiting, pending, and/or completed tasks by computing at least (i) a normalized mean time-to-completion for completed tasks associated with each active job, normalized to account for the capabilities of the processing resources on which the completed tasks execute, and (ii) a fraction or percentage of waiting vs. pending tasks associated with each active job;

identifying, based on at least some of said computed statistical information, at least one pending task for redundant assignment to an additional processing resource; and, adding said identified pending task to the waiting task list for the job with which said identified pending task is associated.

* * * * *